US007739327B2

(12) United States Patent
Mutton et al.

(10) Patent No.: US 7,739,327 B2
(45) Date of Patent: Jun. 15, 2010

(54) DISTRIBUTED LINK PROCESSING SYSTEM FOR DELIVERING APPLICATION AND MULTI-MEDIA CONTENT ON THE INTERNET

(75) Inventors: James Andrew Mutton, Maple Valley, WA (US); Jeremiah Blake Lindsay, Seattle, WA (US)

(73) Assignee: Playstream Inc., Irvine, CA (US)

( * ) Notice: Subject to any disclaimer, the term of this patent is extended or adjusted under 35 U.S.C. 154(b) by 1669 days.

(21) Appl. No.: 09/826,147

(22) Filed: Apr. 5, 2001

(65) Prior Publication Data

US 2002/0147840 A1  Oct. 10, 2002

(51) Int. Cl.
G06F 15/16 (2006.01)
(52) U.S. Cl. ........................................ 709/203; 709/231
(58) Field of Classification Search ......... 709/201–203, 709/216–219, 225, 227–232, 238–239, 245; 705/59
See application file for complete search history.

(56) References Cited

U.S. PATENT DOCUMENTS

| | | | |
|---|---|---|---|
| 4,873,662 A | 10/1989 | Sargent | |
| 5,572,643 A | 11/1996 | Judson | |
| 5,675,738 A * | 10/1997 | Suzuki et al. | 709/219 |
| 5,737,619 A | 4/1998 | Judson | |
| 5,928,330 A | 7/1999 | Goetz et al. | |
| 5,999,929 A | 12/1999 | Goodman | |
| 6,029,175 A | 2/2000 | Chow et al. | |
| 6,032,196 A | 2/2000 | Monier | |
| 6,073,135 A | 6/2000 | Broder et al. | |
| 6,101,547 A | 8/2000 | Mukherjee et al. | |
| 6,185,598 B1 | 2/2001 | Farber et al. | |
| 6,195,680 B1 * | 2/2001 | Goldszmidt et al. | 709/203 |
| 6,222,541 B1 | 4/2001 | Bates et al. | |
| 6,421,726 B1 * | 7/2002 | Kenner et al. | 709/225 |
| 6,757,709 B1 * | 6/2004 | Oberdorfer | 709/203 |

(Continued)

FOREIGN PATENT DOCUMENTS

JP    10-222541 A    8/1998

(Continued)

OTHER PUBLICATIONS

RFC 959, File Transfer Protocol, Postel et al., Oct. 1985.*

(Continued)

*Primary Examiner*—Yasin M Barqadle
(74) *Attorney, Agent, or Firm*—Griffin & Szipl, P.C.

(57) ABSTRACT

A distributed link or connection processing system delivers application and multi-media content over the Internet. A client selection of remotely hosted information or multi-media content routes a request including option specifying content provided by the web page developer to one of a plurality of link or connection servers. The link server designated by the request identifies the server hosting the requested content and, after optionally verifying the authorization of the request and recording the request in a customer records database, issues a request for the server hosting the requested content to initiate information transfer to the requesting client. Web developers utilize the provided software for constructing option encoding reference tags for the link servers, thus eliminating the need to learn formal request requirements of the link server. By distributing link processing to a plurality of remote link servers, the web developer is no longer constrained by the support features of a particular web server.

72 Claims, 35 Drawing Sheets

U.S. PATENT DOCUMENTS

| | | | |
|---|---|---|---|
| 6,807,570 | B1 | 10/2004 | Allen et al. |
| 2001/0012991 | A1* | 8/2001 | Kimpara et al. ................. 704/5 |
| 2002/0087707 | A1* | 7/2002 | Stewart et al. .............. 709/230 |
| 2002/0120577 | A1* | 8/2002 | Hans et al. .................... 705/59 |
| 2003/0018607 | A1* | 1/2003 | Lennon et al. ................. 707/1 |
| 2004/0024900 | A1* | 2/2004 | Breiter et al. ............... 709/231 |
| 2004/0236844 | A1* | 11/2004 | Kocherlakota ............. 709/219 |

FOREIGN PATENT DOCUMENTS

| | | |
|---|---|---|
| JP | 11-288426 | 10/1999 |
| WO | WO 97/15020 A1 | 4/1997 |
| WO | WO 99/21109 A3 | 4/1999 |

OTHER PUBLICATIONS

ASP You Can Grasp: The ABCs of Active Server Pages, by Nancy Cluts, last updated May 28, 1997.*

Video Streams into the Mainstream, by George Lawton, published Jul. 2000.*

QuickTime 3: Product Description and Specifications, last modified on Aug. 6, 1999.*

McGraw-Hill's Computer Professional's Dictionary, 1990, pp. 301-212.

The Delphion Integrated View corresponding to WO 97/15020 A1, downloaded Oct. 16, 2009, filed herewith as "Exhibit AA."

The Delphion Integrated View corresponding to JP 10-222541 A2, downloaded Oct. 16, 2009, and filed herewith as "Exhibit AB."

The Delphion Integrated View corresponding to JP 11-288426 A2, downloaded Oct. 16, 2009, and filed herewith as "Exhibit AC."

* cited by examiner

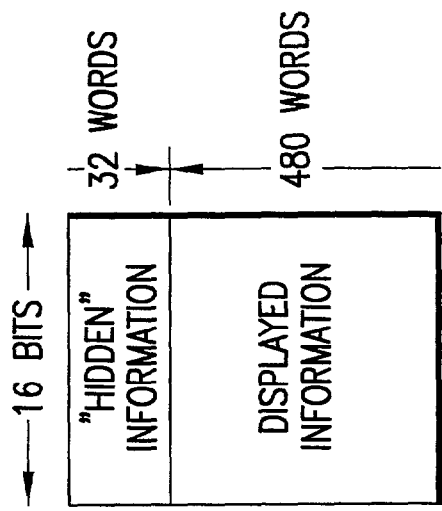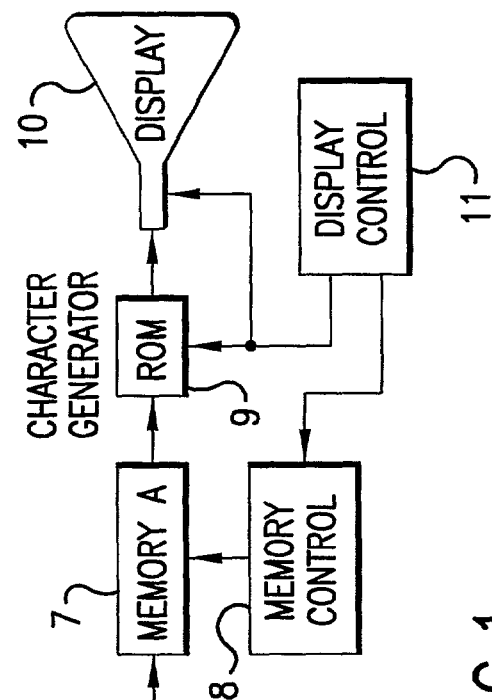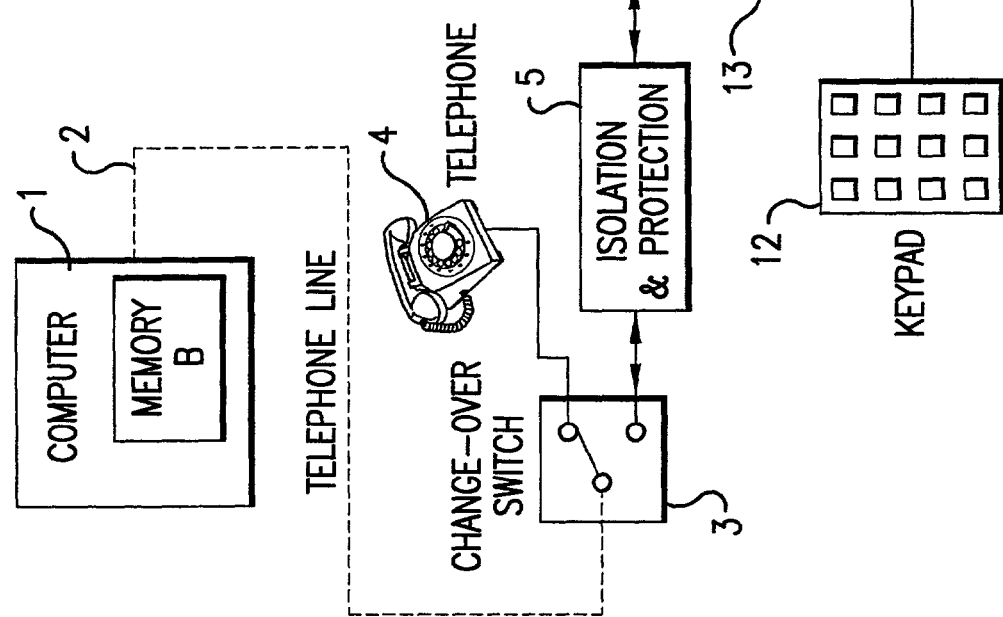

FIG.6 LINKING DISTRIBUTED CONTENT OVER THE INTERNET

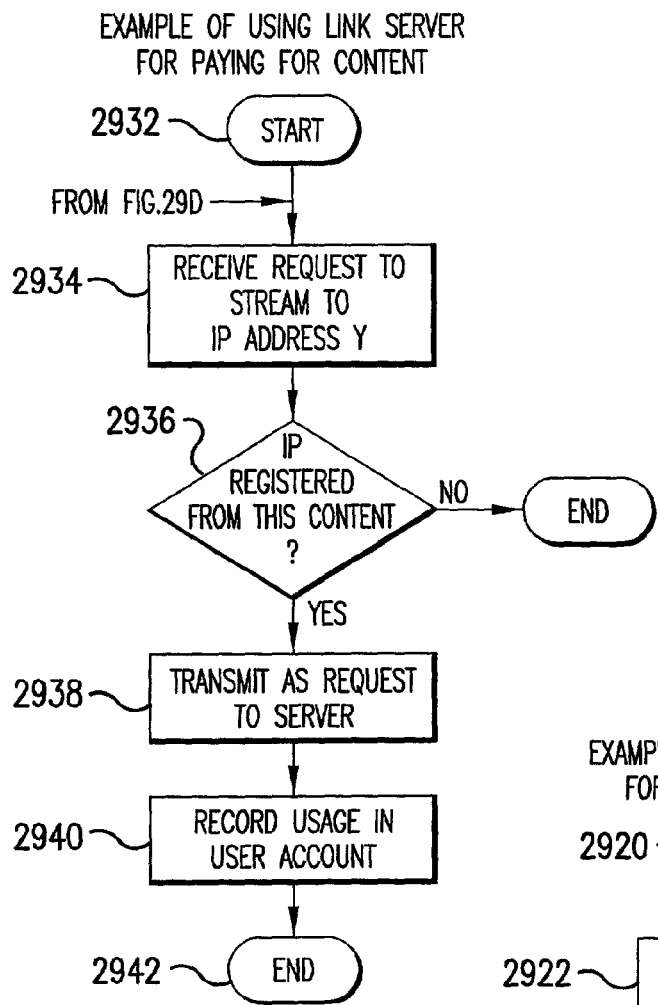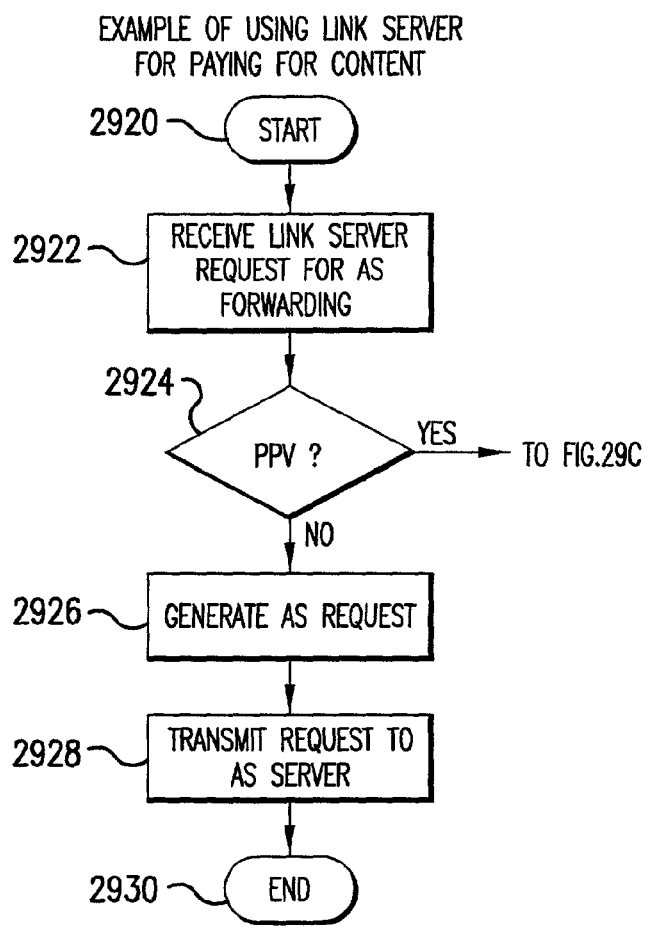

DISTRIBUTED LINK PROCESSING SYSTEM FOR DELIVERING APPLICATION AND MULTI-MEDIA CONTENT ON THE INTERNET

BACKGROUND OF THE INVENTION

1. Technical Field

The present invention relates generally to the distributed construction, processing and management of information designating links or connections used in web pages and/or electronic mail or other distributed data. More specifically, the present invention relates to transforming a client's selection of desired content into a formal request that initiates the provision of the requested content in accordance with the options specified by the developer of said web page and/or electronic mail or other content.

2. Background of the Related Art

FIG. 1 depicts a prior art system disclosed in U.S. Pat. No. 4,873,662 to Sargent, incorporated herein by reference. A user terminal is connected through a publicly switched telephone network to a computer which responsively provides requested content contained in memory B to the user. The end user terminal consists of a display 10 receiving inputs from a character generator read only memory 9 subject to control from the display control 11 and directly from the display control 11 for the display of noncharacter data. The display control 11 also sends signals to the memory control 8 which in turn signals the memory A 7 capable of causing the transmission of a signal to the character generator ROM 9. The memory A 7 receives signals from a modem 6 which in turn receives signals from a signal generator 13 responsively connected to a key pad 12 and isolation and protection hardware 5 connected to the publicly switched telephone network 2, said publicly switched telephone network further connected to the content providing computer 1, said content stored in computer memory B.

FIG. 2 depicts the unit of information transmitted to the user terminal of FIG. 1 by the computer 1. Information is transferred from the computer 1 memory to the memory A 7 of the user terminal in blocks having two parts, said parts consisting of "hidden" information and displayed information. The displayed information consists of 480 16 bit words and the hidden information consists of 32 16 bit words. The display 10 shows the displayed information. The entire block of information from the computer 1 is stored in memory A 7, including the hidden information. The hidden information is used to translate digital key pad entries into the address of the block in the computer 1 memory B that is being requested by the user.

FIG. 3 depicts a system as in FIG. 1 except that the user terminal is augmented to contain memory 14 and logic 16 so that some responses to digital keypad 12 entries are possible without transmitting a signal over the modem 6 through the isolation and protection module 5 and onto the computer 1. The hidden information stored in memory B 14 is retrieved in response to a digital keypad 12 entry transmitted to the memory control 8 and through a connection 15 to memory B 14. Once the information is retrieved from memory B 14 and transmitted to the memory B logic unit 15, the memory logic unit 16 outputs a result through a connection 18 with the signal generator 13 which in turn transmits a signal to the modem 6 which modifies memory A 7, said modification of memory A causing a change in the screen display 10 as a result of causing the read only memory 9 storing a representation of the displayed image to change in response thereto.

Because the Sargent patent requires that the tables providing the correspondence between user supplied digital keys and information block addresses be manually configured and associated with each transmitted block of information, the system, if it could be adapted for use on the Internet, would require a web developer to manually fix the locations of each page of content in the host computer's memory. Moreover, although the Sargent patent envisions that the size of the block of information containing indexed addresses is not limited to 32 words, any system disclosed by the Sargent patent would have some fixed size hidden information block for each page. Thus, even if only one web page out of 1000 required complex addresses taking up 256 words of storage, all 1000 web pages would be required to reserve 256 words for page indexing. In addition, any change in the location of information in the serving computer would require that every page potentially referencing that page be revised to reflect the new location. In a system with hundreds of pages of content, hundreds of manually configured tables would have to be edited. Furthermore, the Sargent patent is restricted to a system which provides no means for multiple content providers to make changes in the way their information is represented. Consequently, each content provider would be dependent on a central computer operator to manage page references. In addition, all of the processing of links is done by a single information server. Thus the invention described in the Sargent patent does not support distributed link processing.

The Judson application WO09715020A1, which corresponds to U.S. Pat. No. 5,572,673 and U.S. Pat. No. 5,737,619, are each incorporated herein by reference, and describe a method of browsing the World Wide Web over the Internet using a client machine supporting a graphical user interface and an Internet browser. The method locally stores, retrieves and outputs information objects to reduce the waiting time normally associated with the download of hypertext documents having high resolution graphics. The method begins, for example, as a web page is being displayed on the graphical user interface, the web page having a link to a hypertext document preferably located at a remote server. In response to the user clicking on the link, the link is activated by the browser to request downloading the hypertext document from the remote server to the graphical user interface of the client. While the client waits for a reply and/or as the hypertext document is being downloaded, the browser displays a previously-cached information object.

FIG. 4 depicts a method of the Judson application for the dynamic display of information objects during linking. In accordance with the method, a current web page is displayed 70. After the current web page is displayed, the information objects associated with the page are saved 72. The system then monitors the user's link activation selections waiting for to be activated 74. If the link is activated, two procedures are executed in parallel. First the client issues a TCP/IP request 76 and subsequently engages in the set up of a protocol for receiving the page referred to by the link. In parallel with said first step, the client retrieves the saved information objects from a previous download of the referenced page 80 and displays that information 82. While the referenced page is being downloaded, the saved version of the reference page is displayed 84. Once the download is complete, the downloaded page is saved 86 and displayed 70, thus restarting this process at the first step.

While the use of this method permits the user to view content from a previously loaded page while the requested page of information is refreshed, the method does not address the delivery of information content that has not been previously displayed. In addition, the method does not simplify the web developers page development task since the method depends on the addressing information manually encoded in the requested page to update the previously stored content. Furthermore, no provision is made in the Judson system to distribute the processing of links to (possibly remote) individual link servers. In a system supporting remote distributed link processing, a specific user request is redirected to a (possibly remote) link server which in turn routes a request to the server hosting the requested content. Although this system provides for local processing of a selected link, the local processing does not result in a further request being issued to a server hosting the requested content. Instead, local processing results in the display of a previously loaded page while the remotely hosted content is retrieved.

The Monier patent, U.S. Pat. No. 6,032,196, incorporated herein by reference, describes a table of web pages which is maintained by requesting a web page, receiving the requested web page, and identifying an address, such as a URL, of the received web page. A locator, such as a fingerprint, which represents the address of the received web page is entered into the table of web pages to maintain the table. The locator has a smaller size than the address.

While this method provides a means for accessing previously stored web pages while minimizing the time needed to test whether a link on a web page has already been retrieved, it does not simplify the process of developing and constructing the pages on a web site. The web developer must physically encode in the html of a web page the canonical URL of a page in order to ensure that the presence or absence of the page in Monier's local page will be properly detected.

Although the Monier patent uses a technique for reducing the size of URL's employed to reference a page, these reduced size tags do not effect the size or complexity of the web pages themselves. Instead, they reduce the possibility that recording failed attempts to locate a page in the local table will lead to excessive space demands. Moreover, in the Monier patent each link selected by the requesting client is processed by the website owner's web server.

In the Broder patent, U.S. Pat. No. 6,073,135, incorporated herein by reference, a server computer is provided for representing and navigating the connectivity of web pages. The web pages include links to other web pages. The links and web pages have associated names (URLs). The names of the Web pages are sorted in a memory of the connectivity server. The sorted names are delta encoded while periodically storing full names as checkpoints in the memory. Each delta encoded name and checkpoint has a unique identification. A list of pairs of identifications representing existent links is sorted twice, first according to the first identification of each pair to produce an inlist, and second according to the second identification of each pair to produce an outlist. An array of elements is stored in the memory and there is one array element for each web page. Each element includes a first pointer to one of the checkpoints, a second pointer to an associated inlist of the Web page, and a third pointer to an associated outlist of the web page. The array is indexed by a particular identification to locate connected web pages.

Although it is possible to use the connectivity server to determine whether two web pages are connected, the method is dependent on the use of a full canonical URL for each page. Consequently the method does not simplify the construction of web pages containing complex links. Moreover, determining whether two web pages are connected does not lead to the construction of address information needed to access streaming application servers.

The object of this invention in the Michael Application, JP10222541A2, which corresponds to U.S. Pat. No. 6,807, 570 B1, and are both incorporated herein by reference, is to attain the high speed access of a web page by a user. The system attempts to achieve this objective by automatically pre-loading another selected web page and an associated graphics file. A client is connected through a communication line with the World Wide Web. A server is provided with a web page access mechanism and program that permits the server, instead of the client, to request web pages from a disk or another server. Then, a web page is read and a link marked as the object of primary load is identified. At that time, when another web page and related graphics corresponding to this link are present and the link is selected, the related graphics are automatically preloaded to the storage device of the client web browser.

Although the Michael patent utilizes a special server for retrieving web pages and their associated graphical content prior to an explicit request of a user, the html reference addresses used to obtain those pages in advance are full canonical URLs. Consequently, the web developer is not spared from having to manage the detailed requests needed to obtain content from a server.

The Bates application, JP11288426A2, which corresponds to U.S. Pat. No. 6,222,541 B1, both of which are incorporated herein by reference, attempts to solve the problem of quickly and efficiently locating and selecting a hyper text link embedded in web page by connecting a memory to one processor and providing a link selecting mechanism inside the memory. In a system, one processor is provided. A memory is connected to the processor. The memory is provided with a web browser, an operating system and a link selection mechanism. The link selection mechanism highlights links embedded in the part of the web page that are within a range of the page visible to the user.

Although highlighting links on a web page reduces the amount of effort required of a user to manually locate the link for selection, this mechanism does not simplify the complexity of the web page addresses used in the web page's underlying HTML source. Consequently, the use of this method would not simplify the underlying process of getting access to distributed content hosted on remote servers. Furthermore, the Bates application does not disclose a system or method for distributed link processing. Each link selected by the user would presumably be directed to the web site owner's web site for conversion to the proper request for remotely distributed content.

The Gustaffson application, WO9921109A3, incorporated herein by reference, describes a method of creating a link in a web page viewed in a browser. The link thereby created leads to a plurality of possible endpoints. The method comprises the steps of providing an address table in the web page host which includes the addresses of possible pages at which a given web page may point and when a user clicks on the link, selecting one of the possible web pages and setting up a connection to that page.

This invention allows a web page developer to redirect a clicking user to one of limited set of web pages. However, the web developer must still manually encode the html addresses. Furthermore, it would still be necessary under this invention to manually construct references to streaming application servers.

The Goodman patent, U.S. Pat. No. 5,999,929, incorporated herein by reference, describes a link referral system including a classification arrangement for classifying web pages that the system that the system retrieves over the World Wide Web. In assigning a link in a web page to a particular classification, the classification arrangement originally establishes the classification using the name for the particular section of the web page in which the link is located. Using statistical analysis of the occurrence of related inks within sections of a number of diverse web pages, some of which are named sections, the system creates classifications of links under both named classifications as well as anonymous classifications of links that co-occur with a high degree of probability. To minimize errors in the statistical analysis, the classification arrangement determines whether different world wide web addresses (so called "URLs") which are used to access the web pages in fact identify the same web page. The classification information is used to supplement web pages retrieved by a client through the link referral system to indicate the availability of related link information from the link referral system. In addition, the link referral system can provide related link information to the client in response to requests, identifying particular links or classifications from the client.

Although this invention provides for the automatic categorization of web pages using statistics based on the distribution of common links, that categorization does not effect the processing associated with the selection of a particular link. While the processing of links described in Goodman may facilitate the computation of the relationships between links, the Goodman patent does not distribute the processing of links selected as a result of that categorization to multiple link servers.

Each of the prior art inventions described above addresses some aspect of managing and processing the links used to access remotely stored information either on the Internet or through a more limited telephone network connection. Yet, in no case do these prior art inventions appreciate the problems we have identified associated with forcing a single centralized server, such as a web server, to process all links that a web developer might use to specify that particular information content is to be supplied to a user. Consequently, web developers relying on the technology of the prior art are subject to a complex content specification task that remains dependent on the features of a particular web server. Providers of innovative content on the Internet, moreover, are dependent on a plurality of independent web servers choosing to adopt system modifications that would enable access to the new content. Furthermore, once the core technology of the invention herein described is made available, we have determined that it can be used to enable the web developer to shift arbitrary web management tasks to a remote server specifically dedicated to performing the task efficiently. For example, a remote link server could handle user accounting for a pay per view system for a plurality of web sites and web servers.

SUMMARY OF THE INVENTION

It is a feature and advantage of the linking or connection system of the present invention that the processing of information retrieval links is distributed to information link servers that are optionally dedicated thereto, each of which manages the transformation of client requests into a form required by a server of the desired content. By distributing link processing to link or connection servers, the web developer is not dependent on any particular server, including a web server, to enable the use of additional options.

It is another feature and advantage of the present invention that an html reference tag construction process is used to translate high level web developer specifications of options into the format requirements of the linking servers. Consequently, the web developer never has to learn the formatting requirements for either link or connection server requests, or the specialized content server requests.

It is a feature and advantage of the present invention that a multi-media distributor, such as a website developer or an individual conducting e-commerce using electronic mail, can provide customers with access to streaming applications without manually managing the formatting requirements of streaming server requests. Since the manual management of formatting requirements can be a source of error, the present invention improves reliability.

It is a feature and advantage of the present invention that requests directed to a link or connection server need not expressly designate a target communication port of said server.

It is a feature and advantage of the present invention that web page components designating information content other than multi-media content may utilize at least one link or connection server of the present invention.

It is a further feature and advantage of the present invention that changes in the format of streaming server references can be handled on the server side. In some cases there would be no need to change the web pages of a website using the linking or connection server of the present invention for streaming application references. Without the present invention, if there were a thousand media clips for which the streaming reference format had changed, the web developer would have to manually edit a thousand media clip reference files.

It is a further feature and advantage of the present invention that new multi-media formats and applications can be rapidly deployed without the need for individual web site owners to wait for their ISP to install a corresponding MIME-type. By obtaining an update from the present invention, the web developer can quickly deploy existing multi-media application content in the new format.

It is a further feature and advantage of the present invention that by separating the process of address translation from the process of web page retrieval, web servers are free to devote scarce computing resources to transmitting web pages. Without the present invention, the ISP hosting a web site would be required to run a computer program which, when an incoming request for a streaming application was received, would have to access a manually configured file in order to complete the web site consumer's media request. For a website with a substantial number of pages and streaming applications, a web server could become too busy to serve its primary page delivery function.

It is a further feature and advantage of the present invention that the web developer is freed from having to manually manage the visual features of the screen in which the streaming application is considered. Instead, the present invention provides for the automatic generation of complex html reference tags based on the result of a web developer's choice of presentation options.

It is a further feature and advantage of the present invention that all incoming requests for streaming applications are processed by a dedicated server that is able to confirm that the requesting consumer has obtained the proper authorization, either through a pay per view system, or through checking features of the incoming request, such as its IP address or a form provided secure identification key.

It is a further feature and advantage of the present invention that the task of migrating from one ISP to another is simplified by the absence of specialized streaming server translation files from the files that need to be transferred along with the web pages.

It is a further feature and advantage of the present invention that the web developer is freed from having to run specialized scripts for tracking the usage of streaming application content. Because the linking or connection server of the present invention is called whenever multi-media content is referenced, that information need not be maintained by the web developer's web server.

To achieve these advantages, the present invention provides a computer program which is used to automatically generate reference tags with numerous options specifying a linking and/or connection server of the present invention and a computer responsively connected to the Internet for the purpose of serving requests by users making selections on web pages constructed by web developer subscribers to the present invention. Also provided is a modular translation procedure for a link or connection server of the present invention by which incoming requests with the proper structure and authorization are transformed into requests for streaming application servers to stream the requested application to the end user.

The system of the present invention enables the Web site developer to link or connect Web pages (or e-mail) to media files on streaming servers with a new level of simplicity. This includes the linking of, for example, RealNetwork's RealMedia™ files, Microsoft's Windows Media™ files and Apple's QuickTime™ files. Before the system of the present invention, a Web site developer had to manage three separate files to enable a media file to stream to a Web page: a) the Web page from which the developer desires to provide the end-user with access to the media file over the Internet, b) a "reference file" which contains the Internet address to the media file, and c) the media file. With the system of the present invention, the Web site developer eliminates advantageously eliminates, for example, step "b" (the manual creation and uploading of one reference file for each streaming media file) and can now link the Web page directly to the media file.

The system of the present invention enables this process by allowing the Web site developer to use, for example, a basic hyperlink ("href") that is directed to the link or connection server on the Internet. The system of the present invention interprets the standard hyperlink, and automatically generates the streaming media format's reference file's information, and sends that information (normally found inside the reference file) to the streaming media server hosting the appropriate format (RealNetworks™, Windows Media™ or QuickTime™). Advantageously, the system of the present invention frees the web developer from having to include specialized port specifications and parameters in html reference tags. By moving the manual client-side process in creating streaming media "reference files" over to the server-side, the system of the present invention is able to automate this process in real-time online for all three formats, producing the same playback results for the end-user. For a Web site developer managing thousands of media files on a streaming media server, the process of having to manage matching "references files" on a Web server for each media file can become overwhelming.

Another benefit of the system of the present invention is that under the current linking method, the Internet Service Provider (ISP) must properly configure the MIME-types on the Web server to recognize the "reference file" for each streaming media format (RealMedia™, Windows Media™, QuickTime™). As the system of the present invention dynamically links directly from the Web page to the Streaming servers, the absence of using the "reference files" also removes the need for the ISP to properly configure the MIME-types on the Web server. We have determined that many ISPs have failed to, or refuse to, install one or more streaming media MIME types on their Web servers.

With the system of the present invention, the application is optionally, and advantageously packaged and marketed as an individual software product or provided as an online service. The system of the present invention is optionally configured to work with other services such as Internet pay-per-view, ad-insertion services, and the emerging streaming services.

The process of the present invention works through an application that, for example, translates the incoming hyperlink ("href" link) from a Web page into a streaming media link understood by the appropriate streaming server application. Let's assume a Web site developer owns the Web site, www-.MyWebSite.com and wants to stream media on his Web site using PlayStream™'s service. The examples below provide a "before" and "after" scenario of what is required to perform this method, for each format. We will also assume the user has established an account on a streaming server, with the account named "MyAccount." On Playstream™'s servers is a file directory that is named "MyAccount." This is the directory where the user will upload audio and video files that are to be streamed.

Let's assume that a user has acquired a video commercial clip, and has captured (transferred) this file into the user's computer. The user decides to name this file: "MyMediaClip" and wants to stream it on the Web site located at www.MyWebSite.com. The user desires to enable this media file to playback over the Internet on the three most popular Players: Microsoft Windows Media™ Player, RealNetworks RealPlayer™, and Apple's QuickTime™ Player.

With the media file in the user's computer, the user is now ready to "prepare" the media file for streaming. To do this, the user must obtain the proper software from Microsoft, RealNetworks™ or Apple, and use this software to "convert" this media file into that format for playback over that company's "Player." This conversion process is called "encoding."

For example, the user obtains Microsoft's Windows Media™ Encoder Software, and uses this software to convert the file, MyMediaFile into a Windows Medi™ a file that will stream from a Microsoft Windows Media™ Server over the Internet, named "MyMediaFile.wma" (the extension ".wma" designates that this file has been encoded for a Windows Media™ Server). Next, this user obtains RealNetworks™' "encoder" and converts the file "MyMediaFile" into a RealMedia™ file, named "MyMediaFile.rm" (the extension ".rm" designates that this file has been encoded for a RealNetworks™ Server). Next this user obtains Apple's QuickTime™ "encoder" and converts the file "MyMediaFile" into a QuickTime™ file named "MyMediaFile.mov" (the extension ".mov" designates that this file has been encoded for an Apple QuickTime™ Server). The user should finally have a scenario that resembles the following (note: hyperlink notation presented in the examples that follow in this specification include intentional misspellings in order to not include potentially embedded hyperlinks and other browser-executable code the specification. In particular, --\\-- has been substituted for the conventional "//" to avoid computer readable embedded hyperlinks and/or other browser-executable code):

Original Media File on Local Computer:
    MyMediaFile
    Media Files Uploaded to Streaming Servers:
        MyMediaFile.wma (Windows Media™ server)
           MyMediaFile.rm (RealMedia™ server)
           MyMediaFile.mov (QuickTime™ server)
    Reference Files Uploaded to Web Server:
        MyASXFile.asx
        MyRAMfile.ram
        MyMOVfile.mov
    Web Page on Web Server:
        MyWebPage.html (which contains the following embedded links):

http:\\www.MyWebSite.com/MyASXFile.asx
http:\\www.MyWebSite.com/MyRAMFile.asx
http:\\www.MyWebSite.com/MyMOVFile.asx To enable this file to stream on www.MyWebSite.com in a Windows Media™ Player, the user must first create a "reference" file (which is a simple "text" file). Give this "reference" file any name, but add the extension ".asx" at the end of it. For example, let's create a "reference" file and name it "MyASXfile.asx." Next, the user must type in the Internet address, or the URL, as it is known inside of this text file, that points to the Windows Media™ Server. In this case, the Windows Media™ Server at PlayStream™ is located at the following address: mms:\\win.playstream.com and with the assigned account for this user, the media will stream from mms:\\win.playstream.com/MyAccount/MyMediaFile.wma. Thus, to enable this file to stream over the Internet, the user would type this address into the reference file, "MyASXfile.asx." After doing that, the user saves this reference file and upload it onto the Web server where the Web site's Web pages are located. Create a standard hyperlink on a Web page, that points to this ASX file. For example, this would probably look like http:\\www.MyWebSite.com/MyASXfile.asx in the Web page. Next, the user uploads the media file, "MyMediafile.wma" into the user's storage account on the streaming server (in this example, that would be at PlayStream™). The clip should now be ready for viewing in Microsoft's Windows Media™ Player.

To enable this same file to stream on www.MyWebSite.com in a QuickTime™ Player, the user must go through a different process than for Microsoft's Windows Media™. To link QuickTime™ content, the Web developer must first embed a static movie into the Web page at www.MyWebSite.com. To create this static movie, the user first opens the image of the link to be used in the QuickTime™ Player. While still in the QuickTime™ Player, save it as a "self-contained movie." This image movie will reside on the Web server. Next, use an embed tag in the Web Page that looks like this:

<embed src="image movie on your web server"
type="video/quicktime"
height="image movie height"
width="image movie width"
autoplay="true" controller="false"
href="rtsp:\\quick.playstream.com/MyAccount/MyMOVFile.mov"
target="quicktimeplayer">

Note: Apple provides for two streaming technologies: Progressive Download & True Streaming. The difference between the two technologies is that "progressive download" is not a streaming media technology, but an actual download of the media file.

To enable this same file to stream on www.MyWebSite.com in a RealNetworks RealPlayer™, the user must first create a "reference" file (which is a simple "text" file). Give this "reference" file any name, but add the extension ".ram" at the end of it. For example, the user creates a "reference" file and names it "MyRAMfile.ram." Next, the user must type in the Internet address, or the URL, as it is known inside of this text file, that points to the RealNetworks™ RealServer. In this case, the RealServer at PlayStream™ is located at the following address: rtsp:\\real.playstream.com and with the assigned account for this user, the media will stream from the URL: rtsp:\\real.playstream.com/MyAccount/MyMediaFile.rm. Thus, to enable this file to stream over the Internet, the user would type this address into the reference, "MyRAMfile.ram." After doing that, the user would save this reference file, and upload it onto the Web server where the Web site's Web pages are located. Next, the user would create a standard hyperlink on a Web page, that points to this ASX file. For example, this would probably look like http:\\www.MyWebSite.com/MyRAMfile.ram in the Web page. Next, the user would upload the media file, "MyMediafile.ram" into the user's storage account on the streaming server (in this example, that would be at PlayStream™). The clip should now be ready for viewing in RealNetworks RealPlayer™.

The present invention provides a unified solution that enables all formats to stream without having to deploy "reference files." In doing this, the system of the present invention may use Microsoft's VBScript written in Microsoft's ASP (Active Server Pages), running on Microsoft's Internet Information Server (IIS 5.0). The system of the present invention may also be implemented as a stand alone application in Visual Basic. However, other general purpose programming platforms known to those of skill in the art may also be used. The present invention creates this unified application as a separate application from a streaming media server, thereby enabling the present invention to provide this "reference file" auto-generation service to remote streaming servers on the Internet (i.e.: the present invention could optionally provide the service for other ISPs who desire to manage their own servers, but would like to offer their clients an easy translation service that worked for all three formats).

For the Web site developer who desires to stream the media file, MyMediaFile, in all three formats (Windows Media™, RealMedia™ and QuickTime™) using the system of the present invention, the Web site developer uploads the three media files into their Account and uses a standard hyperlink on the Web Page (or embedded into e-mail).

Under one embodiment of the present invention, a specialized port number and the name of the link or connection server is provided as a parameter:
http:\\easylink.playstream.com:8080/easylink/MyAccount/MyMediaFile.wma
RealMedia™
http:\\easylink.playstream.com:8080/easylink/MyAccount/MyMediaFile.rm
QuickTime™
http:\\easylink.playstream.com:8080/easylink/MyAccount/MyMediaFile.mov Under an alternative embodiment of the present invention, no specialized port is specified in the hyperlink referencing the link server. Also, there is no need to add the name of the link server as a parameter. The hyperlinks would thus be:
Windows Media™
http:\\easylink.playstream.com/MyAccount/MyMediaFile.wma
RealMedia™
http:\\easylink.playstream.com/MyAccount/MyMediaFile.rm
QuickTime™
http:\\easylink.playstream.com/MyAccount/MyMediaFile.mov The system of the present invention begins with the standard http:\\ protocol that is used for accessing Web pages on the World Wide Web, followed by the link or connection server address on the Internet, followed by the Web site developer's account (in the case, "MyAccount"), followed by the file name (with the appropriate file extension to depict the format). The link or connection server receives the incoming HTTP link, then translates this link into the "reference file" information that would have been found inside the "reference file," then sends that translated instruction to the appropriate streaming server application (either Windows Media™ Server, RealServer, or QuickTime™ Server). It accomplishes this by examining the file name extension at the end of the instruction (i.e.: if the link ends in a ".mov" extension, the system of the present invention routes that request to a Quick-Time™ server). At that point, the streaming server will make contact with the end-user's "Player" and begin streaming the media file.

Thus, the system of the present invention's core technology is about automatically generating the required streaming media "reference file's" information on the server side, rather than requiring the Web site developer to create and manage the "reference files" manually on the client side. By positioning the system of the present invention between the Web site developer's Web site and the streaming media servers, the system of the present invention is able to auto-produce each streaming media format's required reference file on the fly, and then auto-discard it after the media file has been activated for playback.

The present invention's server-side "reference file" conversion application also applies when streaming media ad-insertion and pay-per-view technologies are applied. Also, the present invention is able to auto-generate the link or connection server reference links online for Web site developers to copy and paste into a Web page, thereby freeing the Web site developers from having to type the information themselves.

In a first embodiment of the present invention, a system for delivering streaming multi-media content over the Internet includes at least one client workstation, responsively interfaced to the Internet wherein link encoded web pages and/or electronic mail messages are displayed and the at least one client workstation enabling a user to select a link resulting in the transmission of a request over the Internet for receiving the multi-media content, the link specifying the multi-media content and format associated therewith; at least one linking server hosting at least one link conversion process, and receiving the request for the multi-media content from the at least one client workstation, the request optionally comprising specification of the multi-media content in at least one of a banner ad, a pre-clip, a post-clip, and a web page embedding, the at least one linking server generating another request to stream the multi-media content to the at least one client workstation, the another request automatically formatted or preformatted to be in conformity at least with the format of the multi-media content via the at least one link conversion process; and at least one streaming multi-media server storing the multi-media content, and responsive to the another request received from the at least one linking server delivering the multi-media content over the Internet to the at least one client workstation.

The present invention also includes the first embodiment wherein the link specifying the multi-media content and the format associated therewith further includes specification of the at least one linking server for pre-processing the request.

The present invention further includes the first embodiment wherein the request expressly specifies a communications port of the at least one linking server.

In addition, the present invention also includes the first embodiment wherein the request does not expressly specify a communications port of the at least one linking server.

The present invention also includes the first embodiment wherein the at least one linking server includes a database for recording each the request.

The present invention also includes the first embodiment wherein the linking server processes the request only if the requesting client pays for the requested multi-media content.

The present invention also includes the first embodiment wherein the linking server processes the request only if the requesting client is authorized to receive the requested multi-media content.

The present invention also includes the first embodiment wherein the linking server hosts the conversion processes for requests for multi-media content in a plurality of formats including without limitation Windows Media™, RealNetworks™, QuickTime™, MP3 and MPEG formats.

The present invention also includes the first embodiment wherein the web pages are hosted on a web server, wherein the web server only serves requests for content consisting of web pages.

The present invention also includes the first embodiment wherein the multi-media content is at least one of a RealNetworks™, QuickTime™, Windows Media™, MPEG and MP3 multi-media clip.

The present invention also includes the first embodiment wherein the link specifying the multi-media content and the format associated therewith specifies one of a plurality of different formats.

The present invention also includes the first embodiment wherein the link conversion process further comprises a standalone application specified in at least one of Visual Basic and Visual Basic Script under Microsoft ASP.

The present invention also includes the first embodiment wherein the at least one link conversion process is a plurality of link conversion processes.

The present invention also includes the first embodiment wherein the at least one linking server is such that a single server hosts a plurality of the at least one link conversion processes and the single server processes requests for a plurality of media formats corresponding to each link conversion process.

In addition, the present invention further includes a system for serving media content over the Internet comprising: at least one client workstation, responsively interfaced to the Internet wherein link encoded web pages and/or electronic mail messages are displayed and the at least one client workstation enabling a user to select a link resulting in the transmission of a request over the Internet for receiving the media content, the link specifying the media content and format associated therewith; at least one linking server hosting at least one link conversion process, and receiving the request for the media content from the at least one client workstation, the request optionally comprising specification of the media content in at least one of a banner ad, a pre-clip, a post-clip, and a web page embedding, the at least one linking server generating another request to serve the media content to the at least one client workstation, the another request automatically formatted or preformatted to be in conformity at least with the format of the media content via the at least one link conversion process; and at least one media content server storing the media content, and responsive to the another request received from the at least one linking server delivering the media content over the Internet to the at least one client workstation.

The present invention also includes a system for serving non-media content designated in requests specified in web page components over the Internet comprising: at least one client workstation, responsively interfaced to the Internet wherein link encoded web pages and/or electronic mail messages are displayed and the at least one client workstation enabling a user to select a link resulting in the transmission of a request over the Internet for receiving the non-media content, the link specifying the non-media content and the options for serving web page components associated therewith; at least one linking server hosting at least one link conversion process, and receiving the request for the non-media content from the at least one client workstation, the request optionally comprising specification of the non-media content in at least one of a banner ad, a pre-clip, a post-clip, and a web page embedding, the at least one linking server generating another request to serve the non-media content to the at least one client workstation, the another request automatically configured or preconfigured to be in conformity at least with the configuration of the non-media content via the at least one link conversion process; and at least one non-media content server hosting the non-media content, and responsive to the another request received from the at least one linking server delivering the non-media content over the Internet to the at least one client workstation.

In addition, the present invention includes a second embodiment including a method of processing requests for multi-media content by at least one client workstation over the Internet comprising the steps of: uploading the multi-media content to at least one multi-media content server; generating at least one web page and/or electronic mail message, wherein the at least one web page and/or electronic mail message includes a request for the multi-media content including at least one link specifying at least one linking server responsive to a user request; distributing the at least one web page and/or at least one electronic mail message to the at least one client workstation over the Internet; receiving by the at least one linking server the request from the at least one client workstation for the multi-media content via the at least one link, the request from the at least one client workstation optionally comprising specification of the multi-media content in at least one of a banner ad, a pre-clip, a post-clip, and a web page embedding; and generating another request by the at least one linking server to stream the multi-media content to the at least one client workstation or other workstation, the another request automatically formatted or preformatted to be in conformity at least with the format of the multi-media content.

The present invention also includes the second embodiment wherein the link specifying the media content and the format associated therewith further includes specification of the at least one linking server for pre-processing the request.

The present invention also includes the second embodiment wherein the request expressly specifies a communications port of the at least one linking server.

The present invention also includes the second embodiment wherein the request does not expressly specify a communications port of the at least one linking server.

The present invention also includes the second embodiment wherein the at least one linking server includes a database for recording each request.

The present invention also includes the second embodiment wherein the linking server processes the request only if the requesting client pays for the requested media content.

The present invention also includes the second embodiment wherein the linking server processes the request only if the requesting client is authorized to receive the requested media content.

The present invention also includes the second embodiment wherein the linking server hosts the conversion processes for requests for media content in a plurality of formats including without limitation Windows Media™, RealNetworks™, QuickTime™, MP3 and MPEG formats.

The present invention also includes the second embodiment wherein the web pages are hosted on a web server, wherein the web server only serves requests for content consisting of web pages.

The present invention also includes the second embodiment wherein the media content is at least one of a RealNetworks™, QuickTime™, Windows Media™, MPEG and MP3 multi-media clip.

The present invention also includes the second embodiment wherein the link specifying the media content and the format associated therewith specifies one of a plurality of different formats.

The present invention also includes the second embodiment wherein the link conversion process further comprises at least one of a standalone application specified in Visual Basic and Visual Basic Script under Microsoft ASP.

The present invention also includes the second embodiment wherein the at least one link conversion process is a plurality of link conversion processes.

The present invention also includes the second embodiment wherein the at least one linking server is such that a single server hosts a plurality of the at least one link conversion processes and the single server processes requests for a plurality of media formats corresponding to each link conversion process.

In addition, the present invention includes a method of processing requests for media content by at least one client workstation over the Internet comprising the steps of: uploading the media content to at least one media content server; generating at least one web page and/or electronic mail message, wherein the at least one web page and/or electronic mail message includes a request for the media content including at least one link specifying at least one linking server responsive to a user request; distributing the at least one web page and/or at least one electronic mail message to the at least one client workstation over the Internet; receiving by the at least one linking server the request from the at least one client workstation for the multi-media content via the at least one link, the request from the at least one client workstation optionally comprising specification of the media content in at least one of a banner ad, a pre-clip, a post-clip, and a web page embedding; and generating another request by the at least one linking server to stream the media content to the at least one client workstation or other workstation, the another request automatically formatted or preformatted to be in conformity at least with the format of the multi-media content.

The present invention further includes a method of processing requests for non-media data content by at least one client workstation over the Internet comprising the steps of: uploading the non-media data content to at least one non-media data content server; generating at least one web page and/or electronic mail message, wherein the at least one web page and/or electronic mail message includes a request for the non-media data content including at least one link specifying at least one linking server responsive to a user request; distributing the at least one web page and/or at least one electronic mail message to the at least one client workstation over the Internet; receiving by the at least one linking server the request from the at least one client workstation for the non-media data content via the at least one link, the request from the at least one client workstation optionally comprising specification of the non-media data content in at least one of a banner ad, a pre-clip, a post-clip, and a web page embedding; and generating another request by the at least one linking server to transmit the non-media data content to the at least one client workstation or other workstation, the another request automatically configured or preconfigured to be in conformity at least with the configuration requirements of the non-media data content.

Additionally, the present invention includes a third embodiment that includes a system for distributing at least one of information and information services over a computer network comprising: at least one client workstation responsively interfaced to the computer network wherein link encoded web pages and/or electronic mail messages are displayed and the at least one client workstation enabling the selection of a link resulting in the transmission of a request over the computer network for the at least one of information and information services; at least one connection processor responsively interfaced to the computer network and hosting at least one connection conversion process, the at least one connection processor receiving the request from at least one client workstation for the at least one of information and information services and applying the at least one connection conversion process to generate at least one other request for the at least one of information and information services and transmit the at least one other request over the computer network; and at least one server responsively interfaced to the computer network and hosting the at least one of information and information services, the at least one server receiving the at least one other request to deliver at least one of information and information services over the computer network to the at least one requesting client workstation.

The present invention also includes the third embodiment wherein the computer network is the Internet.

The present invention also includes the third embodiment wherein the at least one information and information services is streaming multi-media content.

The present invention also includes the third embodiment wherein the at least one information and information services is media content.

The present invention also includes the third embodiment wherein the at least one information and information services is non-media content.

The present invention also includes the third embodiment wherein the link specifying the at least one of information and information services and the format associated therewith further includes specification of the at least one connection processor for pre-processing the request.

The present invention also includes the third embodiment wherein the request expressly specifies a communications port of the at least one connection processor.

The present invention also includes the third embodiment wherein the request does not expressly specify a communications port of the at least one connection processor.

The present invention also includes the third embodiment wherein the at least one connection processor includes a database for recording each request.

The present invention also includes the third embodiment wherein the at least one connection processor processes the request only if the requesting client pays for the requested at least one of information and information services.

The present invention also includes the third embodiment wherein the connection processor processes the request only if the requesting client is authorized to receive the requested at least one of information and information services.

The present invention also includes the third embodiment wherein the connection processor hosts the conversion processes for requests for at least one of information and information services in a plurality of formats including Windows Media™, RealNetworks™, QuickTime™, MP3 and MPEG formats.

The present invention also includes the third embodiment wherein the web pages are hosted on a web server, wherein the web server only serves requests for content consisting of web pages.

The present invention also includes the third embodiment wherein the at least one of information and information services is at least one of a RealNetworks™, QuickTime™, Windows Media™, MPEG and MP3 multi-media clip.

The present invention also includes the third embodiment wherein the link specifying the multi-media content and the format associated therewith specifies one of a plurality of different formats.

The present invention also includes the third embodiment wherein the link conversion process further comprises at least one of a standalone application specified in Visual Basic and Visual Basic Script under Microsoft ASP.

The present invention also includes the third embodiment wherein the at least one link conversion process is a plurality of link conversion processes.

The present invention also includes the third embodiment wherein the at least one linking server is such that a single server hosts a plurality of the at least one link conversion processes and the single server processes requests for a plurality of media formats corresponding to each the link conversion process.

In addition, the present invention includes a fourth embodiment including a method for distributing at least one of information and information services over a computer network comprising the steps of: uploading at least one of information and information services to at least one server; generating at least one of a web page and an electronic mail message, wherein the at least one web page and electronic mail message contains at least one link specifying a connection processor; distributing the at least one web page and electronic mail message to at least one client workstation over the computer network; receiving over the computer network a request for at least one of information and information services, wherein the connection processor receives the request for the at least one of information and information services; identifying the at least one of information and information services requested; generating other requests to satisfy the at least one of information and information services; and transmitting the generated other requests over the computer network to at least one of information and information services server.

The present invention includes the fourth embodiment wherein the computer network is the Internet.

The present invention includes the fourth embodiment wherein the at least one information and information services is streaming multi-media content.

The present invention includes the fourth embodiment wherein the at least one information and information services is media content.

The present invention includes the fourth embodiment wherein the at least one information and information services is non-media content.

The present invention includes the fourth embodiment wherein the request for at least one of information and information services expressly specifies a communications port of the connection processor.

The present invention includes the fourth embodiment wherein the request for at least one of information and information services does not expressly specify a communications port of the connection processor.

The present invention includes the fourth embodiment wherein the connection processor includes a database for recording each request.

The present invention includes the fourth embodiment wherein the connection processor processes the request for at least one of information and information services only if the requesting client pays for the requested at least one of information and information services.

The present invention includes the fourth embodiment wherein the connection processor processes the request for at least one of information and information services only if the requesting client is authorized to receive the requested at least one of information and information services.

The present invention includes the fourth embodiment wherein the connection processor generates the other requests for at least one of information and information services in a plurality of formats including Windows Media™, RealNetworks™, QuickTime™, MP3 and MPEG formats.

The present invention includes the fourth embodiment wherein the web pages are hosted on a web server which only processes requests for web pages.

The present invention includes the fourth embodiment wherein the at least one of information and information services is at least one of a RealNetworks™, QuickTime™, Windows Media™, MPEG and MP3 media clip.

The present invention includes the fourth embodiment wherein the connection processor generates other requests for at least one of information and information services in a plurality of distinct formats.

The present invention includes the fourth embodiment wherein the link conversion process further comprises at least one of a standalone application specified in Visual Basic and Visual Basic Script under Microsoft ASP.

The present invention includes the fourth embodiment wherein the connection processor hosts a plurality of processes for generating other requests in a plurality of distinct formats.

The present invention further includes a system for distributing website specification including at least one web page providing at least one of information and information services over a computer network comprising: a web server responsively connected to the computer network, the web server for hosting the website; a web development workstation for specifying the at least one web page of the website, the web development workstation responsively connected to the computer network; a computer process hosted on the web development workstation for constructing at least one link specifying a connection processor; another computer process hosted on the web development workstation for embedding the at least one link into the at least one web page; a network interface for sending the at least one web page from the web development workstation to the web server; a client workstation responsively connected to the computer network wherein the client workstation originates at least one request for the at least one web page and at least one request for at least one of information and information services by specifying a selection, the selection resulting in the transmission of the at least one link over the computer network; another computer process hosted on the connection processor, receiving the at least one link and converting the at least one link to an other at least one of information and information services request, the request specifying at least one server; and a network interface for transmitting the other at least one of information and information services request to the server.

Additionally the present invention includes a method for distributing website specification or electronic mail message specification for processing a request for at least one of information and information services over a computer network to a connection processor comprising the steps of: applying a computer process to a specification of display options for at least one of information and information services resulting in the generation of a link comprising the specification of the display options and a reference to the connection processor; embedding the link into at least one of the website and electronic mail message; distributing the link embedded in the at least one of the website and electronic mail message to at least one client workstation; receiving the link by the connection processor resulting from the request for at least one of information and information services generated by the at least one client workstation; and applying a computer process hosted on the connection processor to convert the specification of display options for the connection processor into an other request for at least one server to satisfy the request for at least one of information and information services. By distributing the specification of a web site, the web developer is freed to specify options at a high level of abstraction, leaving a connection processor with the task of generating the detailed code that will result in the delivery of the requested content.

In addition, the present invention includes a system for optimizing the distribution of at least one of information and information services over a computer network comprising: at least one client workstation, responsively interfaced to the computer network wherein at least one of a link encoded web page and an electronic mail message are displayed and the at least one client workstation enabling a user to select a link resulting in the transmission of a request over the computer network for receiving the at least one of information and information services; at least one connection processor responsively interfaced to the computer network and hosting at least one connection conversion process, the at least one connection processor receiving the request from at least one client workstation for the at least one of information and information services and applying the at least one connection conversion process to generate at least one other request for the at least one of information and information services and transmit the at least one other request over the computer network, the at least one other request responsive to the requirements of a dynamic resource distribution optimization program responsive to changes in network demand for the at least one of information and information services; and at least one server responsively interfaced to the computer network and hosting the at least one of information and information services, the at least one server receiving the at least one other request to deliver at least one of information and information services over the computer network to the at least one requesting client workstation;

The present invention additionally includes a method for optimizing the distribution of at least one of information and information services over a computer network comprising the steps of: uploading the at least one of information and information services to at least one server; generating at least one of a web page and an electronic mail message, wherein the at least one web page and electronic mail message contains at least one link referencing a connection processor and encoding at least one of information and information services display; distributing the at least one web page and electronic mail message over the computer network; receiving, over a computer network, a request for at least one of information and information services, wherein receiving the request for the at least one of information and information services is performed by a connection processor; generating at least one of another request for the at least one of information and information services responsive to the requirements of a dynamic resource distribution optimization program responsive to changes in network demand for the at least one of information and information services; and transmitting the generated requests over the computer network to the at least one server.

The present invention further includes, in a system for distributing at least one of information and information services over a computer network wherein multi-media content is uploaded to at least one multi-media content server, a method comprising the steps of: generating a request for the multi-media content including at least one link specifying at least one linking server inserted in at least one web page and/or electronic mail message, responsive to a user request, the at least one web page and/or at least one electronic mail message to be distributed to at least one client workstation over the Internet; receiving by the at least one linking server the request from the at least one client workstation for the multi-media content via the at least one link, the request from the at least one client workstation optionally comprising specification of the multi-media content in at least one of a banner ad, a pre-clip, a post-clip, and a web page embedding; and generating another request by the at least one linking server to stream the multi-media content to the at least one client workstation or other workstation, the another request automatically formatted or preformatted to be in conformity at least with the format of the multi-media content.

The invention herein described also includes, in a system for distributing at least one of information and information services over a computer network wherein multi-media content is uploaded to at least one multi-media content server, a computer data signal embodied in a carrier wave comprising the functions of: a first program code generating a request for the multi-media content including at least one link specifying at least one linking server inserted in at least one web page and/or electronic mail message, responsive to a user request, the at least one web page and/or at least one electronic mail message to be distributed to at least one client workstation over the Internet; a second program code receiving by the at least one linking server the request from the at least one client workstation for the multi-media content via the at least one link, the request from the at least one client workstation optionally comprising specification of the multi-media content in at least one of a banner ad, a pre-clip, a post-clip, and a web page embedding; and a third program code generating another request by the at least one linking server to stream the multi-media content to the at least one client workstation or other workstation, the another request automatically formatted or preformatted to be in conformity at least with the format of the multi-media content.

Additionally, the present invention includes, in a system for distributing at least one of information and information services over a computer network wherein at least one of information and information services is uploaded to at least one server, a method comprising the steps of: generating at least one of a web page and an electronic mail message, wherein the at least one web page and/or electronic mail message, responsive to a user request, contains at least one link specifying a connection processor, the at least one web page and/or at least one electronic mail message to be distributed to at least one client workstation over the computer network; receiving by the connection processor over the computer network a request for at least one of information and information services, wherein the connection processor receives the request for the at least one of information and information services, identifying by the connection processor the at least one of information and information services requested and generating other requests to satisfy the at least one of information and information services; and transmitting the generated other requests over the computer network to at least one of information and information services server.

The present invention also includes, in a system for distributing at least one of information and information services over a computer network wherein at least one of information and information services is uploaded to at least one server, a computer data signal embodied in a carrier wave comprising the functions of: a first program code generating at least one of a web page and an electronic mail message, wherein the at least one web page and/or electronic mail message, responsive to a user request, contains at least one link specifying a connection processor, the at least one web page and/or at least one electronic mail message to be distributed to at least one client workstation over the computer network; a second program code receiving by the connection processor over the computer network a request for at least one of information and information services, wherein the connection processor receives the request for the at least one of information and information services, a third program code identifying by the connection processor the at least one of information and information services requested and generating other requests to satisfy the at least one of information and information services; and a fourth program code transmitting the generated other requests over the computer network to at least one of information and information services server.

Also, the present invention includes a method for distributing website specification and/or electronic mail message specification for processing a request for at least one of information and information services over a computer network to a connection processor comprising the steps of: generating a link representing a user's specification of display options for at least one of information and information services, wherein the link points to the connection processor, wherein the link is embedded by the user into at least one of the website and/or electronic mail message and distributed to at least one client workstation; receiving the link by the connection processor resulting from the request for at least one of information and information services generated by the at least one client workstation; and generating by the connection processor another request for at least one server to satisfy the request for at least one of information and information services.

The present invention further includes, in a system for distributing website specification and/or electronic mail message specification for processing a request for at least one of information and information services over a computer network to a connection processor, a computer data signal embodied in a carrier wave comprising the functions of: a first program code generating a link representing a user's specification of display options for at least one of information and information services, wherein the link points to the connection processor, wherein the link is embedded by the user into at least one of the website and/or electronic mail message and distributed to at least one client workstation; a second program code receiving the link by the connection processor resulting from the request for at least one of information and information services generated by the at least one client workstation; and a third program code generating by the connection processor another request for at least one server to satisfy the request for at least one of information and information services.

Although many features and advantages of the system of the present invention have been expressly stated, there are other features and advantages that have been disclosed in this patent. Moreover, the system of the present invention is not limited to the embodiments expressly described. Variations on those embodiments will be apparent from the disclosure to all those skilled in the art.

Where herein reference is made to information, information includes without limitation data, voice data and media content and the signals encompassing the data, voice data and media content.

There has thus been outlined, rather broadly, the important features of the invention in order that the detailed description thereof that follows may be better understood, and in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

Any such, those skilled in the art will appreciate that the conception upon which this disclosure is based may readily be utilized as a basis for the designing of other structures, methods and systems for carrying out the several purposes of the present invention. It is important therefore that the claims be regarded as including such equivalent constructions insofar as they do not depart from the spirit and the scope of the present invention.

Further, the purpose of the foregoing abstract is to enable the U.S. Patent and Trademark Office and the public generally and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty which characterize the invention are pointed out with particularity in the claims annexed to and forming a part of this disclosure. For a better understanding of the invention, its operating advantages and the specific objects attained by its uses, reference should be made to the accompanying descriptive matter in which there is illustrated preferred embodiments of the invention.

BRIEF DESCRIPTION OF THE DRAWINGS

FIG. 1 depicts a prior art system which transmits the address of a requested block of information in response to the entry of simplified digital information in a key pad.

FIG. 2 (prior art) depicts a block of information in the system depicted in FIG. 1, showing the fixed sized block of information used to store the address corresponding to digital keypad entries.

NOTATIONS AND NOMENCLATURE

Figure 3:
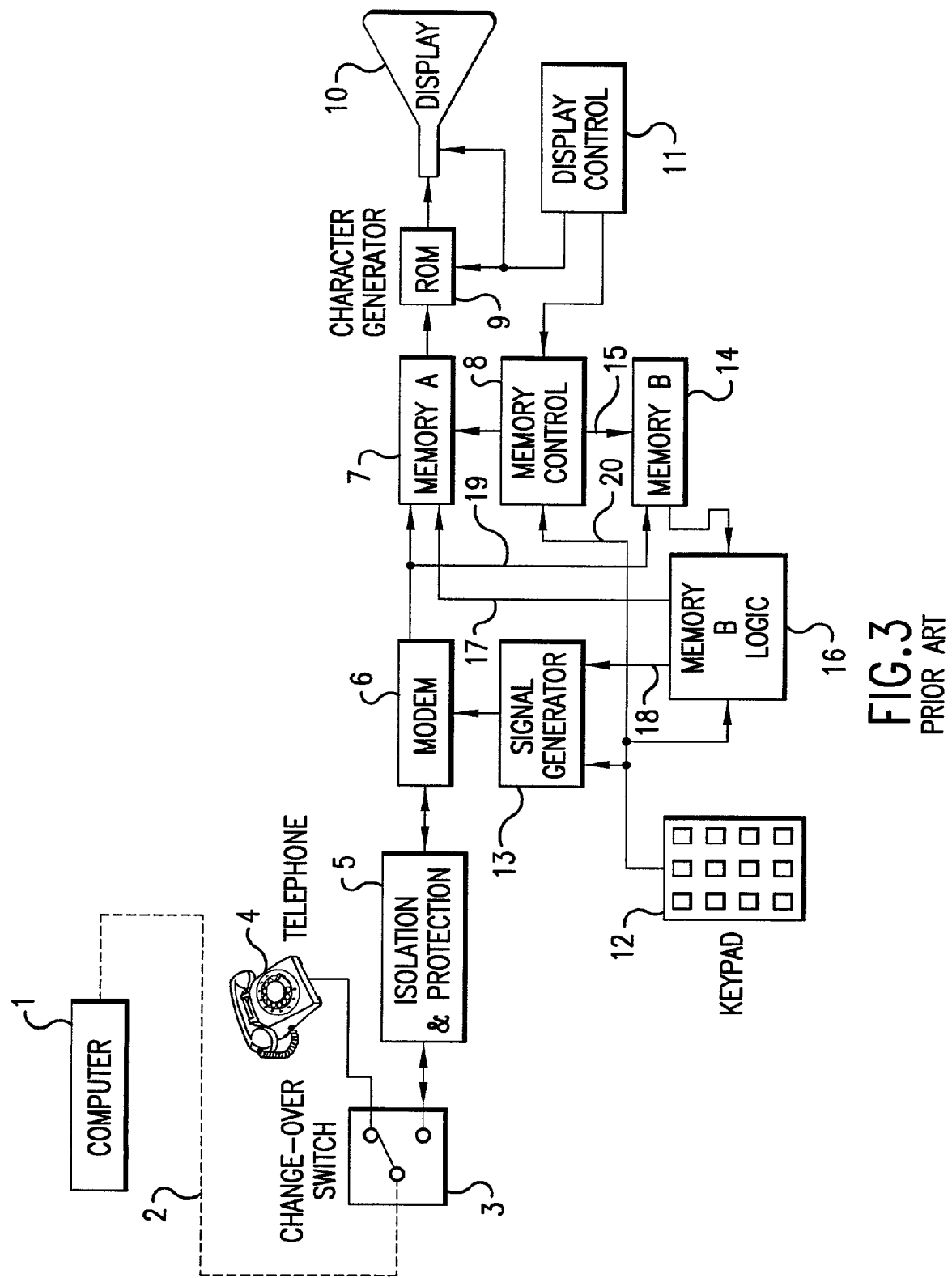
FIG. 3 (prior art) shows a system for enabling the retrieval of blocks of information by completing responses with information contained in hidden memory 14. Unlike, the system depicted in FIG. 1, the system depicted in FIG. 3 can react to some user keypad 12 entries without receiving additional information from the serving computer 1.
Figure 4:
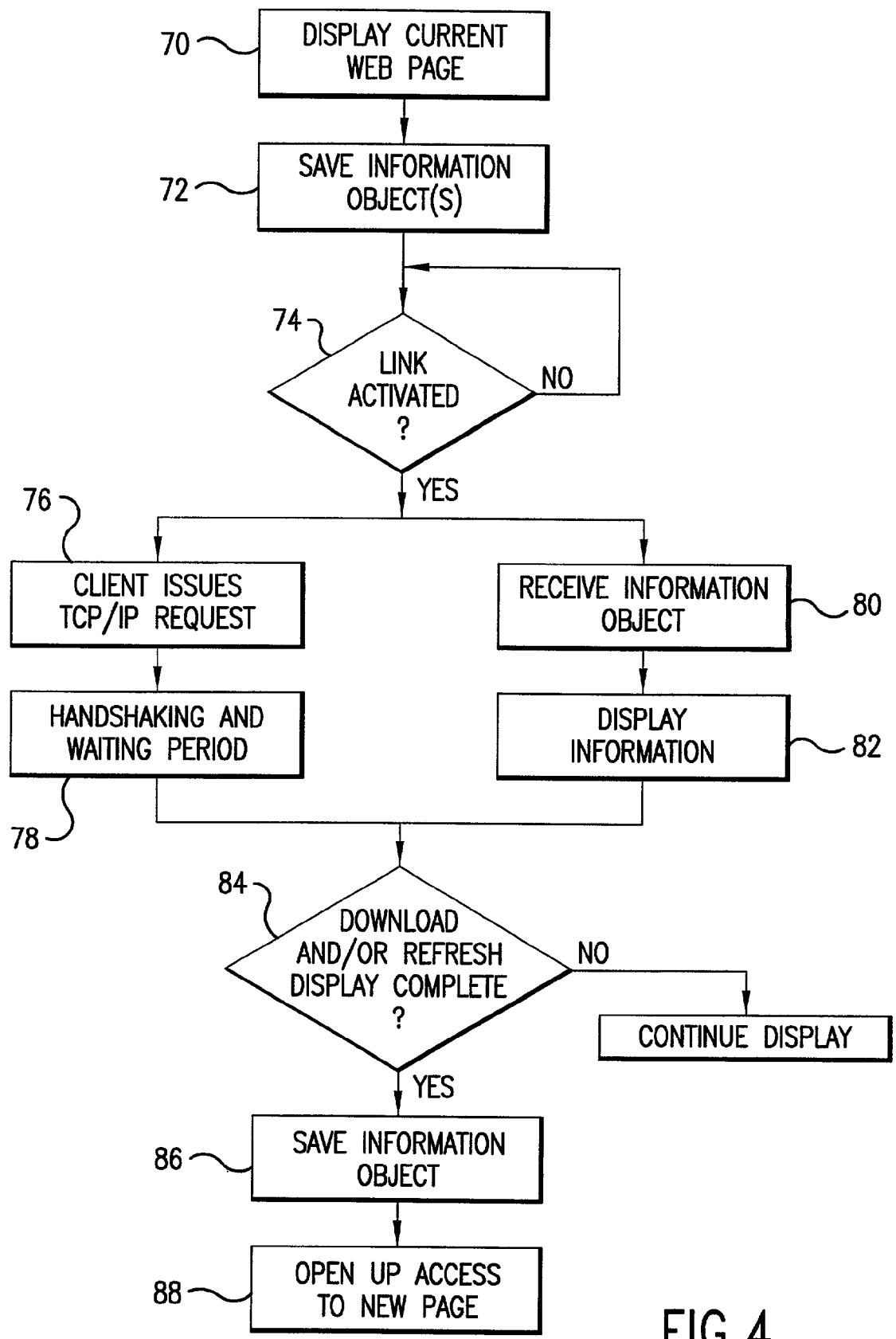
FIG. 4 (prior art) shows a procedure for displaying cached web pages while the system awaits refreshed page information from the Internet.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to the these quantities.

Further, the manipulations performed are often referred to in terms, such as adding or comparing, which are commonly associate with mental operations performed by a human operator. Not such capability of a human operator is necessary, or desirable in most cases, in any of the operations described herein which form part of the present invention; the operations are machine operations. Useful machines for performing the operation of the present invention include general purpose digital computers or similar devices.

The present invention also relates to the apparatus for performing these operations. This apparatus may be specially constructed for the required purpose or it may comprise a general purpose computer or a network of computers as selectively activated or reconfigured by a computer program stored on a computer. The procedures presented herein are not inherently related to a particular computer or other apparatus. Various general purpose machines may be used with programs written in accordance with the teachings herein, or it may prove more convenient to construct more specialized apparatus to perform the required method steps. The require structure for a variety of these machines will appear from the description given.

BEST MODE FOR CARRYING OUT THE INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The present invention enables the Web site developer to link or connect Web pages (or e-mail) to media files on streaming servers with a new level of simplicity. This includes the linking of, for example, RealNetwork's RealMedia™ files, Microsoft's Windows Media™ files, Apple's QuickTime™ files, MPEG and MP3 files. Before the system of the present invention, a Web site developer had to manage three separate files to enable a media file to stream to a Web page: a) the Web page from which the developer desires to provide the end-user with access to the media file over the Internet, b) a "reference file" which contains the Internet address to the media file, and c) the media file. With the system of the present invention, the Web site developer eliminates advantageously eliminates, for example, step "b" (the manual creation and uploading of one reference file for each streaming media file) and can now link the Web page directly to the media file.

The system of the present invention enables this process by allowing the Web site developer to use, for example, a basic hyperlink ("href") that is directed to the link or connection server of the present invention on the Internet. The system of the present invention interprets the standard hyperlink, and automatically generates the streaming media format's reference file's information, and sends that information (normally found inside the reference file) to the streaming media server hosting the appropriate format (RealNetworks™, Windows Media™ or QuickTime™). By moving the manual client-side process in creating streaming media "reference files" over to the server-side, the system of the present invention is able to automate this process in real-time online for all three formats, producing the same playback results for the end-user. For a Web site developer managing thousands of media files on a streaming media server, the process of having to manage matching "references files" on a Web server for each media file can become overwhelming.

Another benefit of the system of the present invention is that under the current linking method, the Internet Service Provider (ISP) must properly configure the MIME-types on the Web server to recognize the "reference file" for each streaming media format (RealMedia™, Windows Media™, QuickTime™). As the system of the present invention dynamically links directly from the Web page to the Streaming servers, the absence of using the "reference files" also removes the need for the ISP to properly configure the MIME-types on the Web server. We have determined that many ISPs have failed to, or refuse to, install one or more streaming media MIME types on their Web servers.

With the system of the present invention, the application is optionally, and advantageously packaged and marketed as an individual software product or provided as an online service.

The system of the present invention is optionally configured to work with other services such as Internet pay-per-view, ad-insertion services, and the emerging streaming services.

The process of the present invention works through an application that, for example, translates the incoming hyperlink ("href" link) from a Web page into a streaming media link understood by the appropriate streaming server application. Let's assume a Web site developer owns the Web site, www.MyWebSite.com and wants to stream media on his Web site using PlayStream™'s service. The examples below provide a "before" and "after" scenario of what is required to perform this method, for each format. We will also assume the user has established an account on a streaming server, with the account named "MyAccount." On Playstream™'s servers is a file directory that is named "MyAccount." This is the directory where the user will upload audio and video files that are to be streamed.

Let's assume that a user has acquired a video commercial clip, and has captured (transferred) this file into the user's computer. The user decides to name this file: "MyMediaClip" and wants to stream it on the Web site located at www.MyWebSite.com. The user desires to enable this media file to playback over the Internet on the three most popular Players: Microsoft Windows Media™ Player, RealNetworks RealPlayer™, and Apple's QuickTime™ Player.

With the media file in the user's computer, the user is now ready to "prepare" the media file for streaming. To do this, the user must obtain the proper software from Microsoft, RealNetworks or Apple, and use this software to "convert" this media file into that format for playback over that company's "Player." This conversion process is called "encoding."

For example, the user obtains Microsoft's Windows Media™ Encoder Software, and uses this software to convert the file, MyMediaFile into a Windows Media™ file that will stream from a Microsoft Windows Media™ Server over the Internet, named "MyMediaFile.wma" (the extension ".wma" designates that this file has been encoded for a Windows Media™ Server). Next, this user obtains RealNetworks™' "encoder" and converts the file "MyMediaFile" into a RealMedia™ file, named "MyMediaFile.rm" (the extension ".rm" designates that this file has been encoded for a RealNetworks™ Server). Next this user obtains Apple's QuickTime™ "encoder" and converts the file "MyMediaFile" into a QuickTime™ file named "MyMediaFile.mov" (the extension ".mov" designates that this file has been encoded for an Apple QuickTime™ Server). The user should finally have a scenario that resembles the following:

Original Media File on Local Computer:
    MyMediaFile
    Media Files Uploaded to Streaming Servers:
        MyMediaFile.wma (Windows Media™ server)
        MyMediaFile.rm (RealMedia™ server)
        MyMediaFile.mov (QuickTime™ server)
    Reference Files Uploaded to Web Server:
        MyASXFile.asx
        MyRAMfile.ram
        MyMOVfile.mov
    Web Page on Web Server:
        MyWebPage.html (which contains the following embedded links):
            http:\\www.MyWebSite.com/MyASXFile.asx
            http:\\www.MyWebSite.com/MyRAMFile.asx
            http:\\www.MyWebSite.com/MyMOVFile.asx To enable this file to stream on www.MyWebSite.com in a Windows Media™ Player, the user must first create a "reference" file (which is a simple "text" file). Give this "reference" file any name, but add the extension ".asx" at the end of it. For example, let's create a "reference" file and name it "MyASXfile.asx." Next, the user must type in the Internet address, or the URL, as it is known inside of this text file, that points to the Windows Media™ Server. In this case, the Windows Media™ Server at PlayStream™ is located at the following address: mms:\\win.playstream.com and with the assigned account for this user, the media will stream from mms:\\win.playstream.com/MyAccount/MyMediaFile.wma. Thus, to enable this file to stream over the Internet, the user would type this address into the reference file, "MyASXfile.asx." After doing that, the user saves this reference file and upload it onto the Web server where the Web site's Web pages are located. Create a standard hyperlink on a Web page, that points to this ASX file. For example, this would probably look like http:\\www.MyWebSite.com/MyASXfile.asx in the Web page. Next, the user uploads the media file, "MyMediafile.wma" into the user's storage account on the streaming server (in this example, that would be at PlayStream™). The clip should now be ready for viewing in Microsoft's Windows Media™ Player.

To enable this same file to stream on www.MyWebSite.com in a QuickTime™ Player, the user must go through a different process than for Microsoft's Windows Media™. To link QuickTime™ content, the Web developer must first embed a static movie into the Web page at www.MyWebSite.com. To create this static movie, the user first opens the image of the link to be used in the QuickTime™ Player. While still in the QuickTime™ Player, save it as a "self-contained movie." This image movie will reside on the Web server. Next, use an embed tag in the Web Page that looks like this:

<embed src="image movie on your web server"
    type="video/quicktime"
    height="image movie height"
    width="image movie width"
    autoplay="true" controller="false"
    href="rtsp:\\quick.playstream.com/MyAccount/MyMOVFile.mov"
    target="quicktimeplayer">

Note: Apple provides for two streaming technologies: Progressive Download & True Streaming. The difference between the two technologies is that "progressive download" is not a streaming media technology, but an actual download of the media file.

To enable this same file to stream on www.MyWebSite.com in a RealNetworks RealPlayer™, the user must first create a "reference" file (which is a simple "text" file). Give this "reference" file any name, but add the extension ".ram" at the end of it. For example, the user creates a "reference" file and names it "MyRAMfile.ram." Next, the user must type in the Internet address, or the URL, as it is known inside of this text file, that points to the RealNetworks RealServer. In this case, the RealServer at PlayStream™ is located at the following address: rtsp:\\real.playstream.com and with the assigned account for this user, the media will stream from the URL: rtsp:\\real.playstream.com/MyAccount/MyMediaFile.rm. Thus, to enable this file to stream over the Internet, the user would type this address into the reference, "MyRAMfile.ram." After doing that, the user would save this reference file, and upload it onto the Web server where the Web site's Web pages are located. Next, the user would create a standard hyperlink on a Web page, that points to this ASX file. For example, this would probably look like http:\\www.MyWebSite.com/MyRAMfile.ram in the Web page. Next, the user would upload the media file, "MyMediafile.ram" into the user's storage account on the streaming server (in this example, that would be at PlayStream™). The clip should now be ready for viewing in RealNetworks RealPlayer™.

The present invention provides a unified solution that enables all formats to stream without having to deploy "reference files." In doing this, the present invention may be implemented in Microsoft's VBScript written in Microsoft's ASP (Active Server Pages), now running on Microsoft's Internet Information Server (IIS 5.0). The present invention may also be implemented as a standalone application in Visual Basic. However, other standard programming techniques, as would be evident to those of skill in the art, may also be used. The present invention creates this unified application as a separate application from a streaming media server, thereby enabling the present invention to provide this "reference file" auto-generation service to remote streaming servers on the Internet (i.e.: the present invention could optionally provide the service for other ISPs who desire to manage their own servers, but would like to offer their clients an easy translation service that worked for all three formats).

For the Web site developer who desires to stream the media file, MyMediaFile, in all three formats (Windows Media™, RealMedia™ and QuickTime™) using the system of the present invention, the Web site developer uploads the three media files into their Account and uses a standard hyperlink on the Web Page (or embedded into e-mail).

Under one embodiment of the present invention, a specialized port number and the name of the link or connection server is provided as a parameter:

http:\\easylink.playstream.com:8080/easylink/MyAccount/MyMediaFile.wma

RealMedia™
http:\\easylink.playstream.com:8080/easylink/MyAccount/MyMediaFile.rm QuickTime™
http:\\easylink.playstream.com:8080/easylink/MyAccount/MyMediaFile.mov Under an alternative embodiment of the present invention, no specialized port is specified in the hyperlink referencing the link server. Also, there is no need to add the name of the link server as a parameter. The hyperlinks would thus be:

Windows Media™
http:\\easylink.playstream.com/MyAccount/MyMediaFile.wma

RealMedia™
http:\\easylink.playstream.com/MyAccount/MyMediaFile.rm

QuickTime™
http:\\easylink.playstream.com/MyAccount/MyMediaFile.mov

The system of the present invention begins with the standard http:\\ protocol that is used for accessing Web pages on the World Wide Web, followed by the address of the link or connection server on the Internet, followed by the Web site developer's account (in the case, "MyAccount), followed by the file name (with the appropriate file extension to depict the format). The link or connection server receives the incoming HTTP link, then translates this link into the "reference file" information that would have been found inside the "reference file," then sends that translated instruction to the appropriate streaming server application (either Windows Media™ Server, RealServer, or QuickTime™ Server). It accomplishes this by examining the file name extension at the end of the instruction (i.e: if the link ends in a ".mov" extension, the system of the present invention routes that request to a QuickTime™ server). At that point, the streaming server will make contact with the end-user's "Player" and begin streaming the media file.

Thus, present invention's core technology is about automatically generating the required streaming media "reference file's" information on the server side, rather than requiring the Web site developer to create and manage the "reference files" manually on the client side. By positioning the link or connection server between the Web site developer's Web site and the Streaming Media Servers, the system of the present invention is able to auto-produce each streaming media format's required reference file on the fly, and then auto-discard it after the media file has been activated for playback.

The present invention's server-side "reference file" conversion application also applies when streaming media ad-insertion and pay-per-view technologies are applied. Also, the present invention is able to autogenerate the link or connection server tags online for Web site developers to copy and paste into a Web page, thereby freeing the Web site developers from having to type the information themselves.

Although many features and advantages of the system of the present invention have been expressly stated, there are other features and advantages that have been disclosed in this patent. Moreover, the system of the present invention is not limited to the embodiments expressly described below. Variations on those embodiments will be apparent from the disclosure to all those skilled in the art.

The foregoing example embodiment is a detailed example of the application of this invention to a particular problem involving the delivery of streaming multi-media content to client workstations. In what follows the invention is described more fully so that its features and advantages can be more fully appreciated.

The present invention introduces distributed link or connection processing to the network architecture typically utilized to provide services and deliver content over the Internet. When a client selects a graphical icon embedded in a web page, the web page address is transmitted to the web server hosting that page for further processing. A network organized in this way restricts web developers to the range of client request processes supported by the host web server. As is the case with streaming media servers, some distributed content can only be delivered to a client after the request is modified to incorporate the formal requirements of the content server. For website owners who do not have the ability to make functional modifications to their web server, there could be considerable delay in making innovative content available to clients.

A network architecture supporting distributed link processing as disclosed herein solves this problem by introducing a layer of link processing that serves to process client requests and redirect the request to a specialized, dedicated or external server in a form that implements the design choices of the web developer. For example, a web developer may choose to have the web server to respond to all client requests to retrieve a website page, but may wish to have an alternative server if the web server does not support the provision of desired content or services. By supporting the distribution of link processing, web developers working in an environment supporting the present invention are able to utilize the features and properties of any link server that becomes available. Moreover, the present invention may stimulate the creation of innovative Internet content and services because a provider of such content or services need only provide link servers with the required functionality in order to enable immediate market deployment.

Figure 5:
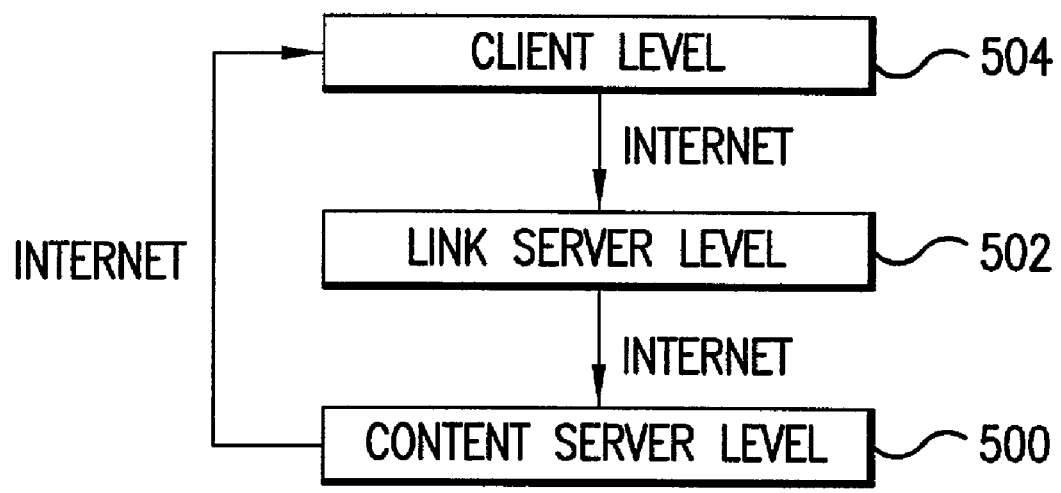
FIG. 5 (Link Server Level) shows a high level conceptual block diagram of a network in which the client level and the content server level are separated by the intervening link server level.

FIG. 5 illustrates the basic organization of a system which utilizes distributed link or connection processing. A request for Internet content at the client level 504 is processed at the link server level 502. The target link server receives the information contained in the representation of the request, typically an html reference tag or other indexing scheme, and then formulates the appropriate request or requests for delivering content to the requesting client. The link server may, in addition to initiating the transfer of content from a content server 500 to the requesting client, issue requests that the requesting client receive other content depending on the options specified by the web developer and encoded in the link server tag.

Figure 6:
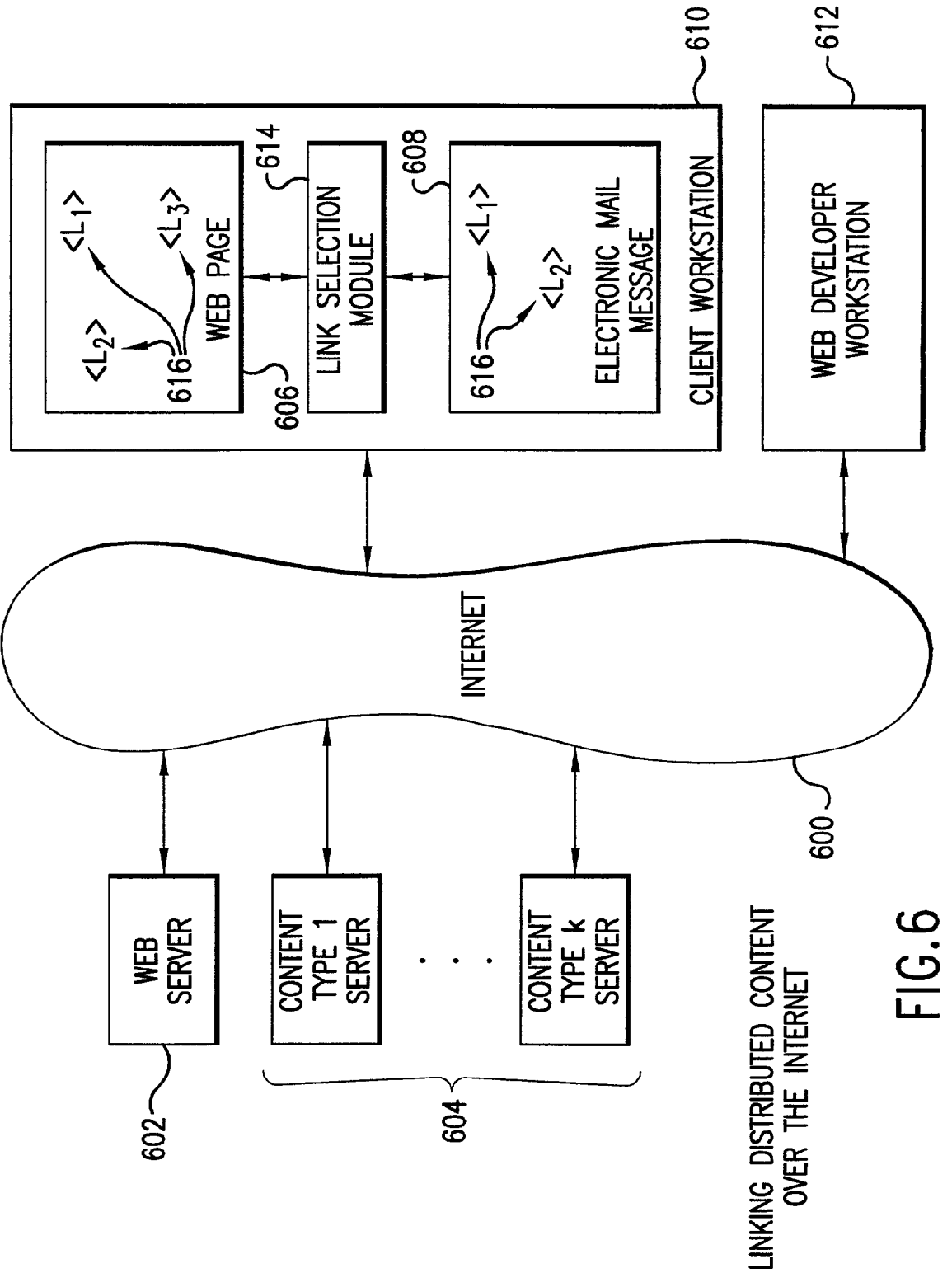
FIG. 6 shows the linking of distributed information content over the Internet.

FIG. 6 generally depicts the linking of remotely distributed content over the Internet 600. A web developer 612 constructs the web pages 606 constituting a web site and uploads them to a web server 602. Each web page contains links, such as hyperlinks, 616 which, when displayed and subsequently selected 614 at the client's workstation 610 result in the routing of a request for remotely hosted content over the Internet. If the requested content is another web page, the web server supplies the requested content. If the requested content is another kind of remotely hosted content, such as streaming application content or streaming multi-media content, then servers for that other content 604 respond to the client's request. FIG. 6 also depicts the selection of remotely hosted application and multi-media content through the selection of a link within an electronic mail message 608. The process associated with the request from an e-mail message is similar to that associated with the request issued as a result of clicking a location on a web page. FIG. 6 shows only the general structural feature of a network in which there are multiple servers of remotely hosted content. Note that instead of, or in addition to, the Internet Network, other global or private networks may also be used.

Figure 7:
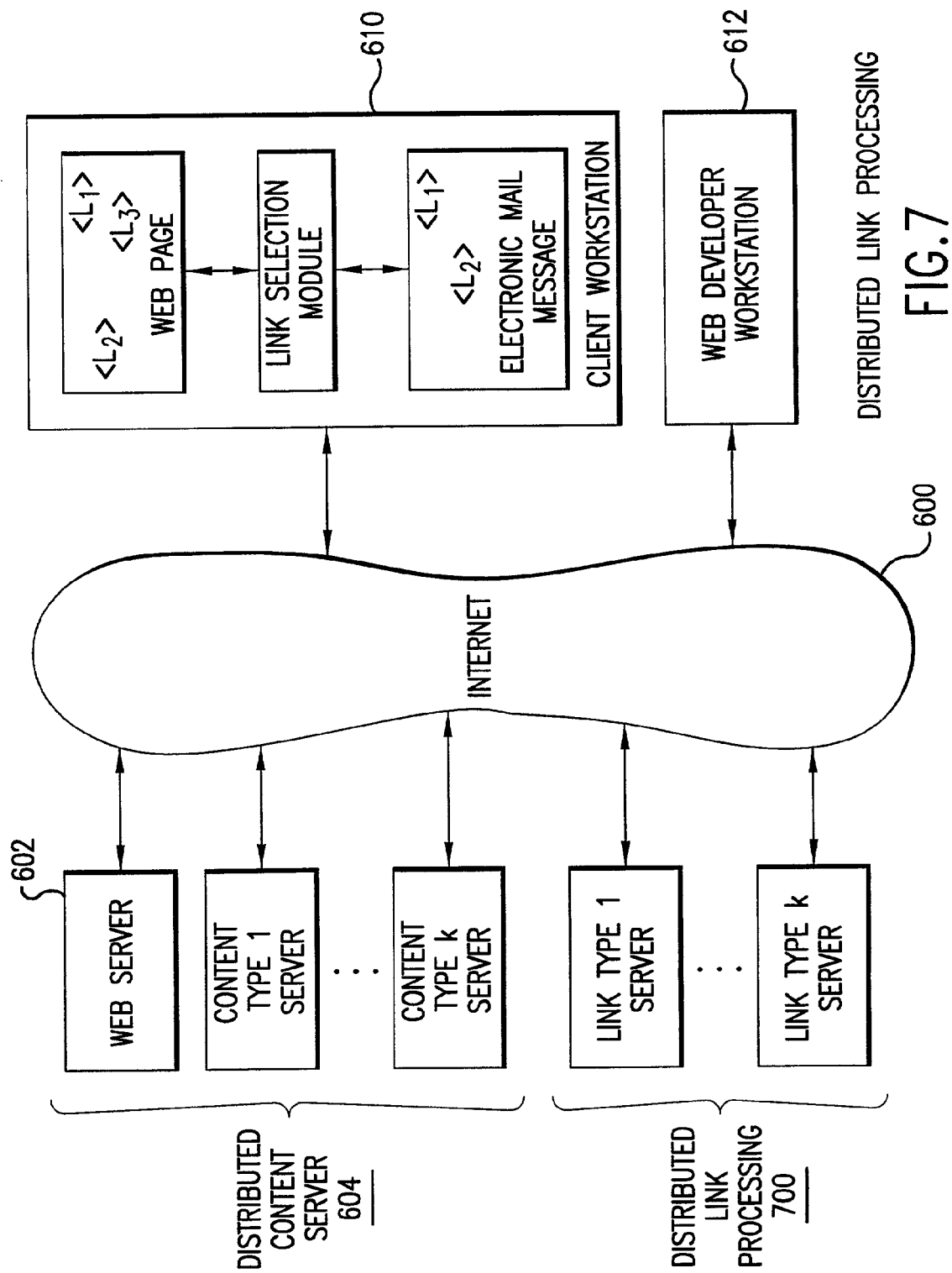
FIG. 7 shows the addition of a processing layer of distributed link or connection servers between client requests an the provision of content through distributed information servers.

FIG. 7 generally depicts the use of a layer of link servers 700 in conjunction with a network for serving remotely hosted information and application content 604 to clients 610. Under a distributed link processing system, such as the system of the present invention, when a link, tag or connection is selected by a client workstation, the link may specify either the host server of the desired content or a link server. If the link specifies a link server, once the link is routed via the Internet 600 to the designated link server, the link is analyzed to determine which remote server hosts the requested content. Depending on the options encoded in the link as specified by the developer, either a request to serve the client request is forwarded to the server hosting the requested content or, optionally, the link server determines if the request for content is authorized and records the features of the request in a user accounts management system. As indicated in the figure, the distributed link processing system described herein encompasses systems which support a variety of link server types 700.

Figure 8:
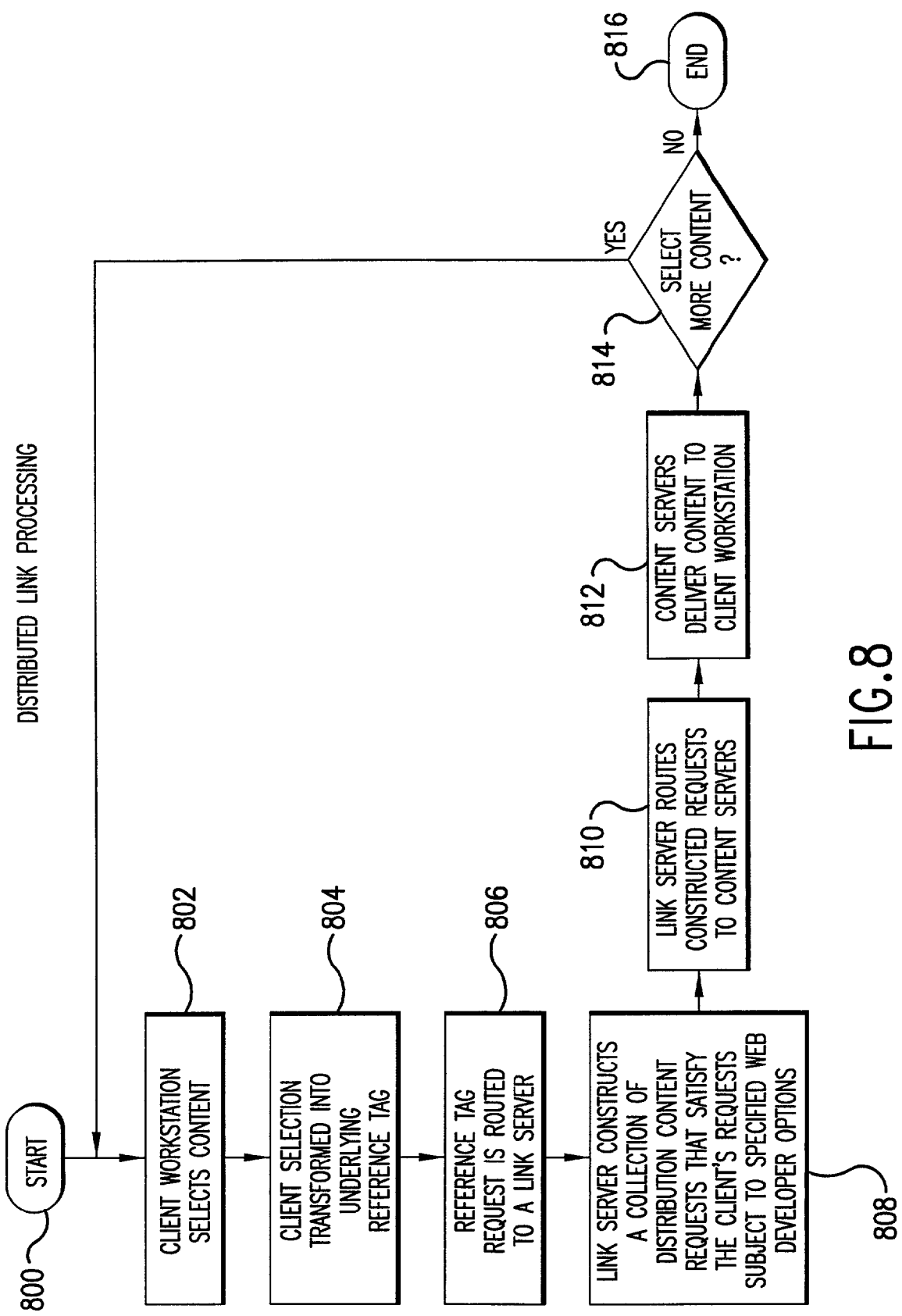
FIG. 8 shows a general process by which a client request for distributed content is processed by a link or connection server of the present invention prior to initiating a request with the remote content server hosting the requested content.

FIG. 8 illustrates an example sequence of events resulting from the selection of a link serviced by one of the link servers depicted in FIG. 7. After start 800, the client selects content 802 by making a selection based on a visual display of a web page or an electronic mail message containing a hyperlink, the html reference tag representing the source of visual display element is identified 804. The reference tag corresponding to the request is routed to the link or connection server 806 encoded in the tag. The link or connection server constructs a collection of distribution requests 808 corresponding to the client's request as modified by the options encoded in the link or connection server reference tag by the web developer. For example, the link or connection server reference tag might encode the web developer's choice to provide a banner ad, a pre-clip, a post-clip or an embedded page along with the content. Optionally, the link or connection server reference tag may specify that the requesting client be authenticated prior to forwarding the client request to the content server. A request satisfying the formal requirements of the server for the requested content is constructed and routed via the Internet to the content servers 810. The content servers in turn deliver the requested content along with any augmentations 812 to the client workstation. If there is more content 814 the client is given the option of making additional selections. Otherwise the process terminates 816. The above sequence of steps illustrates only one embodiment of the procedure available from the deployment of the present invention. That is, the sequence of the above steps may be altered or modified to provide similar functionality described herein.

Figure 9:
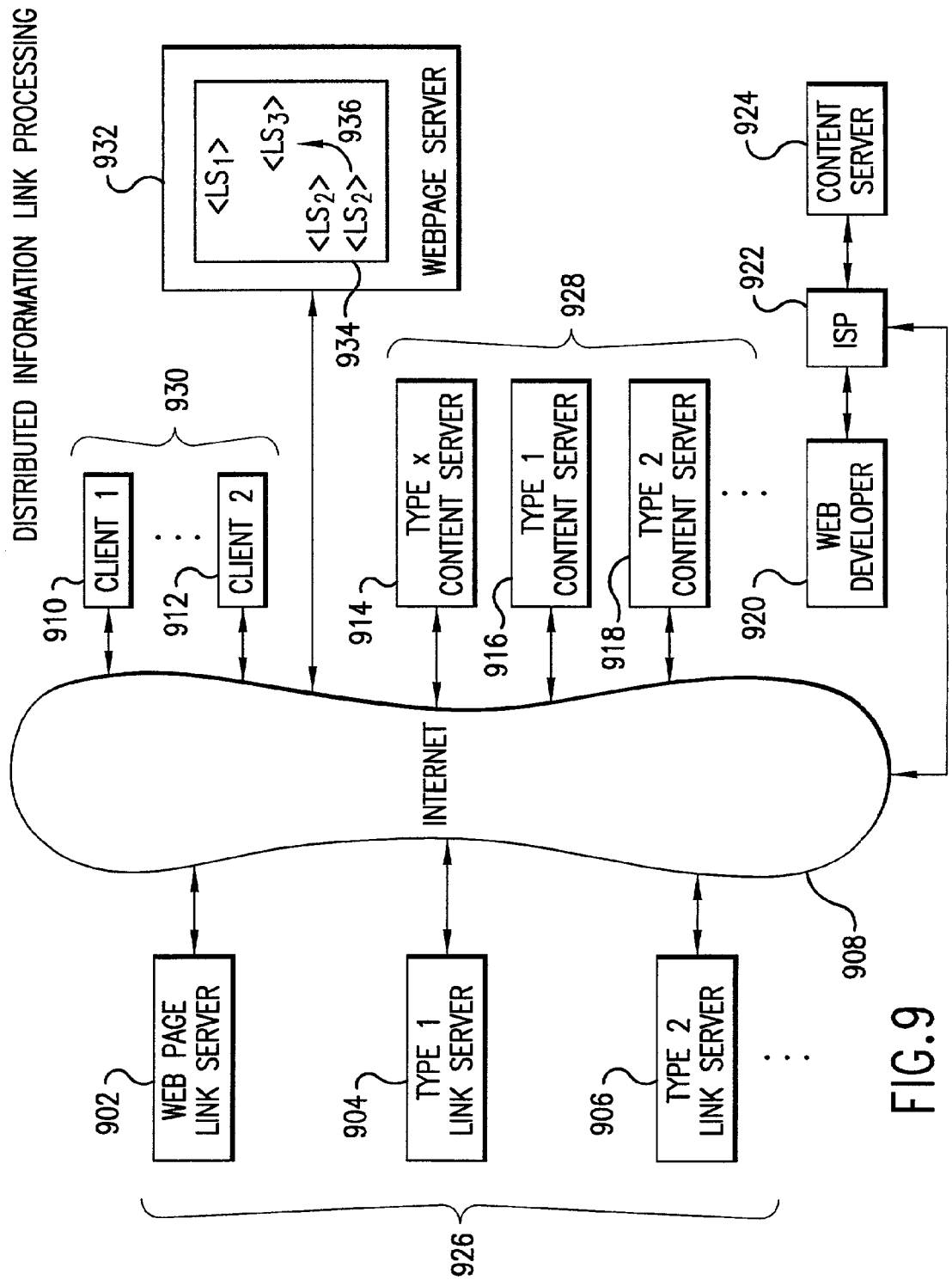
FIG. 9 shows a plurality of clients connected to multiple link or connection servers with the web developer connected to the Internet through an ISP which offers content service.

FIG. 9 shows a network architecture in which a plurality of clients 930 (individually 910, 912) are connected to multiple information link servers 926 (individually 902, 904 and 906) via the Internet 908. The web developer's local workstation 920 is connected to the Internet 908 through an ISP 922 which hosts websites and other content 924. By use of a link server, the web developer may take advantage of client services that may not be supported directly by the ISP. Link or connection servers, as disclosed herein, support the unbundling of Internet access functions from the provision of website services. Specifically, FIG. 9 depicts a network architecture for a system embodying the invention by utilizing distributed information link processing. A collection of content servers 928 (individually 914, 916 and 918) deliver content to clients 930 over the Internet 908. Client requests include requests for the display of a web page, requests for the display of streaming multi-media content and requests for streaming multi-media application content among others. Other data requests are also possible in the present invention. In response to a request, the content server routes the requested content to the user. FIG. 9 also shows a collection of link or connection servers 926. Link servers respond to client requests by transforming the link server reference tag for the requested content into a reference tag suitable for the server of the indicated content and initiating the performance of options specified by the web developer (see web page server 932) when the link server tag is constructed. An example web page 934 is depicted with references to a plurality of link processors 936. When a client selects one of these references 936, the client's request is routed to the designated link server. Through the use of specialized, separate or localized link servers, the present invention supports the distribution of client request handling procedures to dedicated or separated servers that may have been constructed specifically to efficiently handle such requests. By enabling the distribution of innovative client request handling procedures to multiple servers, the present invention avoids reliability problems associated with modifying web servers to perform those functions.

Figure 10:
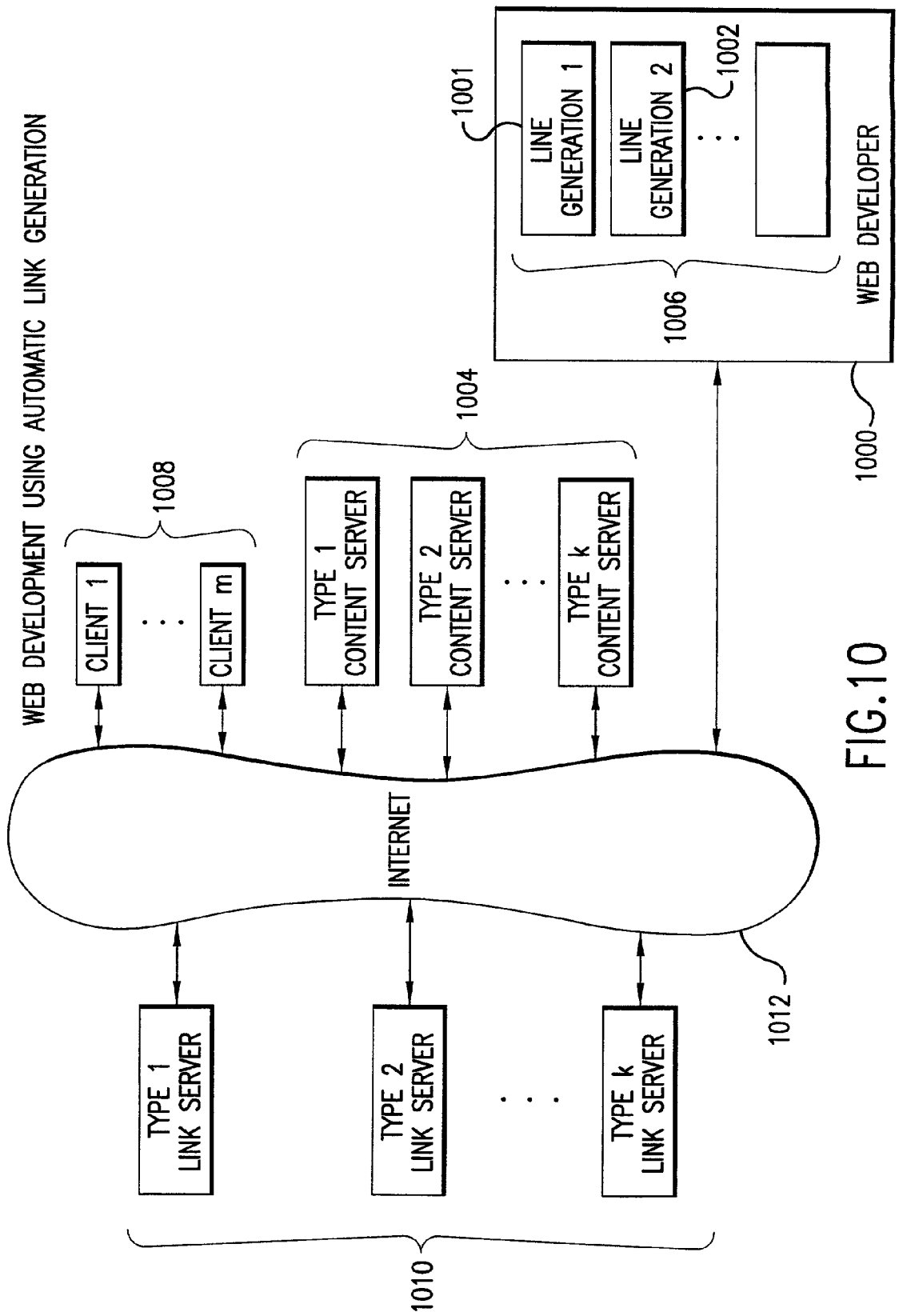
FIG. 10 shows a web developer's local machine equipped with a plurality of modules for generating links for a plurality of distributed link servers providing multiple types of content to at least one client workstation.

In an alternative embodiment of the present invention depicted in FIG. 10, individual link or connection servers 1010 are associated with link construction modules 1006 (individually 1001, 1002, etc.) which convert the web developer's high level specification of options into a tag satisfying the formal requirements of the link or connection server. In this way, the web developer 1000 need not master the formal requirements of the link server. After the web developer 1000 uses a link or connection server link construction module to generate a link, the link can be cut and paste into the desired web page. The use of the link construction module ensures that the introduction of the link or connection server network layer characteristic of the present invention does not add to the complexity of the web developer's website development task. Reference numeral 1008 denotes a plurality of clients. Reference numeral 1004 denotes a plurality of content servers and reference numeral 1012 denotes the internet.

Figure 11:
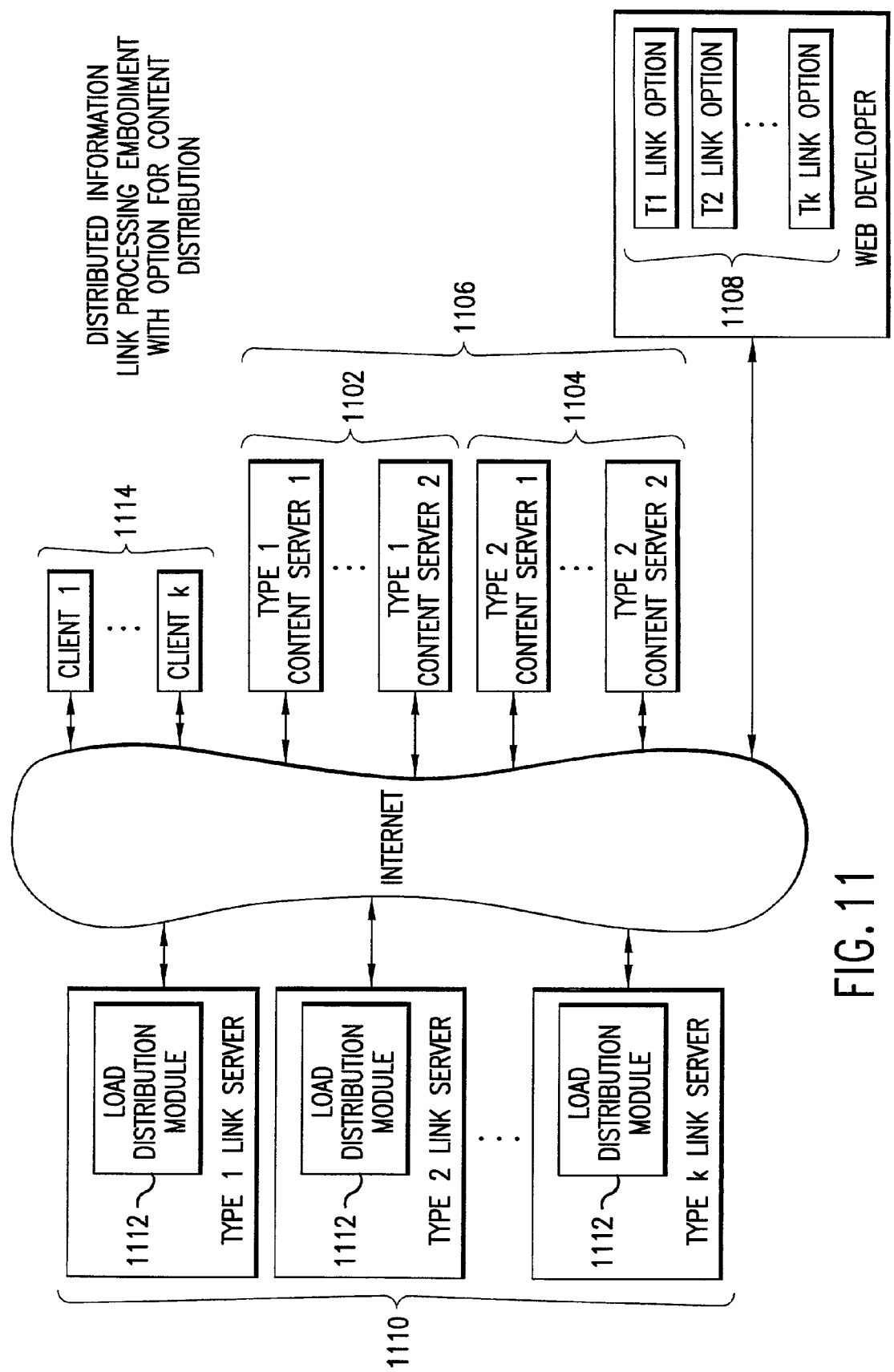
FIG. 11 shows an embodiment of the distributed link server system in which the web developer may specify hit distribution as an option, and the link or connection servers are equipped to direct client content requests to a multitude of content servers based on the options specified.

In another alternative embodiment of the present invention depicted in FIG. 11, the link server reference tag construction modules 1108 support the specification of load balancing among a collection of content servers hosting the same content 1106 (individual content servers are referred to as 1102, 1104). When a link server 1110 receives a request for content that contains the load balancing option, the load distribution module 1112 is used to construct a server request for the client 1114 based on predetermined load balancing objectives. These load balancing objectives may include cost considerations as well as Internet performance considerations, among others.

Figure 12:
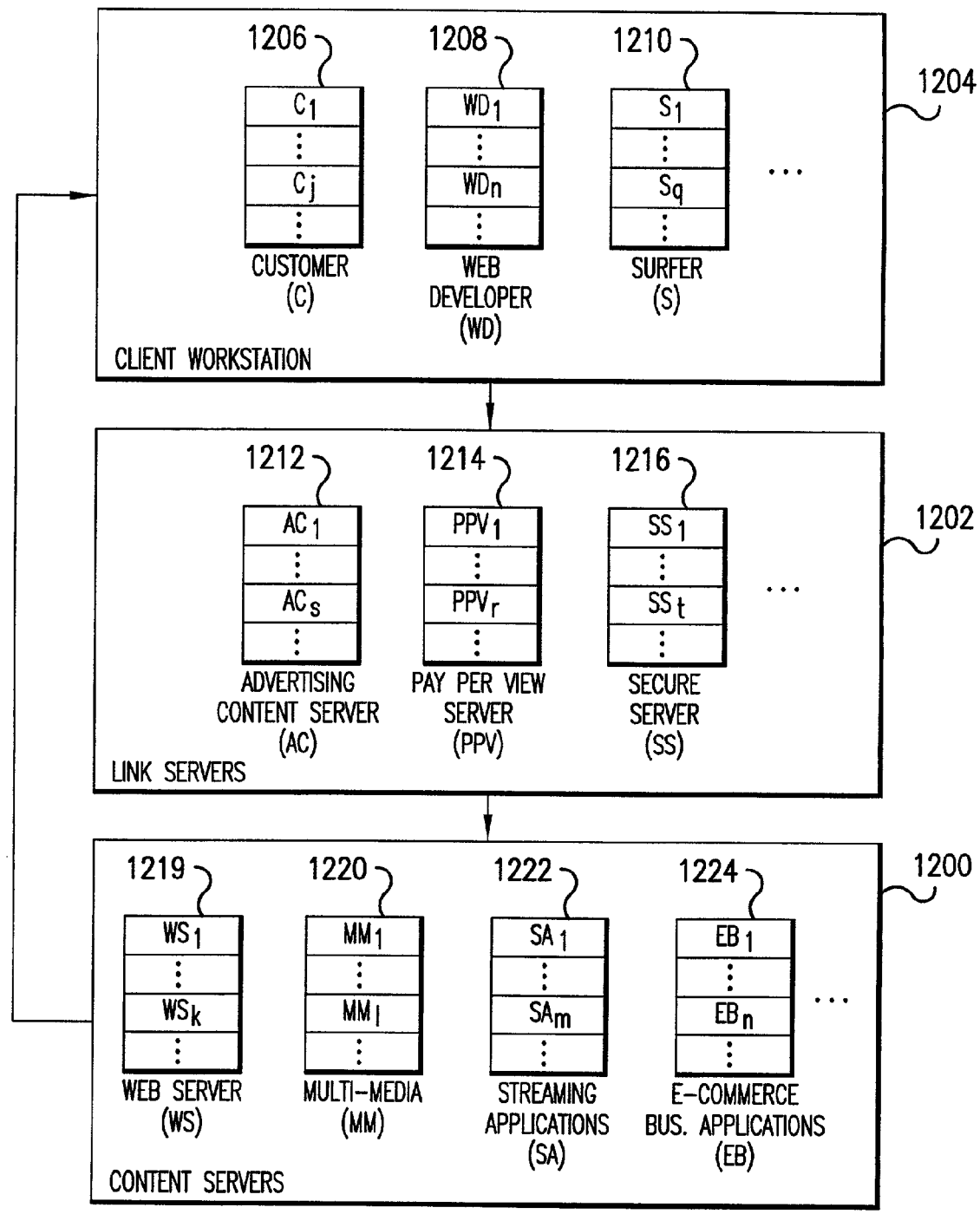
FIG. 12 shows the specialization of link servers according to options associated with providing content to requesting users in a distributed link processing system.

FIG. 12 shows an alternative embodiment of the present invention illustrating distributed information link processing. First, the web developer 1208 determines which content, including web pages, streaming media, streaming application content and business application services that are to be delivered to client workstations 1204. The web developer 1208 then determines which content servers 1200 (individually 1218, 1220, 1222, and 1224) have the ability to host the selected content. Once the content servers are determined, the web developer determines the type of processing options that are to be associated with each client request. The choice of link server 1202 (individually 1212, 1214 and 1216) is based on the required or selected processing options. Reference numeral 1206 refers to a customer and reference numeral 1210 refers to a web surfer.

For example, for some client requests the web developer may want to ensure that additional matter, such as advertising, accompanies the delivery of requested content to a client. For other client requests, the delivery of requested content must be embedded in a collection of processes that enforce a pay per view scheme. Other client requests may require the delivery of content that is secure, for example, from the threat of eavesdropping. Once the web developer identifies the required options, the development of the web page can incorporate references to link servers which support those options. The web developer then optionally uses software provided by a selected link server to configure the desired options. The software provides the formal link expression which corresponds to the web developer's high level option specification.

Once the reference tags that implement the web developer's selected options are constructed, the web pages intended to convey the content are modified to include the tags. By allocating the handling of links in this way, the web developer avoids having to modify a particular server, such as the native web server, to support additional options. For example, the link or connection server of the present invention provides the service of constructing a valid streaming server of the appropriate type on the fly. As a result, there is no need for the web developer to modify the web server to support a MIME-type associated with a particular streaming application. The present invention would provide the same benefit for arbitrarily complex computations associated with the satisfaction of client requests. By permitting web pages to reference specialized link servers with diverse computational capabilities, the invention described herein eliminates the requirement that web servers exclusively bear the computational and resource burden of adapting to the special requirements of new applications. With the introduction of the Link or Connection Server Level of Network Architecture as in the present invention, any need to accommodate innovative linking options can be satisfied. Moreover, a special or dedicated purpose link server does not have to bear the computational burden of anticipating a wide range of computationally diverse linking tasks.

Figure 13:
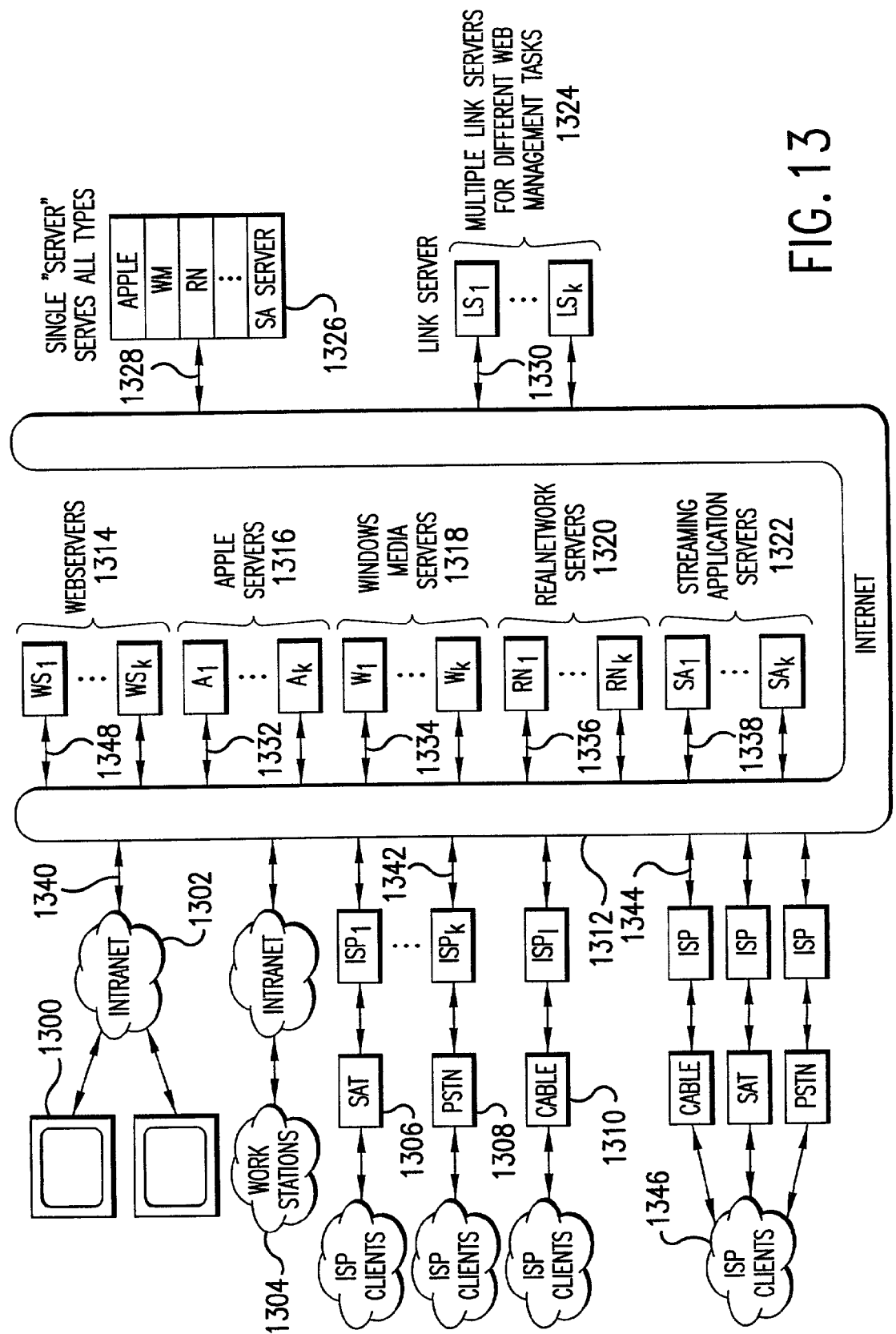
FIG. 13 shows a multitude of content server types and multiple link or connection servers managing a multitude of different web management tasks.

FIG. 13 depicts the deployment of multiple link or connection servers for a diverse collection of content servers including web servers 1314, streaming QuickTime™ servers 1316, streaming Windows Media™ servers 1318, RealNetworks™ servers 1320, and other streaming application servers 1322 which could include, without limitation, MP3 servers and MPEG servers. Connections to these various servers are referred to as 1348, 1332, 1334, 1336 and 1338, respectively. FIG. 12 also illustrates the fact that the introduction of the Link Server layer of processing is upwards compatible with systems that lack an intermediate link processing layers. Web pages that reference content servers directly continue to be supported. In addition, FIG. 13 shows that an individual content server may serve multiple types of content 1326 (individually 1328, 1330 and 1324). The separation of content servers into different machines depending on whether they serve Windows Media™, RealNetworks™ or QuickTime™ content may not be the most economical for every class of website owner. Client workstations are individually referred to as 1300, 1304. ISP clients are referred to as 1346. An SAT connection is referred to as 1306. A PSTN connection is referred to as 1308 and a cable connection is referred to as 1310. Reference numeral 1302 refers to an intranet. Reference 1340 refers to a connection between the intranet 1302 and internet 1312. Reference numerals 1342 and 1344 refer to connections between various ISP's and the internet 1312.

Figure 14:
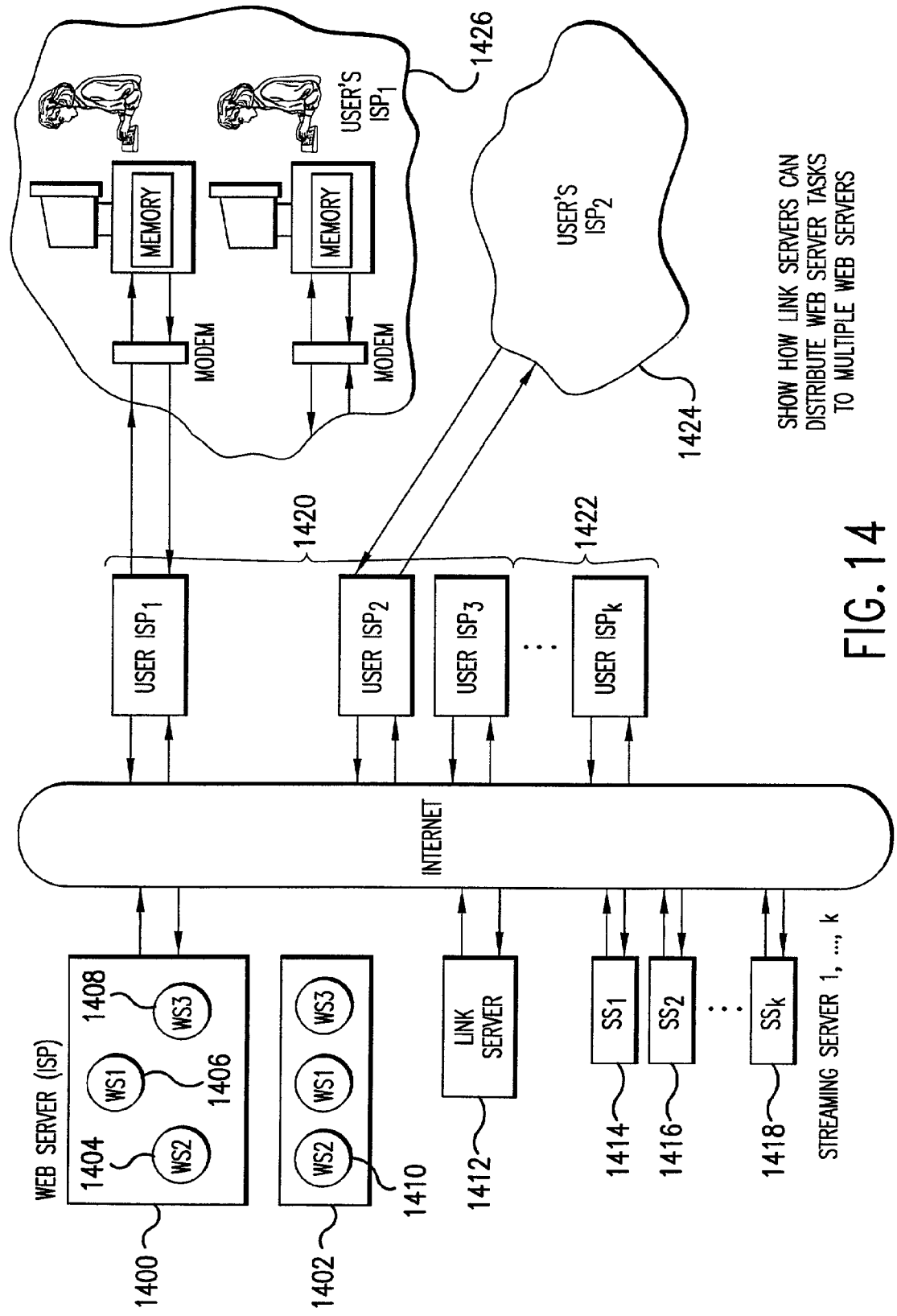
FIG. 14 shows the extension of the link or connection server to distributing the hosting of websites to multiple web servers.

FIG. 14 illustrates a network architecture in which individual websites 1404, 1406, 1408, 1410 are hosted on multiple web servers 1400, 1402. An advantage of having the link service level 1412 of the present invention deployed in a network architecture is that the web site developer is not dependent on a particular web server to manage demand for website pages. More generally, using an intermediate link server permits the redirection of website management functions to specialized servers. Using the link or connection Servers 1412, the web developer can decide how to allocate web management functions among independent servers. For example, a web developer could use link or connection server reference tags to redirect all functions except the delivery of website pages to servers other than one hosting a web site. Such a decision would enable the web developer to host the website on a server that has the best page delivery characteristics without regard for the servers support of other website functions. In addition, because web management functions can be arbitrarily distributed using link or connection servers 1412, it is possible to distribute the functions of hosting a web site to multiple web servers (see streaming servers 1414, 1416 and 1418) without thereby losing the ability to centralize web management functions. User ISPs are variously referred to as 1420, 1422, 1424 and 1426.

Figure 15:
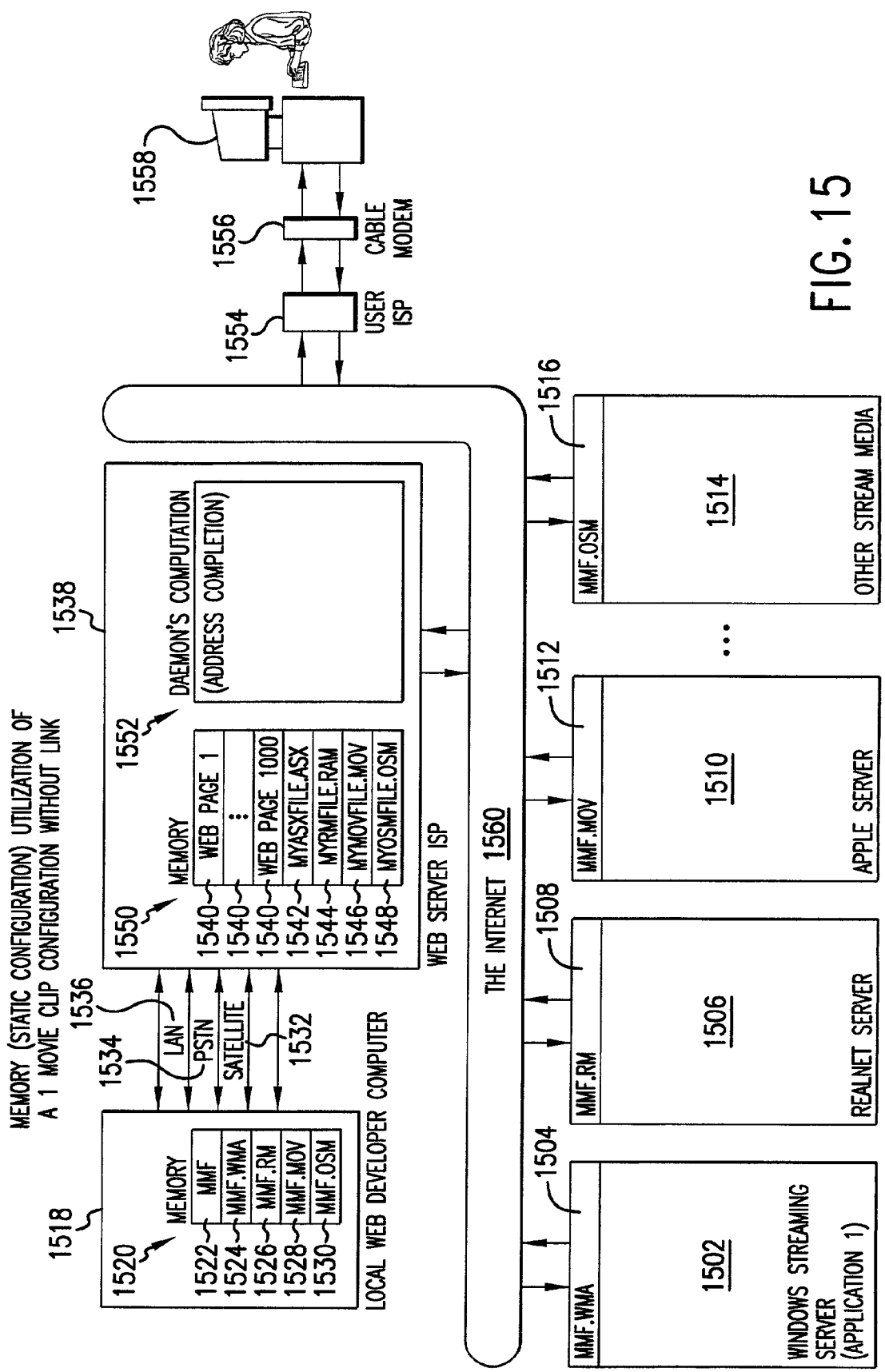
FIG. 15 shows the memory utilization of a single movie clip configuration without the system of the present invention.

FIG. 15 depicts an example of our determination of the memory and network configuration of a system which does not use the link or connection server to manage requests for streaming application and streaming media requests. The basic components of the system depicted in FIG. 15 include the Internet 1560, the local workstation of the web developer 1518 and the ISP which in this example also serves as a web server 1538 for the web developer's website 1550. The system also includes a client workstation 1558 and a collection of streaming media and application servers including a Windows Media™ Streaming Server 1502, a RealNetworks™ Streaming Server 1506, a QuickTime™ streaming server 1510 and another streaming media server 1514.

The local web developer workstation 1518 contains a memory 1520 in which the original media file MMF 1522 (my media file), the Windows Media™ conversion of that file MMF.WMA 1524, the RealNetworks™ conversion MMF.RM 1526, the Apple QuickTime™ conversion MMF.MOV 1528, and a format associated with another unspecified streaming media MMF.OSM 1530.

The local web developer computer 1518 is bidirectionally connected to an ISP (Internet Service Provider) 1538 via a LAN 1536, a PSTN (publicly switched telephone network) 1534, and/or a satellite wireless connection 1532. The combination ISP/Web Server 1538 includes a memory 1550 which, among other things necessary to the operation of a general purpose digital computer, contains web pages 1540, and server specific reference files for Windows Media™ 1542, RealNetworks™ media 1544, Apple QuickTime™ media 1546, and an alternative streaming media 1548. Within the Web Server/ISP 1538, a processor running client request handling programs 1552 responsively coupled with the memory unit 1550 and the Internet 1560 checks incoming client requests. If the request is for content from a multi-media streaming server, the client request handling programs extract streaming server request formatting information from the corresponding reference file. The client request handling programs further construct a streaming server application request according to the information in the reference file, and transmit the request to the Internet for routing to the appropriate streaming application server.

In addition to the web developer's computer 1518 and the Web Server/ISP 1538, the configuration depicted in FIG. 15 includes various streaming servers. The streaming servers are bidirectionally and responsively coupled to the Internet 1560 for the purpose of hosting multi-media application content. In response to client requests, the servers stream multi-media application content to the display of requesting clients. The streaming servers depicted in this example include a Windows Media™ Server 1502 hosting Windows Media™ content MMF.WMA 1504, a RealNetworks™ Server 1506 hosting RealNetworks™ media content MMF.RM 1508, an Apple QuickTime™ Server 1510 hosting QuickTime™ media content MMF.MOV 1512 and another Streaming Media server 1514 hosting MMF.OSM 1516.

A typical client is depicted in FIG. 15 as a workstation 1558 responsively and bidirectionally coupled to a cable modem 1556 which is in turn responsively and bidirectionally coupled to the client's Internet Service Provider (Client ISP) 1554. The Client ISP is bidirectionally and responsively coupled to the Internet 1560.

We have determined that a key limitation of this configuration is that web developer is required to manage the reference files on the web server. Moreover, the web server must run programs which apply the content of the reference files to all requests for streaming application media. Since programs running on a web server can create a resource conflicts with processes that handle ordinary web page requests, web server ISP's typically control the provision of support for media types. In the system of the present invention, on the other hand, the web server need not handle client requests for streaming media content and therefore need not devote scarce processing cycles to the monitoring and processing of such requests. Also, because the need for web developers to manually manage reference files is eliminated under the present invention, less web server resources need be devoted to supporting the uploading and maintenance of those files.

Figure 16:
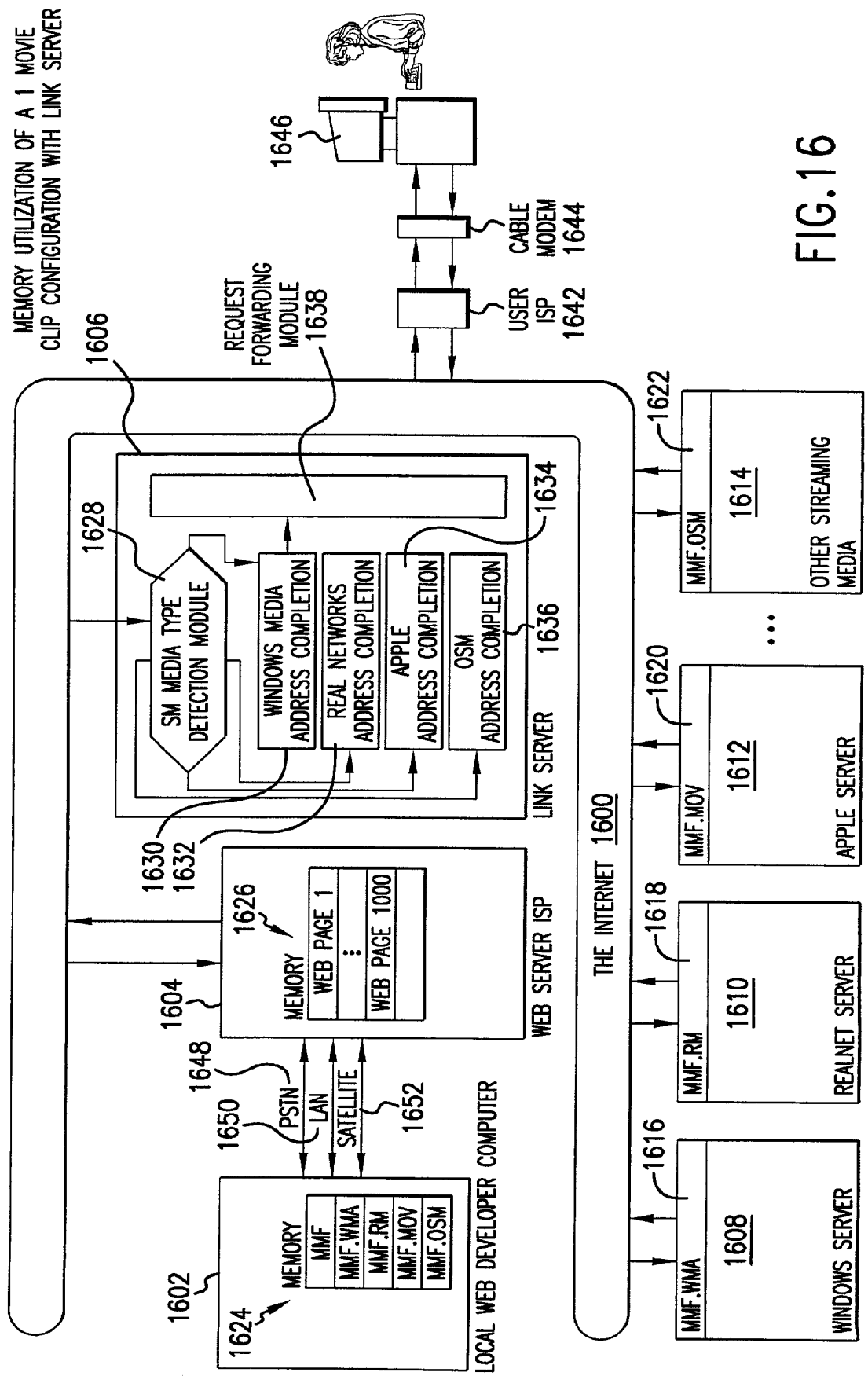
FIG. 16 shows an example of memory utilization of a single movie clip configuration with the system of the present invention.

FIG. 16 shows relevant aspects of memory utilization for an example embodiment of a system using the link or connection server 1606. FIG. 16 shows a local web developer workstation 1602 containing a memory store 1624, a media clip MMF and the media clip MMF in alternative formats such as Windows Media™, RealNetworks™ and QuickTime™. The workstation is connected to a web server/ISP 1604 via PSTN 1648, LAN 1650 and/or wireless satellite 1652 connections. The web server/ISP 1604 is bidirectionally connected to the Internet 1600 and contains memory support for the web pages making up the web site 1626. The configuration further includes a link or connection server 1606 for the handling of client requests for streaming multi-media and application content. The link or connection server 1606 includes a media type detection module 1628 which detects which type of streaming media or application is requested. The link or connection Server described in this embodiment includes a module for generating requests for Windows Media™ 1630, RealNetworks™ 1632, Apple QuickTime™ 1634 and other streaming media 1636. Once the correct address is generated, a request forwarding module 1638 routes the client request through the Internet 1600 to the streaming server of the appropriate type. Each streaming media or application server hosts the format requested by the client. For example, the Windows Media™ streaming server 1608 hosts the Windows Media™ version MMF.WMA 1616, the RealNetworks™ streaming server 1610 hosts the RealNetworks™ version 1618, the QuickTime™ streaming server 1612 hosts the QuickTime™ version MMF.MOV 1620 and the "other streaming media" server 1614 hosts the version MMF.OSM 1622. Upon receiving the client request as modified by the link or connection Server the requested content is routed to the requesting client over the Internet 1600 via the client's ISP 1642, the client's modem 1644 and the client's workstation 1646. Although FIG. 16 expressly illustrates only RealNetworks™, Windows Media™ and QuickTime™ content, the link or connection server of the present invention encompasses the serving other media, including without limitation, MP3 files and MPEG files. In addition, the link or connection server of the present invention may be used in conjunction with non-media information content designated in other web page components.

Figure 17:
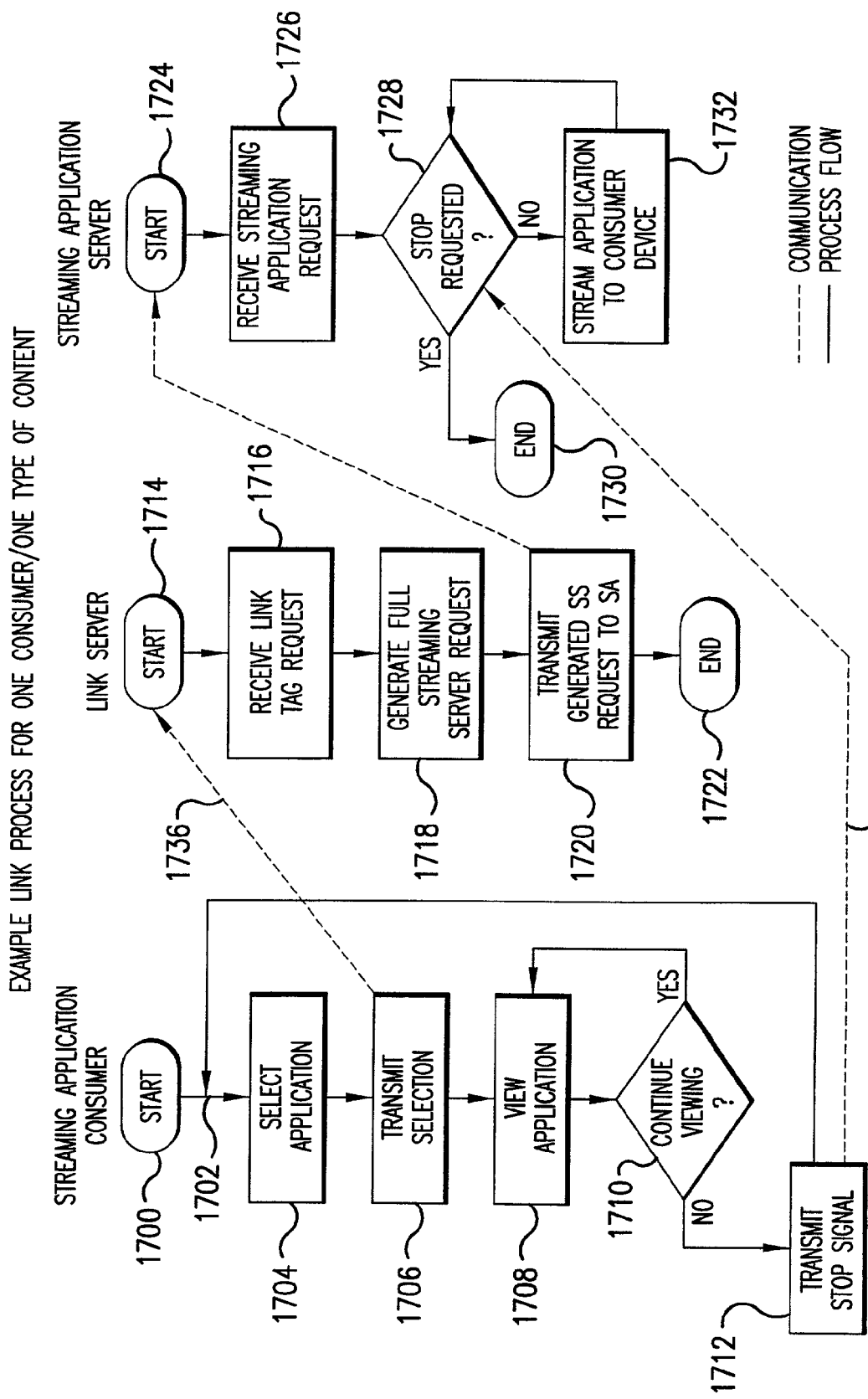
FIG. 17 shows an example trace of the process of the present invention for one requesting client and one type of content.

FIG. 17 depicts the steps of an example process for delivering multi-media content in a system which uses a link or connection server of the present invention. The specific ordering of the steps may be rearranged to accomplish the overall functionality described herein. A streaming application consumer executes 1700 a process of iteratively selecting a streaming application 1704, transmitting the selected streaming application 1706 resulting in the transmission of a streaming application client request 1736 to the link or connection server, viewing the selected streaming application 1708 and at step 1710 either continuing viewing, or possibly terminating the viewing 1712 resulting in the transmission of a stop signal 1734 to the streaming application server 1724, or return to the selection step 1702.

The link or connection server processes 1714 client request 1736 by obtaining the complete link or connection server request 1716, and, based on the type of streaming application content requested, generating the streaming application server request that will satisfy the client's request 1718. The link or connection server process transmits 1720 the generated request to the appropriate streaming application server 1736 and terminates the processing of the client request 1722, restoring resources to the link or connection server for use on subsequent client requests. The streaming application server spawns a process 1724 in response to a transmitted streaming application request from the link or connection server 1736. Subsequently, the streaming application obtains the complete request 1726, and while no intervening stop request from the client is received 1728 continues to stream the selected content to the client 1732. If a stop signal is received, the streaming server application process terminates 1730 returning all resources claimed by the process for the processing of other client requests.

Figure 18:
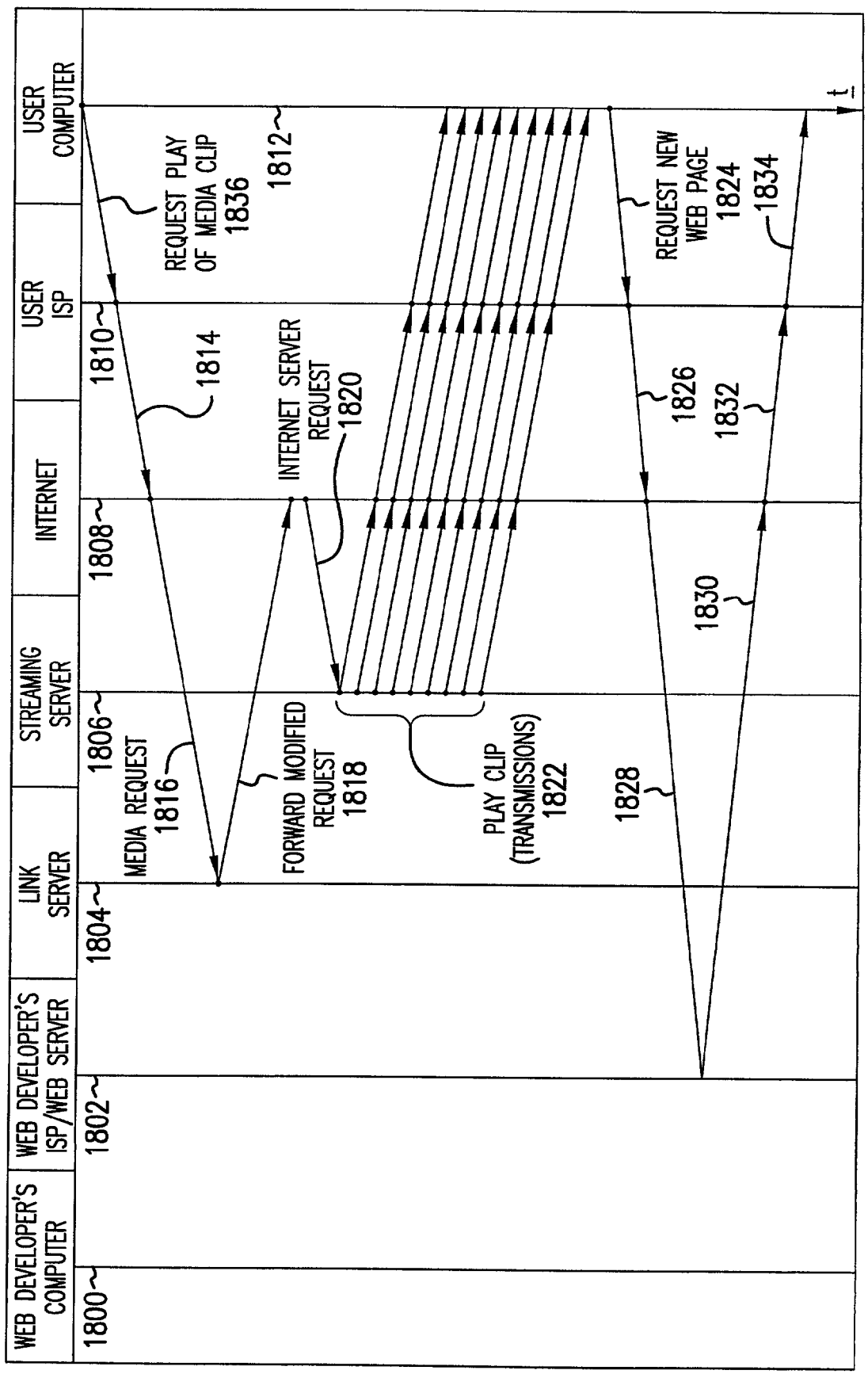
FIG. 18 shows a process-time diagram depicting an example sequence of events associated with a client's single request for a particular type of multi-media content.

FIG. 18 shows a process-time diagram for an example delivery of streaming application content to a client. The vertical lines represent the processor receiving the signal. For example, the vertical line 1800 represents the web developer's local computer. The nonvertical lines represent the flow of information and signals. For example, nonvertical lines 1828 represent the flow of information and signal from the Internet 1808 to the web developer's web server/ISP 1802. The flow lines are composed of arrows. The arrowhead indicates the direction and is pointed at the processor line of the destination processor. To indicate that information is transmitted from one processor to another, a dot is drawn at the processor line originating the information or signal and an arrow head is drawn with the apex coincident with the processor line receiving the information or signal. Where an arrow crosses a line without a dot or an arrowhead explicitly drawn, the information or signal is not directed at the processor represented by that line. For example, the information and signal line 1828 has a dot at the Internet line 1808 and an arrowhead at the web server/ISP line 1802 but crosses the link or connection server line 1804 and the streaming server line 1806. Consequently, the web server/ISP and the link or connection server does not receive the information or signal represented by that line 1802.

As depicted in FIG. 18, the request to play a media clip 1836 is transmitted from the client computer 1812 to the client computer's ISP 1810. The ISP 1810 then forwards the request 1814 to the Internet 1808 which in turn routes the request 1816 to the link or connection server 1804. In the simplified embodiment represented by this diagram, the link or connection server 1804 processes the request and dynamically generates a streaming server request that will satisfy the client request. The streaming server request generated is transmitted 1818 to the Internet 1808. The Internet 1808 routes the request 1820 to the appropriate streaming server 1806. The Streaming server initiates a sequence of transmissions 1822 directed at the requesting client's computer 1812 via the Internet 1808 and the requesting client's ISP 1810. At some point the transmissions 1822 from the streaming server cease and the user, after a time delay, issues a new page request 1824 to the web server 1802. The request is initially issued 1824 to the requesting client's ISP 1810. The request is then routed 1826 from the requesting client's ISP 1810 to the Internet 1808. Thereafter, the request is transmitted 1828 from the Internet 1808 to the web server 1802. The web server then retrieves the requested page and transmits 1830 the page to the Internet 1808. The page is further routed 1832 to the requesting client's ISP 1810 and is subsequently transmitted 1834 to the requesting client's computer 1812 where it is displayed.

FIG. 18 thus illustrates the fact that the web server is freed from having to process client requests for streaming application media because those requests are redirected to the link or connection server.

Figure 19:
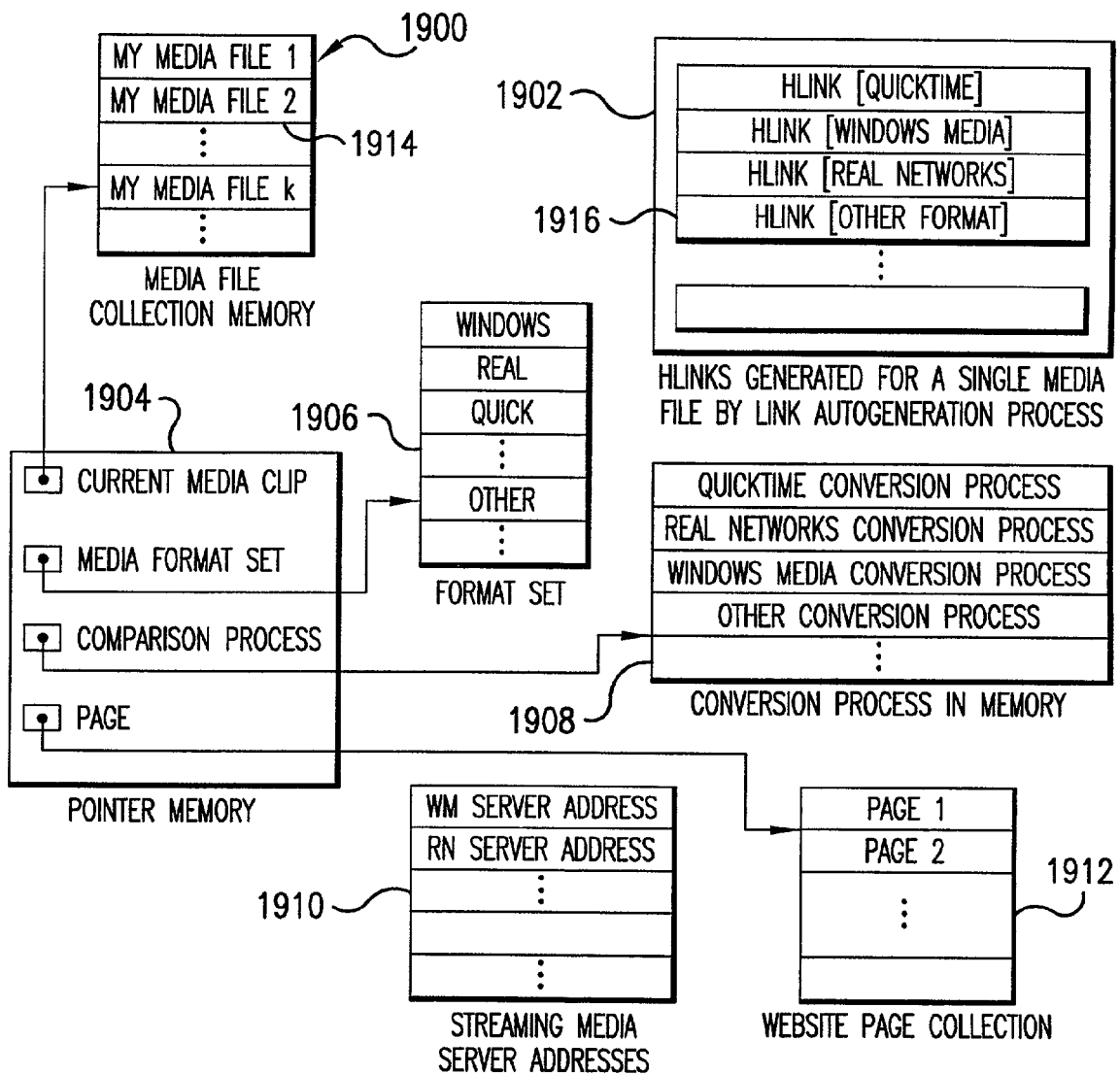
FIG. 19 shows the memory organization of a web developer's computer supporting the process of the present invention.

FIG. 19 shows the memory organization of an example web developer local workstation using the link or connection server and/or process of the present invention to handle requests from clients for streaming media application content. The components shown are those that support the preparation of media file and application content for the streaming application servers. The workstation memory includes a collection of media files 1900 (see individual file 1914) to be uploaded to streaming application servers which deliver the media file content to requesting clients, a set of supported media formats 1906, a set of generated link or connection server reference addresses (hlinks) 1902 (see individual link 1916), a collection of format conversion processes 1908, a collection of streaming application server addresses 1910 and a collection of web pages 1912 constituting the primary content of the website. A pointer memory is referred to as 1904.

Figure 20A:
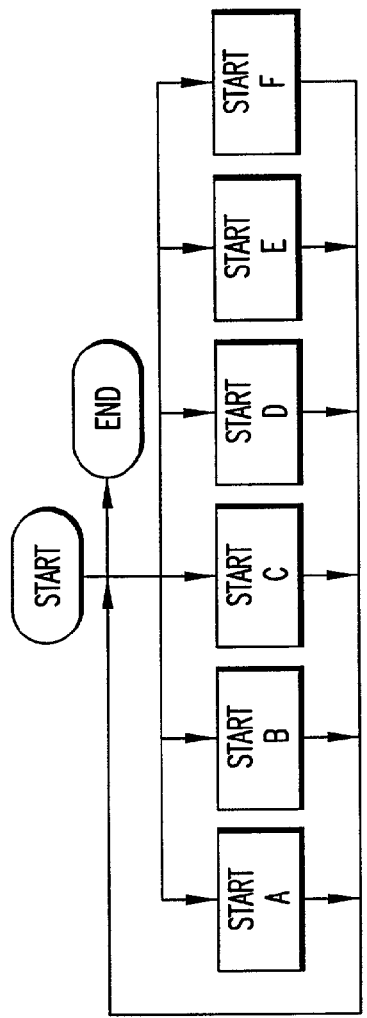
FIG. 20 shows the collection of processes used to enable the use of the link or connection server for media files.
Figure 20B:
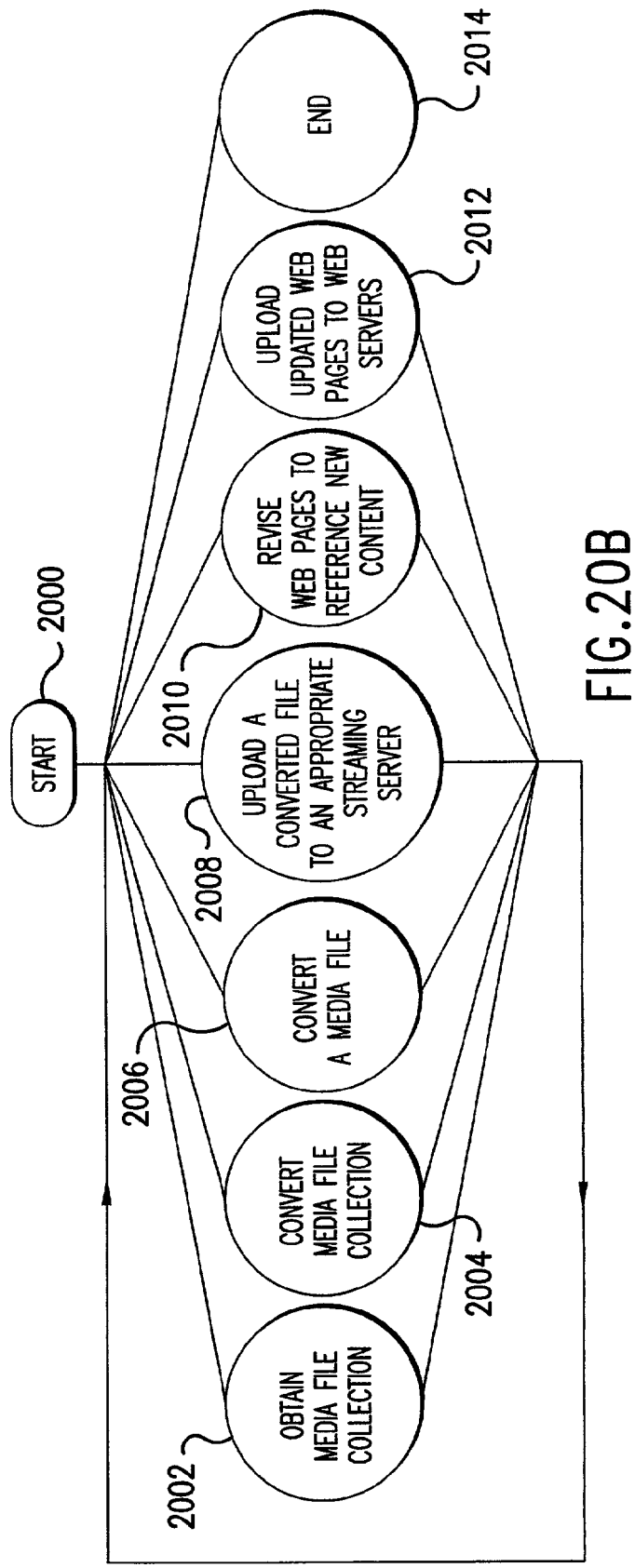

FIG. 20 depicts the general structure of a method a web developer uses to modify a web site to provide client access to streaming applications in conjunction with the link or connection server. Start is referred to as 2000. Other methods of modifying websites may also be used. In the embodiment described, upon obtaining a collection of media files 2002, a web developer must obtain conversions of the media files to all supported formats 2004. The conversion of a collection of media files can be accomplished by iteratively applying conversion processes to each media file 2006 sequentially, in parallel or portions thereof. Once a media file for a particular format is obtained, it may be uploaded to a streaming media or application server 2008 which hosts media of that type. In order to enable clients to request the new media or streaming application content, the web developer must update existing web pages to include a reference to the new content 2010. Edited web pages are also be uploaded to the web server 2012. The method terminates 2014 when all media files have been converted and distributed to the hosting servers, and all website pages have been updated to the web server provide clients with any desired access.

Any step in the depicted method can be performed without necessarily completing any other step for all media files, but the satisfaction of optional preconditions for a step is preferred. The precondition for obtaining a new media file collection is simply that new media files be available. A precondition for converting a media file collection to different streaming application formats is that at least one media file has been obtained. Since it is possible that new media files are provided in the desired format, there may not be a need to perform the conversion step on all media files. A precondition for converting a media file is that the file be available and there are sufficient memory resources free for the conversion. A precondition for uploading a streaming media file is that the file is in the proper format for the target server. A precondition for revising web pages so that the streaming media can be requested by a client is that the automatic tag generation process provided by the system of the present invention has been used to generate a reference that the link or connection server can convert to a request from the streaming server hosting the media.

Figure 21A:
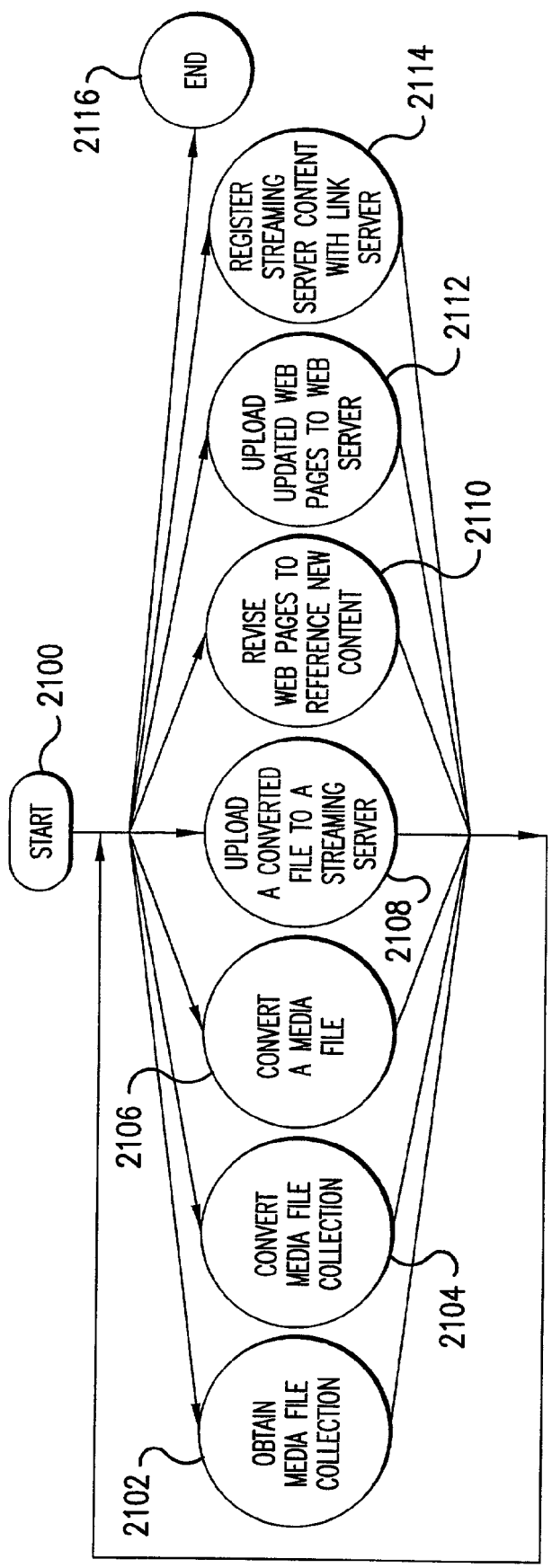
FIG. 21 shows the structure and processes that would support applying the link or connection server to content hosted on arbitrary servers.
Figure 21B:
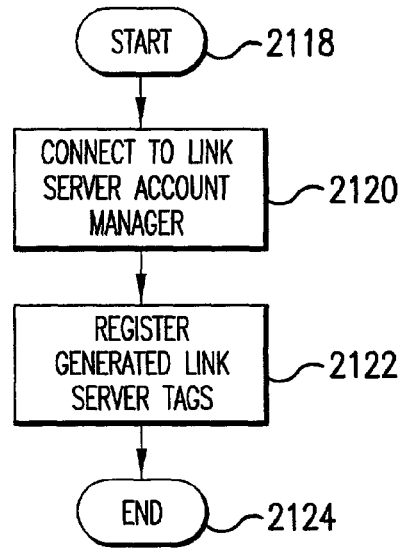

FIG. 21 depicts an embodiment of the link or connection server of the present invention in which web developers use the link or connection server in conjunction with streaming application content that may or may not be hosted on a streaming application server connected with the link or connection server such as Playstream™.

FIG. 21(*a*) shows, generally, the process of preparing streaming application content and registering 2114 the content with the link or connection server. In the Figure, 2100 refers to the start, 2102 refers to obtaining a media file collection, 2104 refers to converting the media file collection, 2106 refers to converting a media file, 2108 refers to uploading a converted file to a streaming server, 2110 refers to revising web pages to reference new content, 2112 refers to uploading updated web pages to a web server, and 2116 refers to the end.

FIG. 21(*b*) is a flow diagram showing the process 2118 a web developer would use to connect to a link or connection server 2120 and register streaming application content on the link or connection server 2122. In one embodiment, a web developer purchases or obtains the link or connection server tag that can then be used to deliver content to requesting clients via the link or connection server. Reference numeral 2124 refers to the end.

Figure 21C:
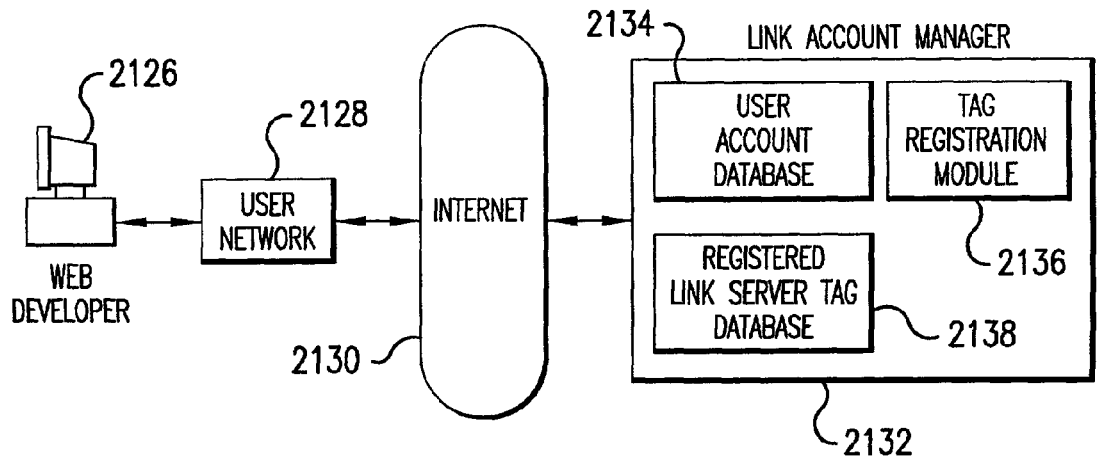

FIG. 21(c) shows a functional block diagram of a system in which streaming application content hosted on a server not directly connected with the link or connection server can be registered with a link or connection server. A web developer 2126 is connected to a user network 2128. The user network is connected to the Internet 2130. The link and connection server account manager 2132 comprising a user account database 2134, a tag registration module 2136 and a registered tag database 2138, processes requests from web developers to register a locally generated link or connection server tag.

An example method for applying the process of the present invention to update media files on a website is illustrated by the following algorithm. In the algorithm it is assumed that the set of desired media formats is defined, the set of media clips available for conversion is defined, the collection of processes needed for converting files of one media format to a desired target media format is defined, the collection of servers that host content of any given media format is defined and an embodiment of the AutoGenerateProcess of the present invention used to construct an html reference tag directing a website user content request to the link or connection server is available. Also, as would be evident to those of skill in the art, it is assumed that the means for applying functions to objects is available, and that some form of indexed storage, such as a dynamic array in Visual Basic 6.0 supports the data structure representations described. Of course, one or more of the above assumptions may be altered in the present invention.

Although this example procedure for enabling content using the link or connection server is a sequential algorithm, it should be understood that the invention described herein encompasses variations of the described process evident to those of skill in the art in which, for example, the order in which steps are performed is varied provided that all necessary preconditions for a step are satisfied. For instance, the web developer may create conversions of all media files before generating any link or connection server tags or updating any web pages. Also, a web developer may convert a single file into all desired formats and update all web pages for that particular media file before applying this method to other files. In addition to varying the order in which the steps of this method are executed, someone of ordinary skill in the art could employ alternative algorithm specification constructs to describe the method without thereby describing a different invention. The description that follows the algorithm should be used to interpret the algorithm and not necessarily the semantics of any particular programming language. Other variations embodying the invention described herein will be apparent to those of skill in the art.

Initialize(MyMediaFileCollection); (1)

For Each MyMediaFile in MyMediaFileCollection Do (2)
    CurrentMediaClip←MyMediaFile; (3)
    Initialize(MediaFormatSet); (4)
    For Each MediaFormat in MediaFormatSet Do (5)
    Initialize(Server[MediaFormat]); (6)
    Initialize(MediaConversionProcess[MediaFormat]); (7)
    CurrentMediaClip[MediaFormat]←(8)
        MediaConversionProcess[MediaFormat](CurrentMediaClip); (9)
    Upload(CurrentMediaClip[MediaFormat]; Server[MediaFormat]); (10)
    HLINK[MediaFormat]←(11)
        EasyLinkAutoGenerateProcess(CurrentMediaClip[MediaFormat]; (12)
        server[MediaFormat]); (13)
    For Each Web page in MyWebSite Do (14)
        Update(Web page, HLINK[MediaFormat])(15)
    End; (*updating web pages to reference the current formatted content*) (16)
End; (*constructing conversions for a given media file and updating web pages*) (17)

End; (*providing easllink server based access to a collection of media files*) (18)

For Each Web page in MyWebSite Do (19)
    Upload(Web page, Web server) (20)

End. (*uploading the website on the developer's computer to the web server*) (21)

As described in the above algorithm on line 1, all or substantially all of the files that are to be provided to users through the developer's website or e-mail distribution are included in the collection of media files MyMediaFileCollection. Next, each of the media files (see line 1) in the collection MyMediaFileCollection are converted to each of the media formats in MediaFormatSet (see line 2). For each different media format (MediaFormat) in the MediaFormatSet, a server for content of that format is selected (line 6), a process for converting media files of an arbitrary initial format to the format MediaFormat is selected (line 7), the conversion process selected is applied to the media clip (line 8-9), the converted media content is uploaded to the streaming server hosting that particular media file and file type (line 10), the process of the present invention for generating format independent reference tags is applied to the file (line 11-13) and each web page in the website which is intended to permit the end user to request the new formatted clip is updated to contain the generated reference tag (line 14-16). Finally, each revised web page is uploaded to the server. Thereafter, a selection of that multi-media clip will result in a link or connection server request.

Figure 22:
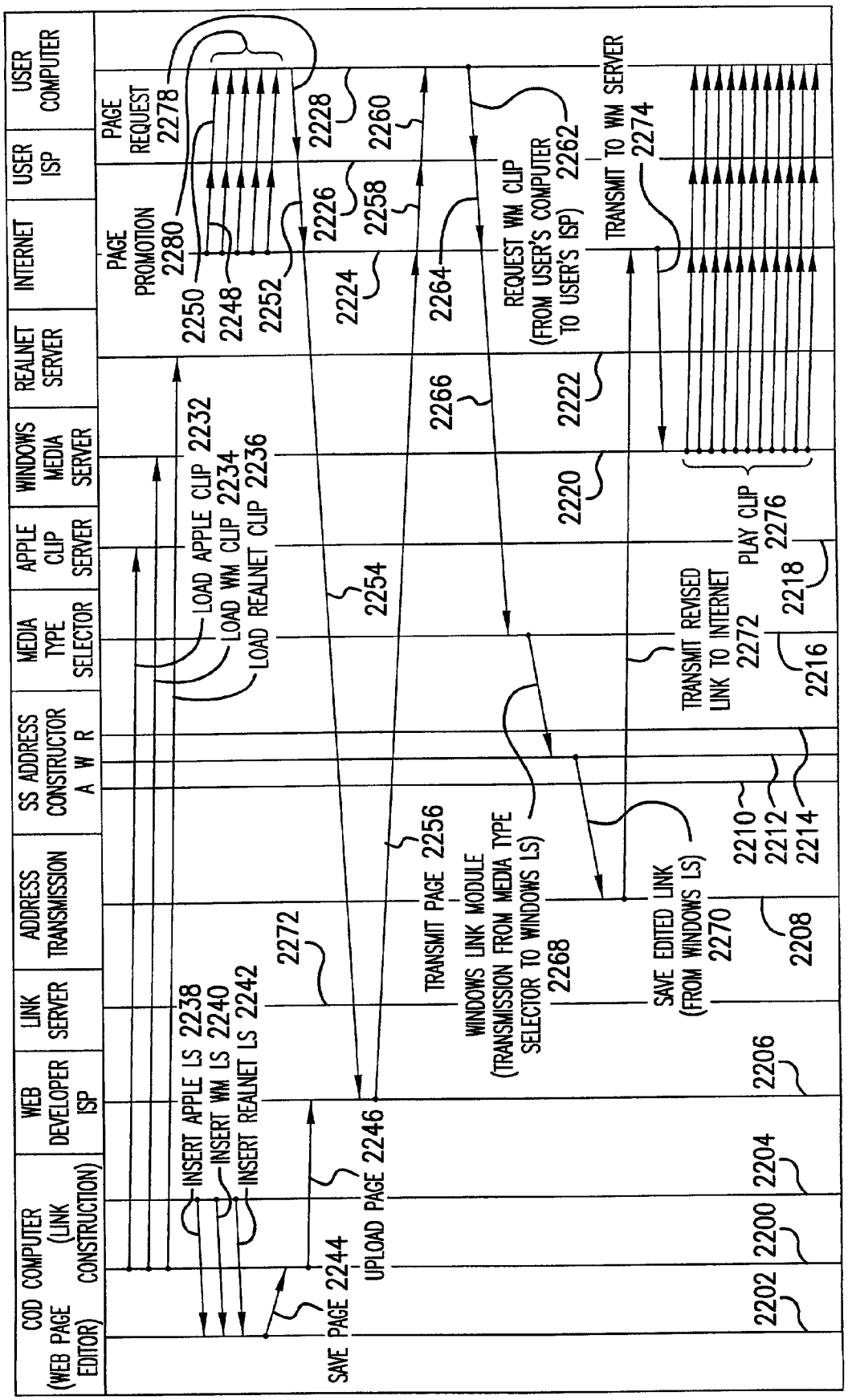
FIG. 22 shows a process time diagram tracing the sequence of events by which multi-media content is made available to a client using the system of the present invention.

FIG. 22 shows an example sequence in which a web developer, using the method of the present invention, delivers a multi-media clip to a requesting client. It is assumed that conversion processes have been applied, for example, to create Windows Media™, RealNetworks™ and QuickTime™ clips. Using a local workstation 2200, the QuickTime™ clip is uploaded 2232 to a QuickTime™ server 2218, the Windows Media™ clip is uploaded 2234 to a Windows Media™ Server 2220 and the RealNetworks™ clip is uploaded 2236 to a RealNetworks™ server 2222.

The link or connection server reference tag construction process 2204 is used to construct html reference tags for the Windows Media™, QuickTime™ and RealNetworks™ formats. The link or connection server reference tag for the Apple QuickTime™ clip is pasted 2238 into the web page editor 2202 for all pages providing a QuickTime™ player option for that clip. The link or connection server reference tag for the Windows Media™ clip is pasted 2240 into the web page editor 2202 for all pages providing a Windows Media™ player option for that clip. The link or connection server reference tag for the RealNetworks™ clip is pasted 2242 into the web page editor 2202 for all pages providing a Windows Media™ player option for that clip. Once the link or connection server reference tags are inserted into a web page, the page is saved 2244 and subsequently uploaded 2246 to the web server 2206.

A client workstation 2228 initiates a page request 2278 to the client ISP 2226 which forwards the request 2252 to the Internet. Subsequently, the web server 2206 receives the page request 2254 and transmits the page 2256 to the Internet 2224 whereupon the page is routed 2258 to the client's ISP 2226 before being directed 2260 to the client's machine 2228 for display. Page promotion is referred to generically as 2280 with requests between the user's computer 2228 referred to as 2280 and requests transmitted to the internet referred to as 2248.

With the requested page displayed, the client requests a Windows Media™ Clip 2262. The request 2262 is transmitted to the client's ISP 2226 which transmits the request 2264 to the Internet 2224. Since the requested page originated in a website using the system of the present invention, the request is routed 2266 to the link or connection server 2272 instead of the website owner's web server 2206. A media type recognizer 2216 determines that a Windows Media™ clip is requested and transmits the request 2268 to the Windows Media™ streaming server address constructor 2212 which, upon constructing a windows streaming server request with the indicated options, saves the constructed request 2270 to the request transmission module 2208. The request is thereafter routed 2272 to the Internet 2224 and, subsequently, to 2274 to the Windows Media™ Server 2220. The Windows Media™ Server 2220 initiates the playing of the clip 2276 on the client's display 2228 via the Internet 2224 and the client's ISP 2226. An Apple address constructor A is referred to as 2210 and a RealNetworks™ address constructor is referred to as 2214.

Although this embodiment portrays a particular sequence of steps in a system using the method of the present invention, the invention encompasses variations that would be apparent to those of ordinary skill in the art.

Figure 23:
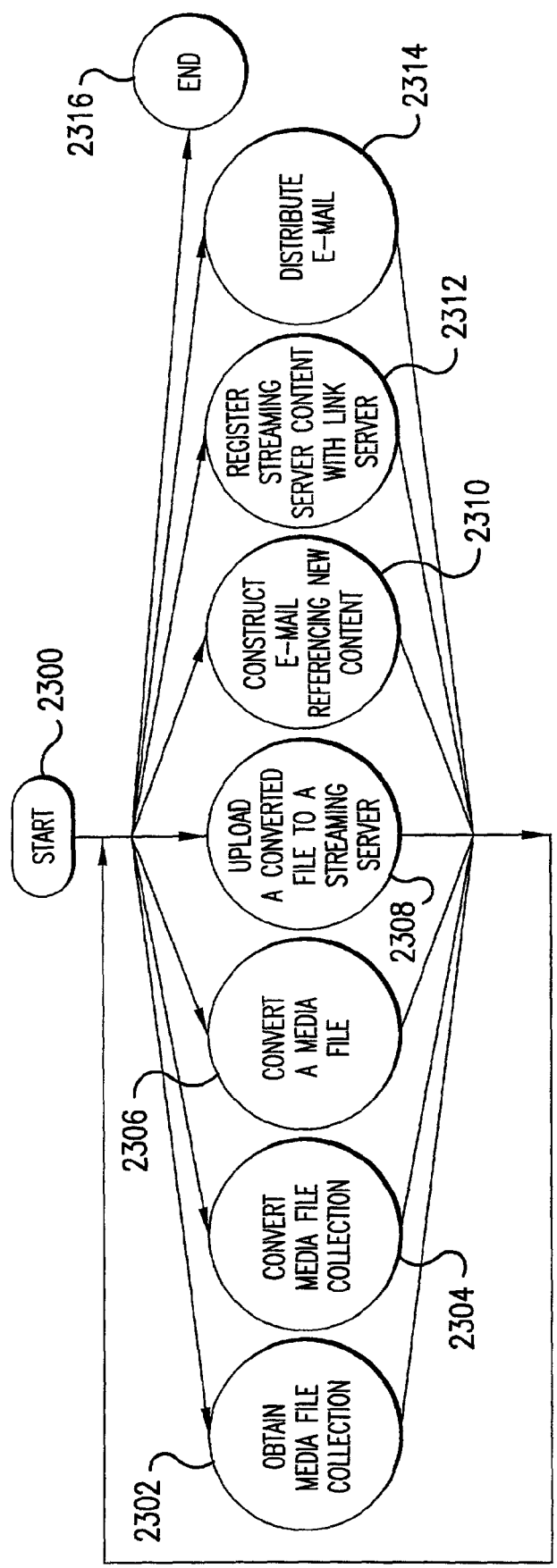
FIG. 23 shows the extension of method of the present invention to content distribution using electronic mail in addition to or instead of web pages.

FIG. 23 depicts a process for providing streaming application content through the distribution of electronic mail 2314. The generated link or connection server reference tags are embedded in an electronic mail message which is distributed to individuals on a mailing list. Start of the method is referred to as 2300. Reference numeral 2302 refers to obtaining the media file collection. Reference numeral 2304 refers to converting the media file collection. Reference numeral 2306 refers to converting a media file. Reference numeral 2308 refers to uploading a converted file to a streaming server. Reference numeral 2310 refers to constructing e-mail referencing new content. Reference numeral 2312 refers to registering streaming server content with link. The end is referred to as 2316.

Figure 24:
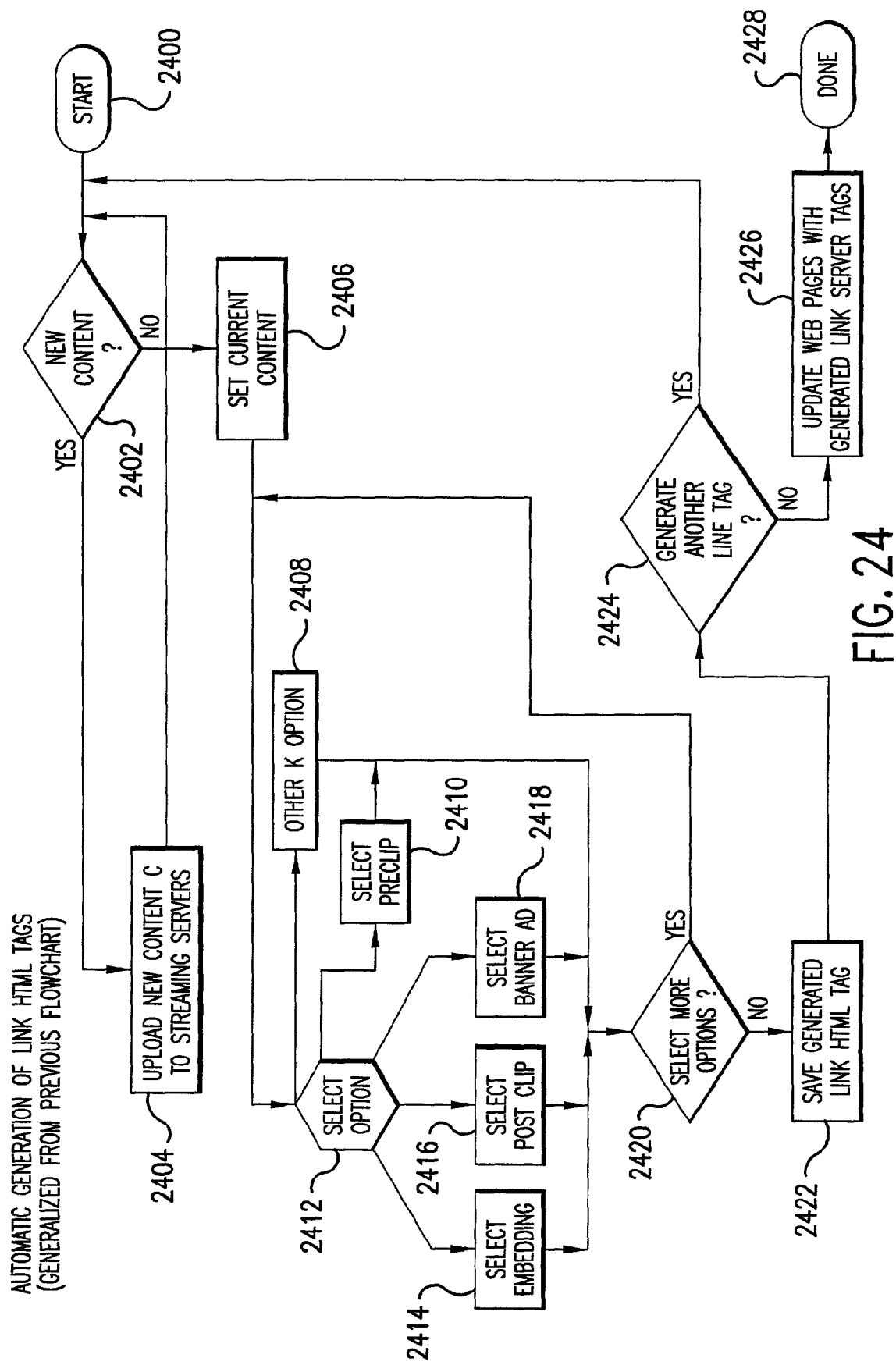
FIG. 24 shows an example procedure for specifying options used to automatically generate tags for the link or connection server.

FIG. 24 depicts an embodiment of the method 2400 by which a web developer can use the link or connection server reference tag generation process to generate html reference tags to be embedded in a web page or an electronic mail message. In the embodiment described, the process the web developer uses to automatically generate the link or connection server reference tag is independent of the type of streaming application media being provided by the link.

If the content to be referenced by the link is new content 2402, the content will have to be uploaded 2404 to the appropriate streaming server. Otherwise, for each media clip requiring a tag 2406 the web developer has the option of adding 2412 to the satisfaction of a play request options by attaching a pre-clip 2410, selecting a banner ad 2418, selecting a postclip 2416, selecting some other standard option 2408 or selecting a page in which the streaming application should be embedded 2414. In the embodiment depicted, the options may be specified in any order. Once all options are selected 2420, the generated easy link tag is saved 2422. When this occurs the web developer may either generate more tags 2424 or update all existing web pages with the new link or connection server reference tags 2426 and terminate 2428 the link option selection process.

Figure 25:
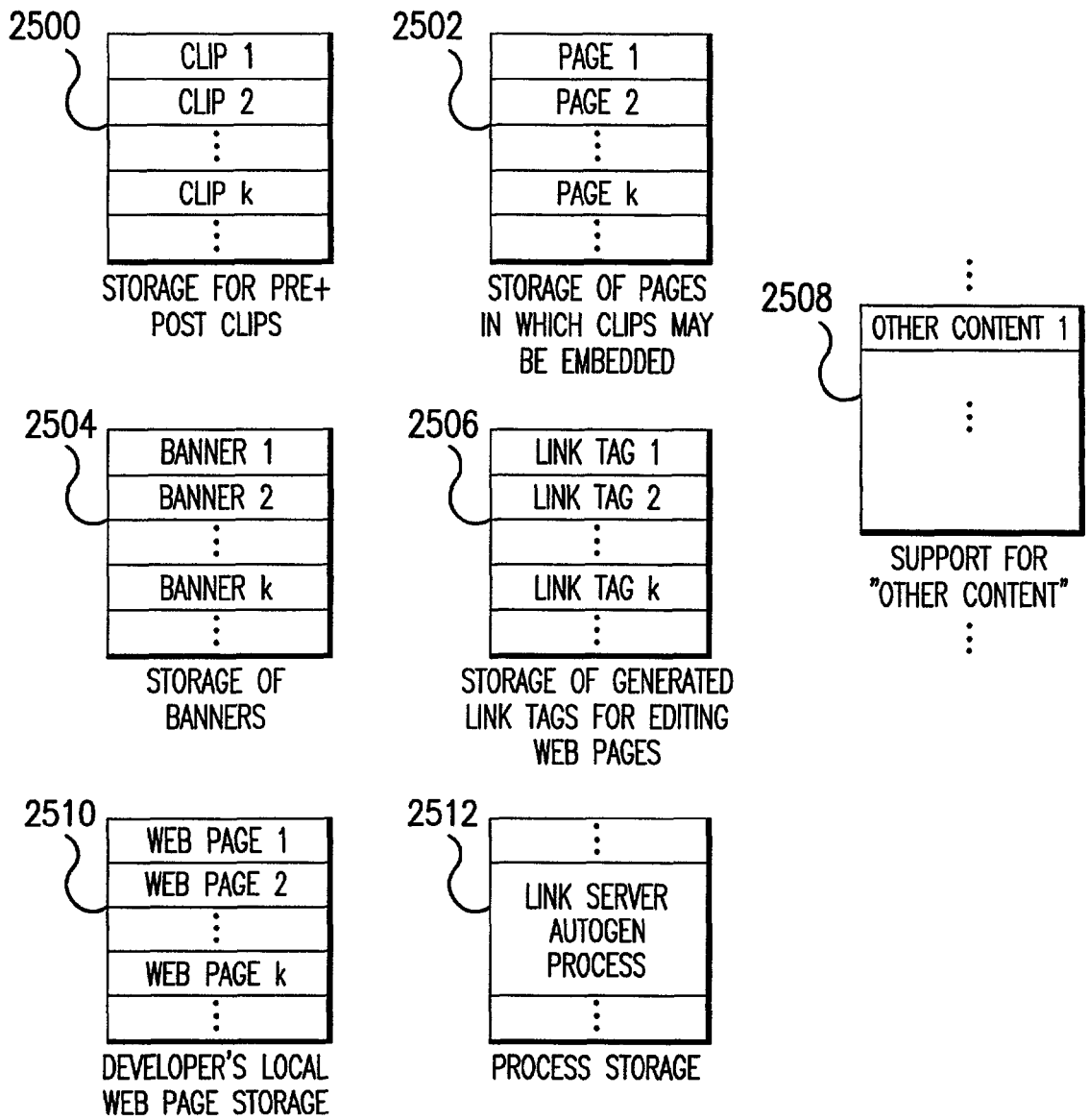
FIG. 25 shows the memory organization supporting the automatic generation of tags for the system of the present invention.

FIG. 25 depicts an alternative embodiment of a memory structure of a web developer's workstation that supports the link or connection server reference tag generation process. In order to support the options made available through the reference tag generation process, the web developer's workstation memory includes pre-clip and post-clip storage 2500, storage of pages within which a client's requested clip is to be embedded 2502, storage of banners 2504 that are optionally displayed during the display of streaming media content, storage of generated link or connection server reference tags for insertion into web pages 2506, the local version of the pages on the developer's website 2510, storage for the automatic link or connection server reference tag generation algorithm 2512 and storage for content designated for unspecified alternative options 2508. This particular memory organization is shown only for the purpose of illustrating how memory requirements may be allocated to support the generation of link or connection server reference tags, but the invention includes embodiments in which the content indicated is only made available indirectly over a network. The invention encompasses embodiments in which the web developer's machine workstation little or no local storage but relies instead on remote computation to generate the desired link or connection server reference tags.

The system of the present invention enables the web site developer to link web pages (or email) to media files on streaming servers with a new level of simplicity. The system of the present invention advantageously does not require the user to understand the complexities in linking streaming media to their web page (or to an email) as this application remains transparent to the end user. This includes the linking RealNetwork's RealMedia™ files, Microsoft's Windows Media™ files, Apple's QuickTime™ files. Before the system of the present invention, a web site developer had to manage three separate files to enable a media file to stream to a web page: a) the web page from which the developer desires to provide the end user with access to the media file over the Internet, a hidden simple text or file over the Internet a hidden simple text or reference file which contains the Internet address to the media file and the media file. With the system of the present invention, the web site developer advantageously eliminates step (b) (the generation and maintenance of the reference file) and can link the web page directly to the media file.

Typically, the Internet service provider (ISP) must properly configure the MIME-types on the web server to recognize the reference file for each streaming media format (RealMedia™, Windows Media™, or QuickTime™). As easy link dynamically links directly from the web page to the streaming server the absence of using the reference files also removes the need for the ISP to properly configure the mime types on the web server.

The system of the present invention also enables the web site developer to use a standard hyperlink (href) link on a web page that now points directly to their media on the streaming server. Before the system of the present invention, the user would have to learn the specific linking requirements of each format. Thus, by simplifying the linking method required to stream audio or video on a web page, the web site developer benefits from a new level of simplicity as well as an ability to quickly deploy streaming media onto a web site.

Due to the system of the present invention's modular architecture, its capabilities include, but are not limited to: digital rights management, content syndication, and application streaming.

Figure 26:
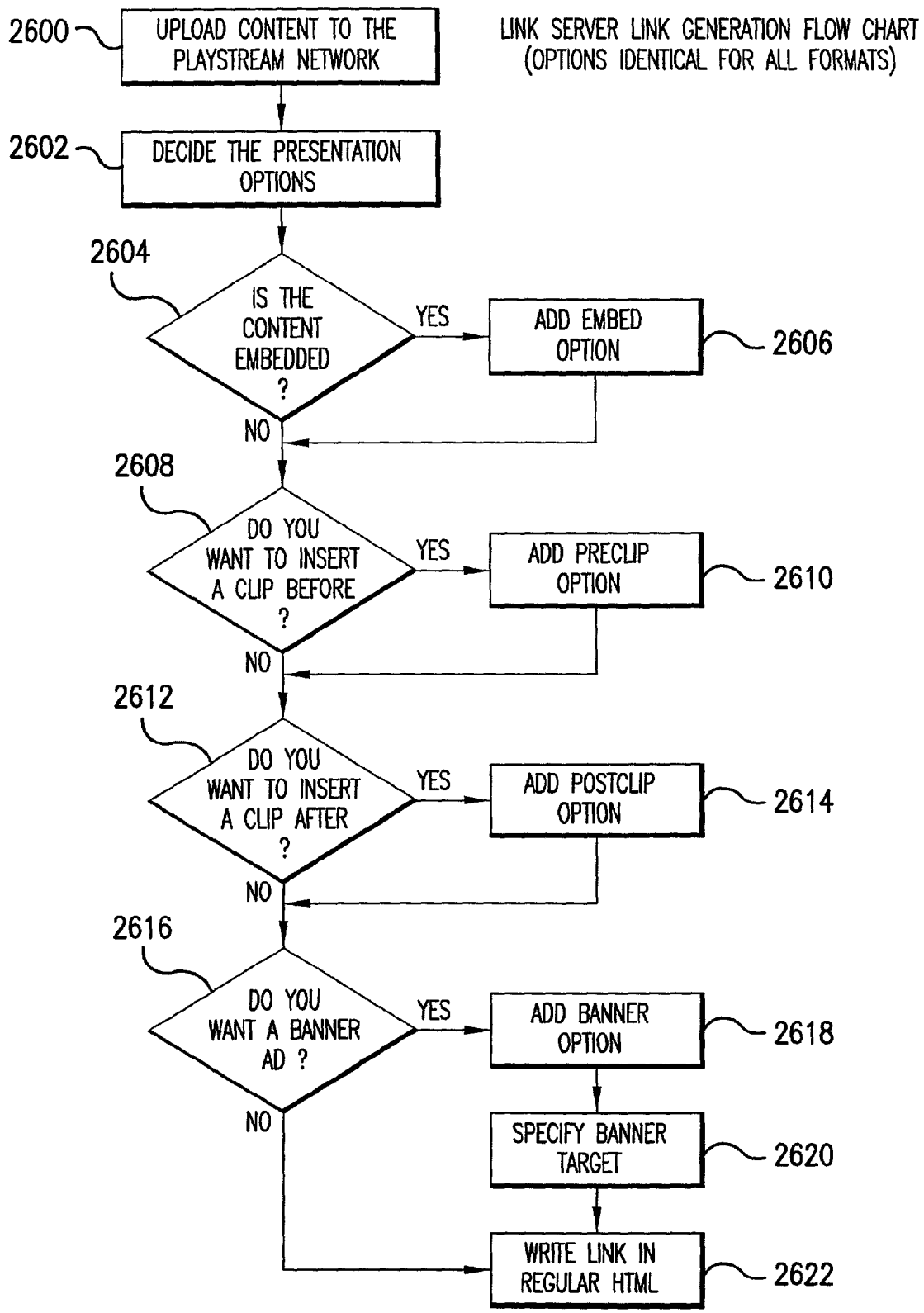
FIG. 26 shows an embodiment of the method of interacting with the web developer to obtain information needed to construct a tag.

The chart in FIG. 26 depicts a particular embodiment of the method for specifying options for the generation of a link or connection server HTML reference tag when the web developer hosts streaming media content on the PlayStream™ network 2600. Once the streaming media content is uploaded to the playstream network, the web developer specifies presentation options 2602. The selection of presentation options is depicted in FIG. 26 as a sequence of choices. First, the web developer determines if the streaming media is to be embedded in a web page 2604. If so, then the option to embed the streaming content is added 2606. Next the web developer determines if a media clip should be played before the requested media clip is displayed 2608. If so, then the option to play a pre-clip is specified 2610. Next the web developer decides whether to play a media clip after the requested content 2612. If so, then the post clip option is added 2614. Finally the web developer must decide if a banner ad should be displayed 2616. If so, then the banner ad option is added 2618 and the developer specifies the banner target 2620. Finally, a link in regular html is generated 2622. This html reference tag can then be embedded in a web page (and/or an electronic mail message) displayed to the client. When the indicated content is requested the streaming application server can display the requested clip in accordance with the options specified in the above procedure.

The procedure depicted in FIG. 26 merely illustrates one possible way in which the method for deploying streaming application content can be achieved without using a web server to process the streaming application requests. Instead the link or connection server becomes the target of the request and automatically forwards the client request to the appropriate server.

Link Server enables the website developer to link web pages (or e-mail) to media files on streaming servers with a new level of simplicity. Link Server does not require the user to understand the complexities in linking streaming media to their web page (or to an e-mail) as this application remains transparent to the end user. This includes the linking of RealNetwork's RealMedia™ files, Microsoft's Windows Media™ files, Apple's QuickTime™ files. Before Link Server, a website developer had to manage three separate files to enable a media file to stream to a web page:

a) the web page from which the developer desires to provide the end-user with access to the media file over the Internet;
 b) a hidden "Simple Text" or reference file which contains the Internet address to the media file; and
 c) the media file.

With Link Server, the website developer eliminates step "b" (the reference file) and can link the web page directly to the media file.

Under the current method, the Internet Service Provider (ISP) must properly configure the MIME-types on the web server to recognize the reference file for each streaming media format (RealMedia™, Windows Media™, QuickTime™). As Link Server dynamically links directly from the web page to the Streaming servers, the absence of using the reference files also removes the need for ISP to properly configure the MIME-types on the web server.

Link Server also enables the website developer to use a standard hyperlink ("href" link) on a web page that now points directly to their media on the streaming server. Before Link Server, the user would have to learn each streaming media format's specific linking requirements, and protocols to use. Thus, by simplifying the linking method required to stream audio or video onto a web page, the website developer benefits from a new level of simplicity as well as an ability to quickly deploy streaming media onto a website.

Due to Link Server's modular architecture, the benefits of Link Server will be extended to include other capabilities including, but not limited to, Digital Rights Management, Content Syndication and Application Streaming.

Figure 27A:
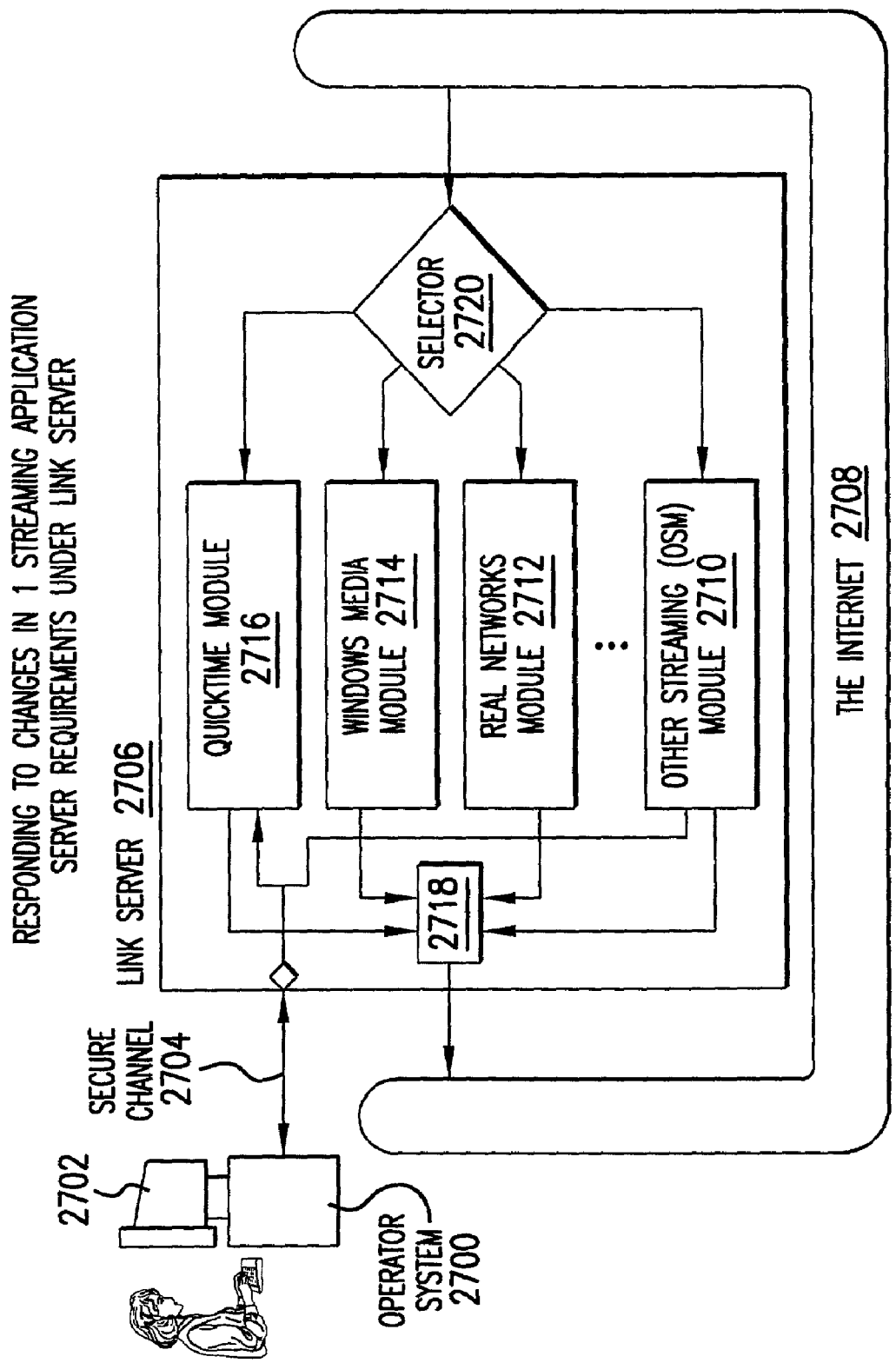
FIG. 27 shows the structure and process for revising the link or connection server of the present invention in response to changes in the requirements of content servers.
Figure 27B:
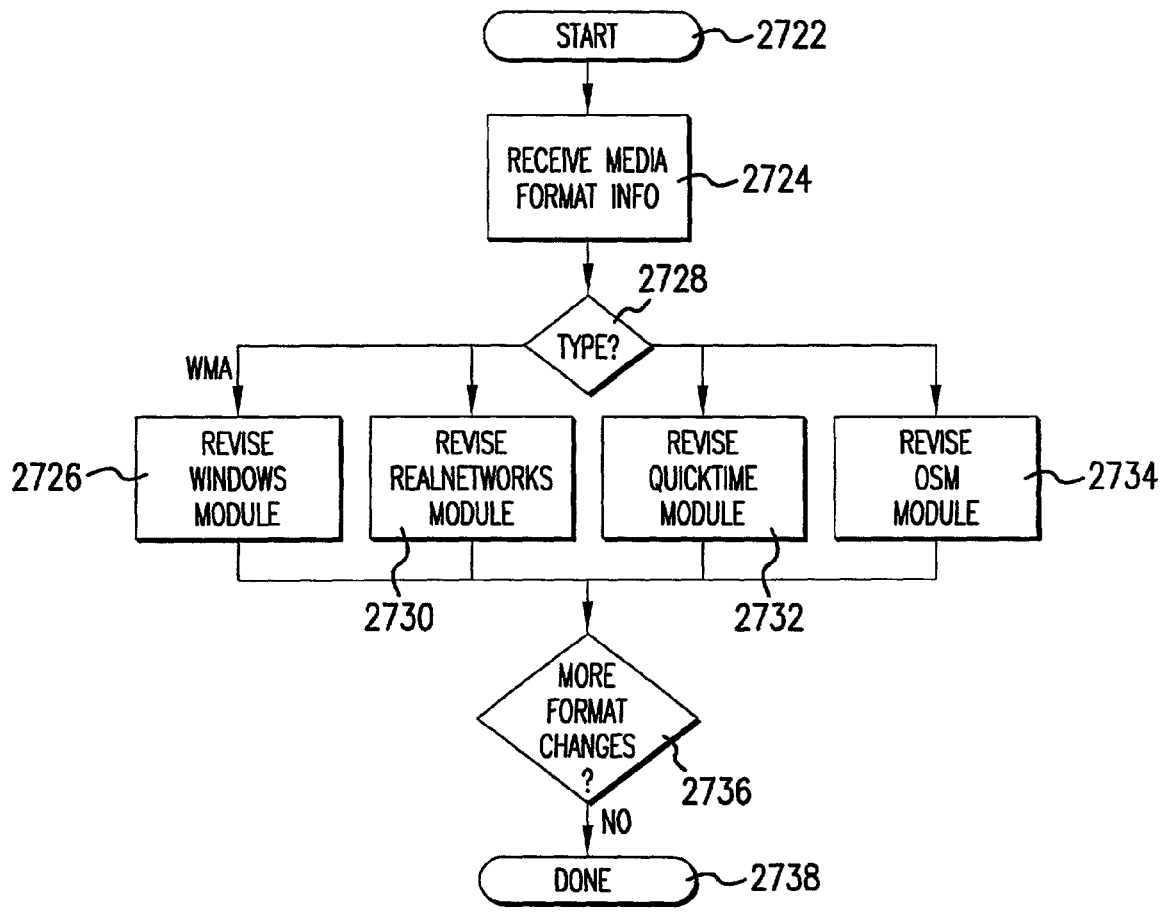

FIG. 27 shows features of a particular embodiment of the link or connection server system that would support changes to the link or connection server in response to changes in the access requirements of servers of multi-media streaming application content already supported or to introduce link or connection server support for a new type of multi-media application content. It is a feature and advantage of the system of the present invention that changes in the processing of client requests for server content can be accomplished at the link or connection server without the need for the web developer to edit thousands of format specification files or obtain changes in the support capabilities of the web server.

In the embodiment described in FIG. 27($a$), changes to the capabilities of the link or connection server are performed by an operator 2700 from a workstation 2702 responsively connected through a secure channel 2704 to the link or connection server 2706. The link or connection server includes individual modules which contain the information necessary to transform link or connection server reference tag requests for streaming media application content into a request that will deliver the web developer's content to the requesting client, including a QuickTime™ module 2716, a Windows Media™ module 2714, a RealNetworks™ module 2712 and a module for each of any additional supported client servers 2710. The individual modules actively process client requests directed to them via a request selector 2720. The transformation of a client request into a request of the required form to initiate the transfer of content to the client is routed to the Internet 2708 via the network interface module 2718. The operator workstation 2702 has components sufficient to support the retrieval, editing and replacement of the programming code used to implement the request transformation modules of the link or connection server.

FIG. 27($b$) gives a flow diagram for the process 2722 the operator of the link or connection server could use to make changes to the link or connection server in response to the addition of a new supported media type or in response to changes to the request requirements of an existing client server. The link or connection server operator receives 2724 information specifying a new server request requirement, identifies the proper module of the link or connection server 2728. If the proper module is the Windows Media™ Module then the operator revises 2726 the Windows Media™ module. If the proper module is the RealNetworks™ Module then the operator revises 2730 the Windows Media™ module. If the proper module is the Apple QuickTime™ Media Module then the operator revises 2732 the Windows Media™ module. If the proper module is a module associated with some other kind of streaming media, the operator revises 2734 that module. If there are more revisions to make 2736 the operator repeats the above procedure. Otherwise the procedure for updating the link or connection server stops 2738 and the link or connection server is ready to service client requests directed at those servers.

The only changes to the web server required by the above alternative procedure involve the privately owned and controlled pages of the web developer if there is a need to add a link or connection server reference tag to a web page. There is no requirement that the web server change its control configuration. Since the control configuration of a web server is typically cannot be modified by individual web site owners, the link or connection server removes an important obstacle to the process of rapidly deploying new multi-media content to requesting website clients.

Figure 28:
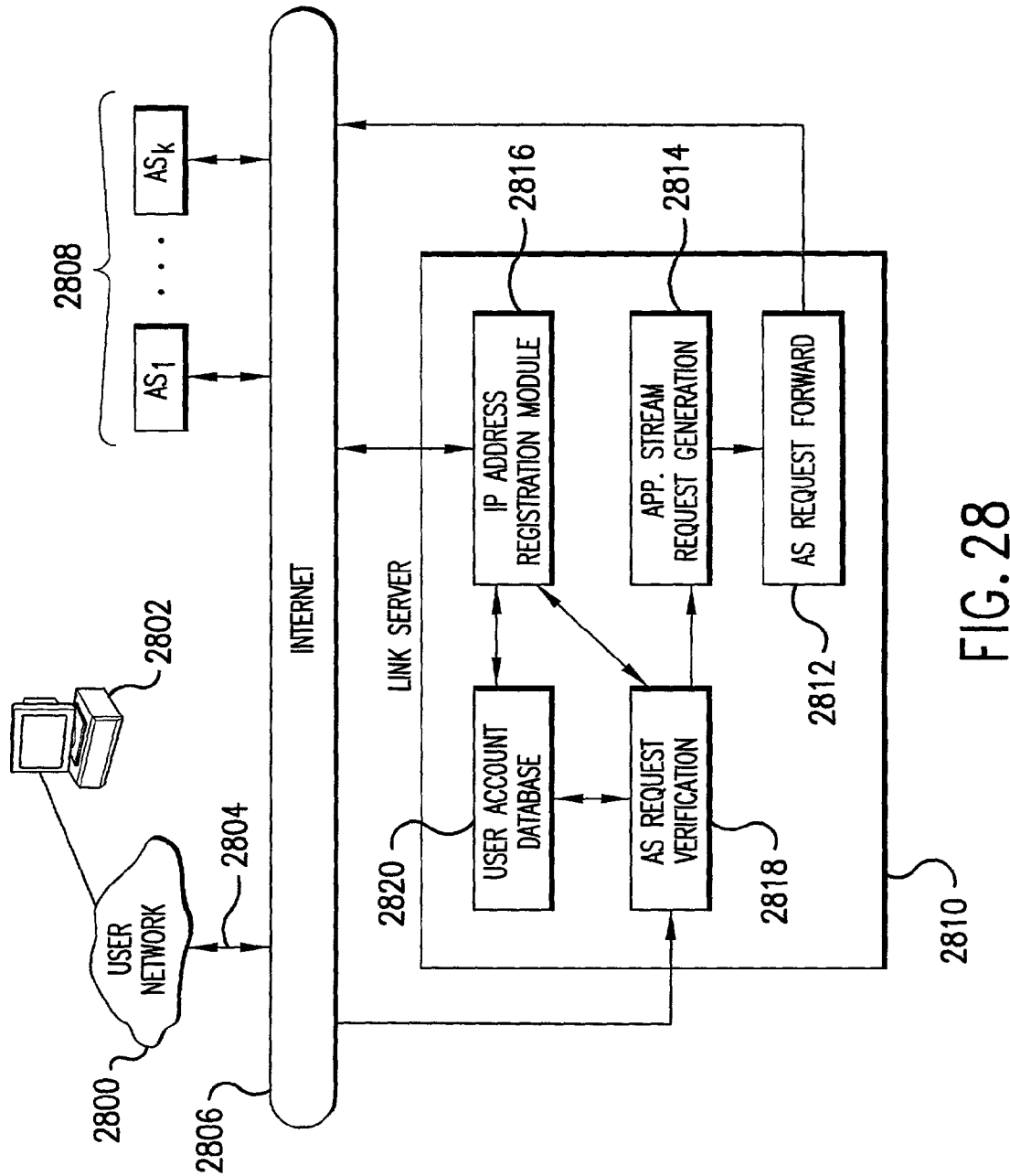
FIG. 28 depicts an embodiment illustrating the use of the link or connection server of the present invention for managing pay per view.

FIG. 28 depicts an alternative embodiment of the link or connection server which can support a pay per view scheme for charging clients for requested content. A client workstation 2802 is connected 2804 to a user network 2800 which in turn is responsively connected to the Internet 2806. A collection of Application Streaming Servers 2808 is connected to the Internet 2806. The link or connection server 2810 is connected to the Internet. When a client request is received by the link or connection server, the request is channeled to an IP address registration module 2816, which determines whether the requesting client is authorized to receive the content requested. If the requesting client is authorized, then the application stream request generation module 2814 constructs the appropriate server request and passes it to an application stream request forwarding module 2812 for routing to the designated application streaming server 2808. If the requesting client is not authorized, then the information regarding the failure of the request is passed to a request verification module 2818 which optionally may initiate an authorization dialogue with the requesting client. Both the request verification module 2818 and the IP address registration module are responsively connected to a User Account Database 2820 which provides information about User Accounts and processes updates to those accounts, including the association between client workstations and user accounts.

Although the embodiment described in FIG. 28 shows a particular method of identifying requesting clients, other methods will be obvious to one of skill in the art. For example, by issuing a request for streaming application media from a form web page containing a field containing a secure key, a user may explicitly provide authorization information without the need to register the IP address of the client workstation being used.

Figure 29A:
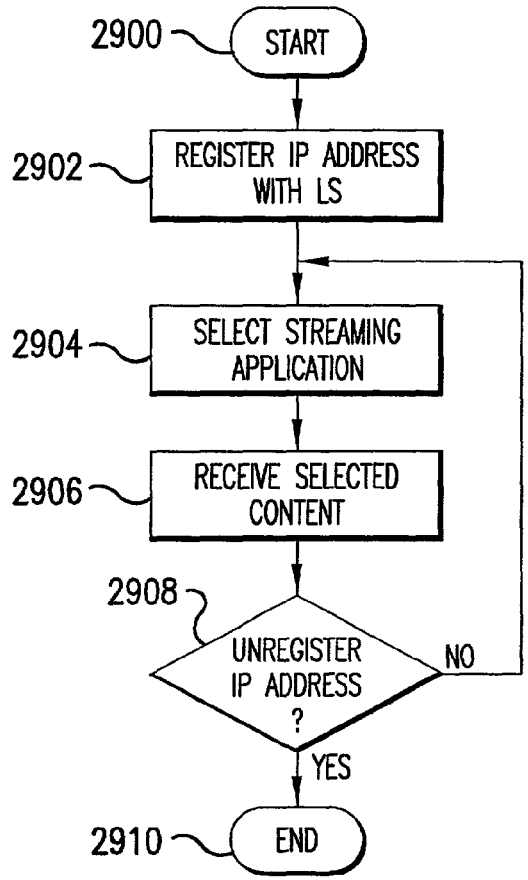
FIG. 29 depicts a collection of processes which support the use of pay per view in conjunction with the link or connection server of the present invention.
Figure 29B:
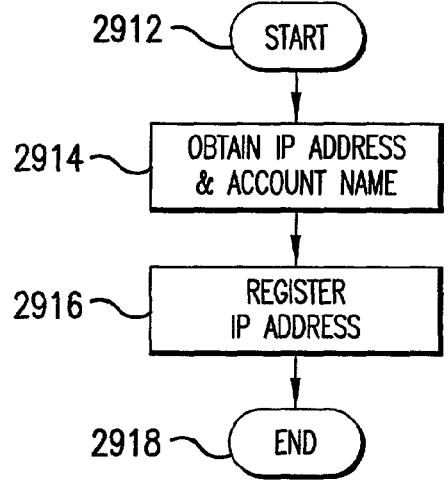

FIG. 29 depicts a collection of processes, which together illustrate a method by which multi-media streaming application content is delivered on a pay per view basis to requesting clients. The start is referred to as 2900. In the embodiment depicted, it is assumed that the network is organized as depicted in FIG. 28. FIG. 29(a) depicts the process from the perspective of the requesting client. The client registers her workstation 2902 with the link or connection Server. Subsequently, the client selects a particular streaming application 2904, receives the selected content 2906, views the selected content, and at step 2908 either terminates 2910 the registration of the workstation for further selections or selects streaming application content 2904. FIG. 29(b) depicts the process (starting at 2912) by which the link or connection server verifies the registration of a client workstation. First, the link or connection server obtains the IP address of the client workstation 2914. Then the IP address is registered 2916 with appropriate information regarding the registration recorded in the user account module. The method ends at 2918. FIG. 29(d) shows the general process (starting at 2920) by which the link or connection server determines whether a client request is a request for pay per view material. The link or connection server first receives the client request 2922. After receiving the client request, the link or connection server tests the request to determine if it requests pay per view content 2924. If not, then the ordinary link or connection server procedure is used to generate the streaming server request for the server hosting the requested content 2926. After generating the request, the request is routed to the server 2928 and the processing of the request by the link or connection server terminates 2930. FIG. 29(c) depicts the process (starting at 2932) activated when the requesting client seeks to obtain pay per view content. Upon receiving a request to stream pay per view content to a given IP address 2934, the IP address is checked 2936 to see if it is registered to receive the content. If not, then in this embodiment of the invention, the process ends. If the IP address is registered, then the application streaming request to the server hosting the requested content is generated 2938 and routed to the server. The link or connection server then records 2940 the fact that the pay per view request for the account corresponding to the registered IP address was sent and the process at the link or connection server for this request terminates 2942.

Although the embodiment of the invention described above uses the IP address of the requesting workstations to confirm authorization and track account usage, other embodiments based on form issued secure identification keys, secure tokens, and the like, are included within the invention described.

Figure 30:
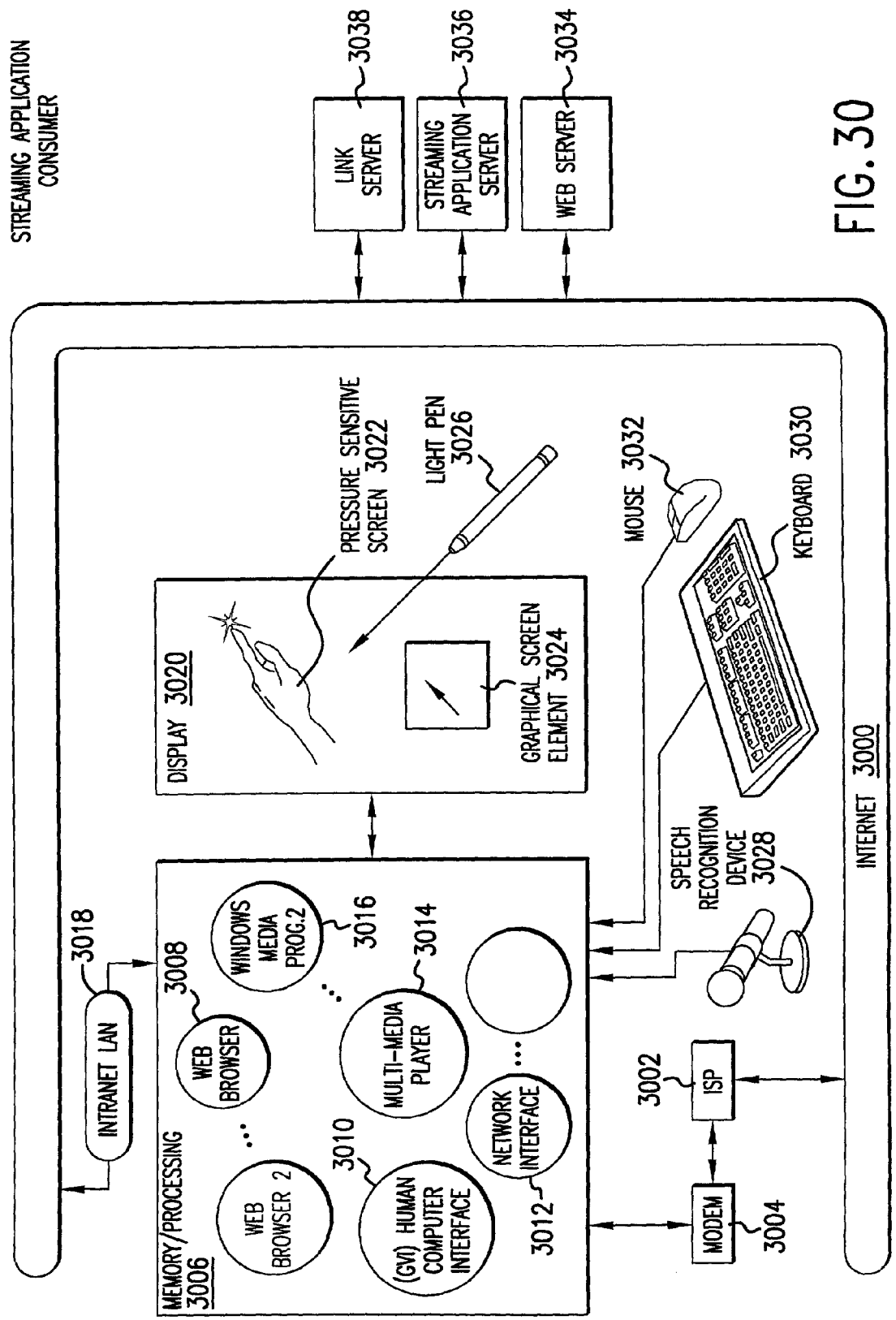
FIG. 30 depicts a client workstation with a plurality of devices and applications for obtaining and selecting remotely hosted Internet content.

FIG. 30 depicts an embodiment of a client workstation with structure supporting the retrieval of remote information from the Internet 3000. The workstation 3006 is shown connected to the Internet by both LAN 3018 and MODEM 3004 through an ISP 3002. The ISP is connected to the Internet. The processor memory of the workstation is shown supporting a number of applications including two web browsers such as Netscape™ 3008 and Microsoft Internet Explorer™ 3010 and a collection of multi-media content players 3014 including Windows Media™ player 3016 and QuickTime™ player. The workstation further includes a network interface 3012 which supports receiving and transmitting information to and from the Internet respectively. In addition, the workstation is equipped with two button ergonomic mouse 3032 and an Internet ready keyboard 3030. The workstation further includes a microphone 3028 for transferring voice inputs to the workstation. Responsively connected to the workstation is a display 3020 which consists of a matrix of graphical display locations responsive to selection actions of the client. Depicted in this display are devices which enable the client to interact with the display and make selections including a mouse cursor 3024, a touch sensitive screen 3022, and a light pen 3026. The diagram also shows a link or connection server 3038, a streaming application server 3036 and a web server 3034 bidirectionally connected to the Internet and responsive to the requests of the client.

Figure 31:
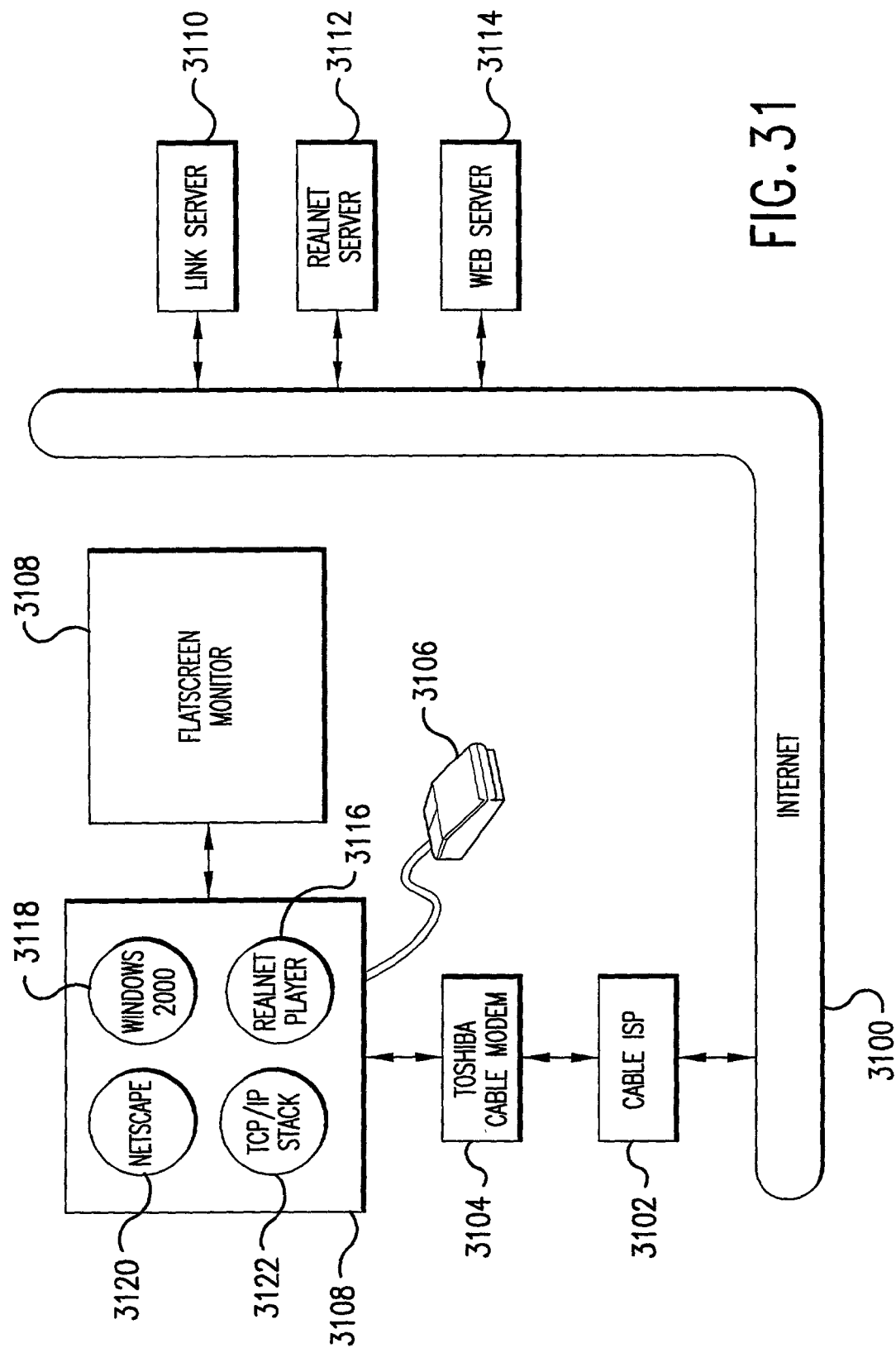
FIG. 31 depicts a client running Netscape™ and RealNetworks™ player under Windows 2000™ while connected to the Internet via cable modem.

FIG. 31 shows an additional embodiment of a client workstation connected to the Internet 3100. In this embodiment, the client workstation uses Netscape™ 3120 as its primary browser. The client workstation further runs Windows 2000™ 3118 as its operating system. In addition, the processing of information from the Internet is achieved through use of the Microsoft TCP/IP stack 3122. The client workstation depicted relies exclusively on RealNetworks™ Player 3116 for viewing and listening to multi-media application content. The client workstation also includes a flat screen monitor 3108 as the primary means by which the client views the selection options for multi-media application content. The primary means of client interaction with the options displayed is through a two button ergonomic device 3106. The connection to the Internet is achieved through the use of a Toshiba Cable Modem 3104 transmitting at speeds up to 100 Mbps. The cable modem is connected to cable which in turn is connected to the Cable Company as the primary ISP 3102. The Cable ISP is connected to the Internet. In this example, the connection is a T1 connection. The figure also shows three content servers. A link or connection server 3110 handles the processing of link or connection server reference tags. A RealNetworks™ server 3112 satisfies requests for hosted RealNetworks™ media and a web server 3114 responds to requests for web pages by retrieving web pages requested and routing them to the client's workstation.

Figure 32:
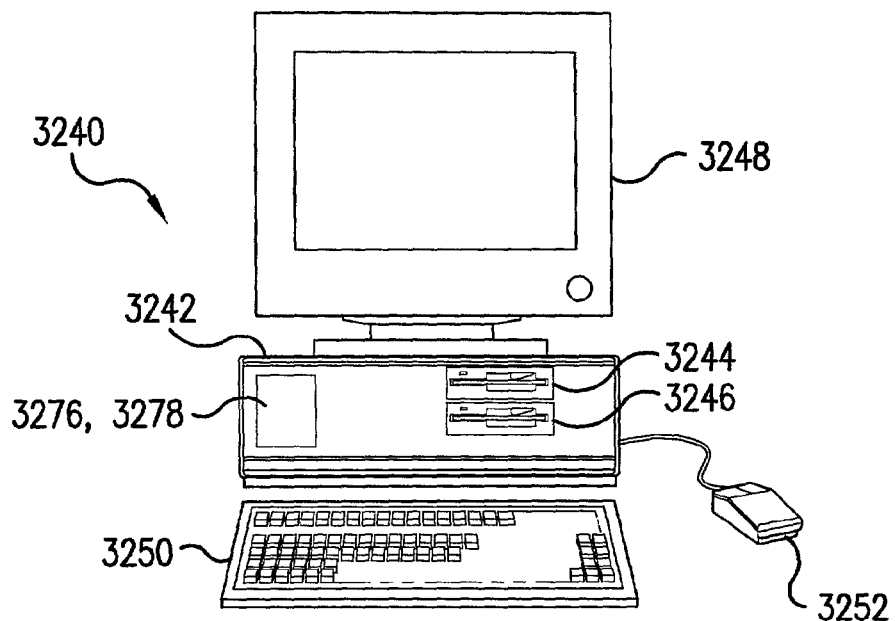
FIG. 32 shows a client workstation exterior.

FIG. 32 depicts a typical workstation 3240 which may be used in conjunction with the invention disclosed herein. The workstation 3240 includes a computer case 3242 including a power supply and an on/off switch, graphical display 3248, an ergonomic two-button mouse 3252, a keyboard 3250, a floppy drive 3244, a CD RW drive 3246, an infrared port comprising an infrared receiver 3276 and an infrared transmitter 3278.

Figure 33:
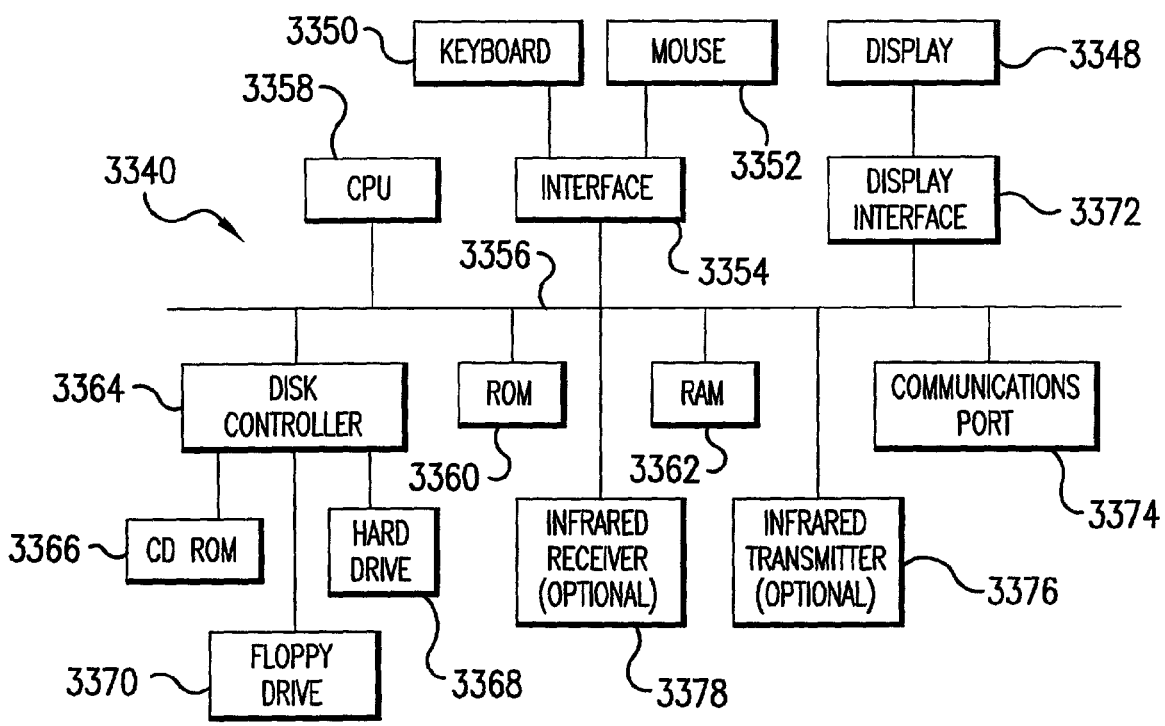
FIG. 33 shows underlying supporting hardware for a workstation optionally including infrared communication capability.

FIG. 33 depicts a functional block diagram for the components of a workstation 3340. System communication is conducted through a system bus 3356. All connections to the system bus are bidirectional so that information and control signals can be transmitted and received by connected devices. The disk controller 3364 receives read and write commands via the bus 3356 and transmits them to the CD-ROM 3366, the floppy drive 3370 and the hard drive 3368. The CD-ROM, the floppy and the hard disk drive respond to requests via the bus 3356. The workstation 3340 has a central processing unit (CPU) 3358 connected to the system bus 3356. In addition the computer includes a read only memory (ROM) 3360, a random access memory (RAM) 3362, an optional infrared receiver 3378, an optional infrared transmitter 3376, a communications port 3374, a display interface 3372 connected to a display 3348 and an input/output interface 3354 connected to the keyboard 3350 and the ergonomic two-button mouse 3352.

Figure 34:
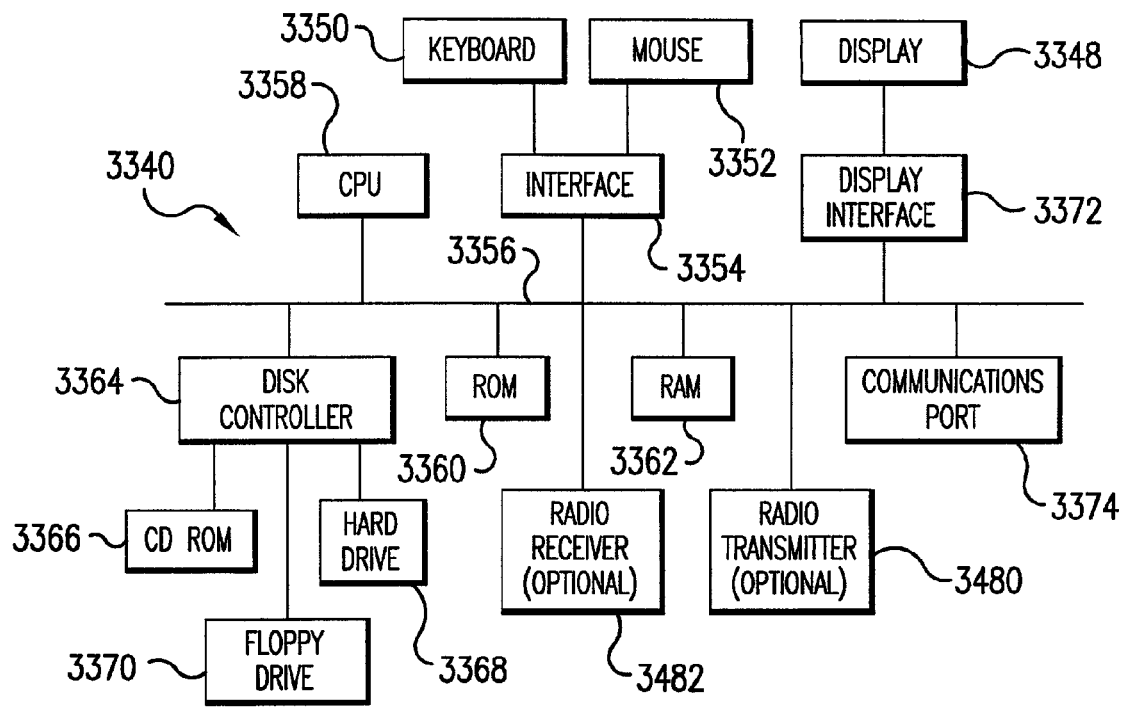
FIG. 34 shows the client workstation as depicted in FIG. 30 with wireless communication capability replacing infrared capability.

FIG. 34 depicts the internal organization of a workstation as in FIG. 33 except that instead of the optional infrared receiver and infrared transmitter, the workstation in FIG. 34 has a radio receiver 3482 and a radio transmitter 3480.

Figure 35:
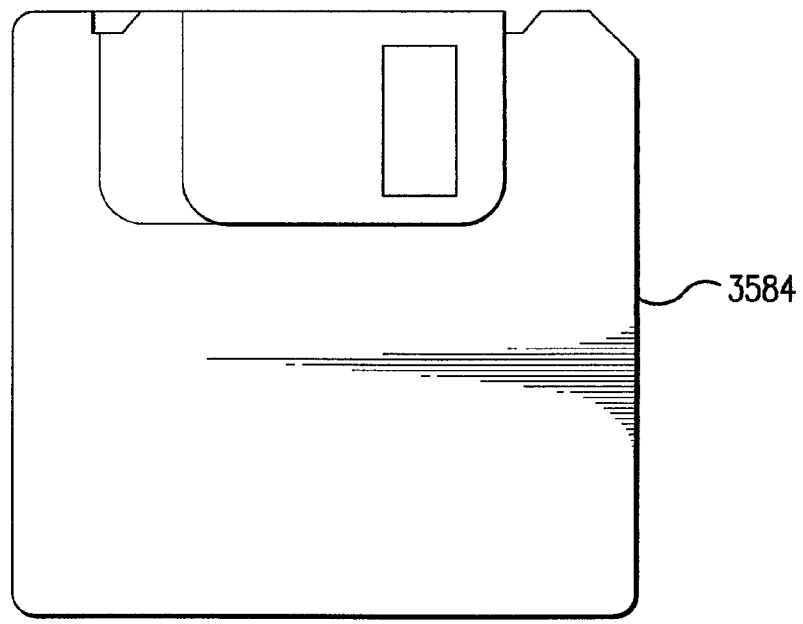
FIG. 35 depicts a medium for tangibly representing binary coded information such as a diskette.

FIG. 35 depicts a diskette. The diskette is an example embodiment of a general purpose storage device which, when inserted in a floppy diskette drive, may be used to record and retrieve information from a general purpose digital computer. Although the diskette depicted is a magnetic storage medium, alternative storage media such as the compact disk are included herein.

Where the example embodiments herein described expressly refer to Windows Media™ content, RealNetworks™ content and QuickTime™ content, the present invention encompasses embodiments which include, without limitation, MP3 content, MPEG content or other information content that fits within the broad class of information content and information services which may be designated within web page components or hyperlinked e-mail messages and provided over a distributed computer network.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

We claim:

1. A system for delivering streaming multi-media content over the Internet comprising:

at least one client workstation, responsively interfaced to the Internet wherein link encoded web pages, or link encoded electronic mail messages, or link encoded web pages and link encoded electronic mail messages, are displayed and said at least one client workstation enabling a user to select a hyperlink of the link encoded web pages, or link encoded electronic mail messages, or link encoded web pages and link encoded electronic mail messages, thereby resulting in transmission of a first request over the Internet for receiving multi-media content, wherein each link encoded web page includes one or more encoded hyperlinks comprising first reference information and each link encoded electronic mail message includes one or more encoded hyperlinks comprising first reference information, wherein first reference information comprises information specifying the multi-media content and format associated therewith;

at least one link processing server interfaced to the Internet and hosting at least one link conversion process, wherein the link processing server translates first reference information from one or more of the encoded hyperlinks to second reference information that enables one or more formats to stream without having to deploy from a web server one or more reference files containing the second reference information, wherein the second reference information comprises first reference information and a location where the multi-media content is stored, and the link processing server receives the first request for the multi-media content from said at least one client workstation, the first request comprising specification of the multi-media content in at least one of a banner ad, a pre-clip, a post-clip, and a web page embedding, and said at least one link processing server transmits second reference information to the client workstation, then the client workstation generates a second request to stream the multi-media content to said at least one client workstation, wherein said second request is automatically formatted or preformatted to be in conformity at least with the format of the multi-media content via said at least one link conversion process, and wherein said at least one link conversion process does not create any reference files for storage on a web server; and at least one streaming multi-media server interfaced to the Internet and storing the multi-media content, and the at least one streaming multi-media server is responsive to said second request received from said at least one link processing server so as to deliver the multi-media content over the Internet to said at least one client workstation.

2. The system as in claim 1, wherein said hyperlink specifying the multi-media content and the format associated therewith further includes specification of said at least one link processing server for pre-processing the request.

3. The system as in claim 1, wherein said first request does not expressly specify a communications port of said at least one link processing server.

4. The system as in claim 1, wherein said at least one link processing server includes a database for recording said first request and said second request.

5. The system as in claim 1, wherein the link processing server processes said first request only if the requesting client pays for the requested multi-media content.

6. The system as in claim 1, wherein the link processing server processes said first request only if the requesting client is authorized to receive the requested multi-media content.

7. The system as in claim 1, wherein the link processing server hosts said conversion processes for requests for multi-media content in a plurality of formats including formats selected from the group consisting of Windows Media™, RealNetworks™, QuickTime™, MP3 and MPEG formats.

8. The system as in claim 1 wherein said web pages are hosted on a web server, wherein said web server only serves requests for content consisting of web pages.

9. The system as in claim 1 wherein the multi-media content is at least one of a RealNetworks™, QuickTime™, Windows Media™, MPEG and MP3 multi-media clip.

10. The system as in claim 1, wherein said hyperlink specifying the multi-media content and the format associated therewith specifies one of a plurality of different formats.

11. The system as in claim 1 wherein said link conversion process further comprises a standalone application specified in at least one of Visual Basic and Visual Basic Script under Microsoft ASP.

12. The system as in claim 1, wherein the at least one link conversion process is a plurality of link conversion processes.

13. The system as in claim 1, wherein the at least one link processing server is such that a single server hosts a plurality of said at least one link conversion processes and said single server processes requests for a plurality of media formats corresponding to each said link conversion process.

14. A system for serving media content over the Internet, comprising:
at least one client workstation, responsively interfaced to the Internet wherein link encoded web pages, or link encoded electronic mail messages, or link encoded web pages and link encoded electronic mail messages, are displayed and said at least one client workstation enables a user to select a hyperlink of the link encoded web pages, or link encoded electronic mail messages, or link encoded web pages and link encoded electronic mail messages, thereby resulting in the transmission of a first request over the Internet for receiving media content, wherein each link encoded web page includes one or more encoded hyperlinks comprising first reference information and each link encoded electronic mail message includes one or more encoded hyperlinks comprising first reference information, wherein first reference information comprises information specifying the multi-media content and format associated therewith;
at least one link processing server interfaced to the Internet and hosting at least one link conversion process, wherein the link processing server translates first reference information from one or more of the encoded hyperlinks to second reference information that enables one or more formats to stream without having to deploy from a web server one or more reference files containing the second reference information, wherein the second reference information comprises first reference information and a location where the media content is stored, and the link processing server receives the first request for the media content from said at least one client workstation, the first request comprising specification of the media content in at least one of a banner ad, a pre-clip, a post-clip, and a web page embedding, and said at least one link processing server transmits second reference information to the client workstation, then the client workstation generates a second request to serve the media content to said at least one client workstation, wherein said second request is automatically formatted or preformatted to be in conformity at least with the format of the media content via said at least one link conversion process, and wherein said at least one link conversion process does not create any reference files for storage on a web server; and
at least one media content server interfaced to the Internet and storing the media content, and the at least one media content server is responsive to said second request received from said at least one link processing server so as to deliver the media content over the Internet to said at least one client workstation.

15. A method of processing requests for multi-media content by at least one client workstation over the Internet comprising the steps of:
uploading the multi-media content to at least one multi-media content server;
generating at least one link encoded web page or link encoded electronic mail message, or at least one link encoded web page and link encoded electronic mail message, wherein the at least one link encoded web page includes one or more encoded hyperlinks comprising first reference information and the at least one link encoded electronic mail message includes one or more encoded hyperlinks comprising first reference information, wherein first reference information comprises information specifying the multi-media content and format associated therewith, and wherein each encoded hyperlink specifies at least one link processing server responsive to a user request, wherein the link processing server enables one or more formats to stream without having to deploy from a web server one or more reference files containing second reference information, wherein the second reference information comprises first reference information and a location where the multi-media content is stored;
distributing said at least one link encoded web page or link encoded electronic mail message, or at least one link encoded web page and link encoded electronic mail message, to the at least one client workstation over the Internet;
generating a first request for multi-media content by using at least one client workstation to select one or more of the encoded hyperlinks;
receiving by the at least one link processing server via the Internet the first request from the at least one client workstation for the multi-media content via one or more of the encoded hyperlinks, said first request comprising specification of the multi-media content in at least one of a banner ad, a pre-clip, a post-clip, and a web page embedding; and
generating a second request when the at least one link processing server transmits second reference information to the at least one client workstation, wherein transmission of the second reference information to the at least one client workstation causes said at least one client workstation to generate the second request to stream the multi-media content to said at least one client workstation or other workstation from said at least one multi-media content server via the Internet, said second request automatically formatted or preformatted to be in conformity at least with the format of the multi-media content, and wherein said second request is generated by said at least one client workstation using the second reference information without generating any reference files for storage on a web server.

16. The method as in claim 15, wherein each encoded hyperlink specifies the media content and the format associated therewith and further includes specification of said at least one link processing server for pre-processing the request.

17. The method as in claim 15, wherein said first request expressly specifies a communications port of said at least one link processing server.

18. The method as in claim 15, wherein said first request does not expressly specify a communications port of said at least one link processing server.

19. The system as in claim 15, wherein said at least one link processing server includes a database for recording said first request and said second request.

20. The system as in claim 15, wherein the link processing server processes said first request only if the requesting client pays for the requested media content.

21. The system as in claim 15, wherein the link processing server processes said first request only if the requesting client is authorized to receive the requested media content.

22. The system as in claim 15, wherein the link processing server hosts said conversion processes for requests for media content in a plurality of formats including formats selected from the group consisting of Windows Media™, RealNetworks™, QuickTime™, MP3 and MPEG formats.

23. The system as in claim 15 wherein said web pages are hosted on a web server, wherein said web server only serves requests for content consisting of web pages.

24. The system as in claim 15 wherein the media content is at least one of a RealNetworks™, QuickTime™, Windows Media™, MPEG and MP3 multi-media clip.

25. The system as in claim 16, wherein each encoded hyperlink specifying media content and format associated therewith specifies one of a plurality of different formats.

26. The system as in claim 15 wherein said link conversion process further comprises at least one of a standalone application specified in Visual Basic and Visual Basic Script under Microsoft ASP.

27. The system as in claim 15, wherein the at least one link conversion process is a plurality of link conversion processes.

28. The system as in claim 15, wherein the at least one link processing server is such that a single server hosts a plurality of said at least one link conversion processes and said single server processes requests for a plurality of media formats corresponding to each said link conversion process.

29. A method of processing requests for media content by at least one client workstation over the Internet comprising the steps of:

uploading media content to at least one media content server;

generating at least one link encoded web page or link encoded electronic mail message, or at least one link encoded web page and link encoded electronic mail message, wherein the at least one link encoded web page includes one or more encoded hyperlinks comprising first reference information and the at least one link encoded electronic mail message includes one or more encoded hyperlinks comprising first reference information, wherein first reference information comprises information specifying the media content and format associated therewith, and wherein each encoded hyperlink specifies at least one link processing server responsive to a user request, wherein the link processing server enables one or more formats to stream using one or more encoded hyperlinks comprising first reference information without having to deploy from a web server one or more reference files containing second reference information, wherein the second reference information comprises first reference information and a location where the media content is stored;

distributing said at least one link encoded web page or at least one link encoded electronic mail message, or at least one link encoded web page and link encoded electronic mail message, to the at least one client workstation over the Internet;

generating a first request for media content by using at least one client workstation to select one or more of the encoded hyperlinks;

receiving by the at least one link processing server via the Internet the first request from the at least one client workstation for the media content via one or more of the encoded hyperlinks, said first request comprising specification of the media content in at least one of a banner ad, a pre-clip, a post-clip, and a web page embedding; and generating a second request when the at least one link processing server transmits second reference information to the at least one client workstation, wherein transmission of the second reference information to the at least one client workstation causes said at least one client workstation to generate the second request to stream the media content to said at least one client workstation or other workstation from said at least one media content server via the Internet, said second request automatically formatted or preformatted to be in conformity at least with the format of the media content, and wherein said second request is generated by said at least one client workstation using the second reference information without generating any reference files for storage on a web server.

30. A system for distributing at least one of information and information services over a computer network, comprising:

at least one client workstation responsively interfaced to the computer network wherein link encoded web pages or link encoded electronic mail messages, or link encoded web pages and link encoded electronic mail messages, are displayed and said at least one client workstation enabling selection of a hyperlink resulting in transmission of a first request over said computer network for the at least one of information and information services, wherein each link encoded web page includes one or more encoded hyperlinks comprising first reference information and each link encoded electronic mail message includes one or more encoded hyperlinks comprising first reference information, wherein first reference information comprises information specifying the at least one of information and information services and format associated therewith;

at least one connection processor responsively interfaced to the computer network and hosting at least one connection conversion process, said at least one connection processor receiving the first request from at least one client workstation for the at least one of information and information services and applying the at least one connection conversion process to generate at least one second request for the at least one of information and information services and transmit the at least one second request over the computer network;

at least one remote server responsively interfaced to the computer network and hosting the at least one of information and information services, said at least remote one server receiving the at least one other request to deliver at least one of information and information services over the computer network to said at least one requesting client workstation; and at least one link processing server that is a single server hosting a plurality of said at least one link conversion processes and said single server processes requests for a plurality of media formats corresponding to each said link conversion process, wherein the link processing server translates first reference information from one or more of the encoded hyperlinks to second reference information that enables one or more formats to stream without having to deploy from a web server one or more reference files containing the second reference information, wherein the second reference information comprises first reference information and a location where media content is stored, and wherein each link conversion process does not create any reference files for storage on a web server.

31. The system as in claim 30 wherein the computer network is the Internet.

32. The system as in claim 30 wherein the at least one of information and information services is streaming multi-media content.

33. The system as in claim 30 wherein the at least one of information and information services is media content.

34. The system as in claim 30 wherein the at least one of information and information services is non-media content.

35. The system as in claim 30, wherein each encoded hyperlink specifies at least one of information and information services and the format associated therewith and each hyperlink further includes specification of said at least one connection processor for pre-processing the first request.

36. The system as in claim 30, wherein said first request does not expressly specify a communications port of said at least one connection processor.

37. The system as in claim 30, wherein said at least one connection processor includes a database for recording each of said first request and second request.

38. The system as in claim 30, wherein the at least one connection processor processes said first request only if the requesting client pays for the requested at least one of information and information services.

39. The system as in claim 30, wherein the connection processor processes said first request only if the requesting client is authorized to receive the requested at least one of information and information services.

40. The system as in claim 30 wherein the connection processor hosts said conversion processes for requests for at least one of information and information services in a plurality of formats including Windows Media™, RealNetworks™, QuickTime™, MP3 and MPEG formats.

41. The system as in claim 30 wherein said web pages are hosted on a web server, wherein said web server only serves requests for content consisting of web pages.

42. The system as in claim 30 wherein the at least one of information and information services is at least one of a RealNetworks™, QuickTime™, Windows Media™, MPEG and MP3 multi-media clip.

43. The system as in claim 30, wherein each encoded hyperlink specifies multi-media content and the format associated therewith and further specifies one of a plurality of different formats.

44. The system as in claim 30 wherein said link conversion process further comprises at least one of a standalone application specified in Visual Basic and Visual Basic Script under Microsoft ASP.

45. The system as in claim 30, wherein the at least one link conversion process is a plurality of link conversion processes.

46. A method for distributing at least one of information and information services over a computer network comprising the steps of:

uploading at least one of information and information services to at least one first server;

generating at least one of a link encoded web page and a link encoded electronic mail message, wherein each one of the link encoded web page and the link encoded electronic mail message contains at least one hyperlink specifying a connection processor, wherein the at least one hyperlink also comprises first reference information specifying media content and format associated therewith;

distributing the link encoded web page, or the link encoded electronic mail message, or the link encoded web page and the link encoded electronic mail message, to at least one client workstation over the computer network;

receiving over the computer network from the client workstation a first request for at least one of information and information services, wherein the connection processor receives the first request for the at least one of information and information services, and wherein the connection processor is a link processing server that translates first reference information from the at least one hyperlink to second reference information that enables one or more formats to stream without having to deploy from a web server one or more reference files containing the second reference information, wherein the second reference information comprises first reference information and a location where media content, multi-media content or non-media content is stored;

identifying the at least one of information and information services requested;

generating one or more second requests to satisfy the first request for at least one of information and information services when the connection processor transmits second reference information to the at least one client workstation, wherein transmission of the second reference information to the at least one client workstation causes the at least one client workstation to generate one or more second requests to stream the at least one of information and information services to the at least one client workstation or other workstation from said at least one first server via the computer network; and transmitting said generated one or more second requests over the computer network for at least one of information and information services.

47. The method as in claim 46 wherein the computer network is the Internet.

48. The method as in claim 46 wherein the at least one of information and information services is streaming multi-media content.

49. The method as in claim 46 wherein the at least one of information and information services is media content.

50. The method as in claim 46 wherein the at least one of information and information services is non-media content.

51. The method as in claim 46, wherein said first request for at least one of information and information services expressly specifies a communications port of said connection processor.

52. The method as in claim 46, wherein said first request for at least one of information and information services does not expressly specify a communications port of said connection processor.

53. The method as in claim 46, wherein said connection processor includes a database for recording each said first request and said one or more second requests.

54. The method as in claim 46, wherein said connection processor processes said first request for at least one of information and information services only if the requesting client pays for the requested at least one of information and information services.

55. The method as in claim 46, wherein the connection processor processes said first request for at least one of information and information services only if the requesting client is authorized to receive the requested at least one of information and information services.

56. The method as in claim 46, wherein the connection processor generates said one or more second requests for at least one of information and information services in a plurality of formats including Windows Media™, RealNetworks™, QuickTime™, MP3 and MPEG formats.

57. The method as in claim 46 wherein said web pages are hosted on a web server which only processes requests for web pages.

58. The method as in claim 46 wherein the at least one of information and information services is at least one of a RealNetworks™, QuickTime™, Windows Media™, MPEG and MP3 media clip.

59. The method as in claim 46, wherein the connection processor generates one or more second requests for at least one of information and information services in a plurality of distinct formats.

60. The method as in claim 46 wherein said link conversion process further comprises at least one of a standalone application specified in Visual Basic and Visual Basic Script under Microsoft ASP.

61. The method as in claim 46, wherein the connection processor hosts a plurality of processes for generating other requests in a plurality of distinct formats.

62. A system for distributing a website specification including at least one link encoded web page providing at least one of information and information services over a computer network, the system comprising:
- a web server responsively connected to the computer network, said web server for hosting the website;
- a web development workstation for specifying the at least one web page of the website, said web development workstation responsively connected to the computer network;
- a computer process hosted on the web development workstation for constructing at least one hyperlink specifying a connection processor;
- another computer process hosted on the web development workstation for embedding the at least one hyperlink into the at least one web page so that the at least one web page is a link encoded web page, wherein the embedded hyperlink comprises first reference information that comprises information specifying at least one of information and information services and format associated therewith;
- a network interface for sending the at least one link encoded web page from the web development workstation to the web server;
- a client workstation responsively connected to the computer network wherein the client workstation originates at least one first request for the at least one link encoded web page and at least one second request for at least one of information and information services by specifying a selection, said selection resulting in the transmission of the first information of the at least one hyperlink over the computer network;
- another computer process hosted on the connection processor, wherein the connection processor receives the first information of the at least one hyperlink and converts said first information of the at least one hyperlink to the at least one second request for information and information services, wherein the connection processor is a link processing server that translates first reference information from the at least one hyperlink to second reference information that enables one or more formats to stream without having to deploy from any web server one or more reference files containing the second reference information, wherein the second reference information comprises first reference information and a location where media content is stored, and said third request specifies at least one media server; and
- a network interface for transmitting the at least one second request for information and information services to the media server, wherein said second request is generated by the connection processor using the second reference information without generating any reference files for storage on a web server.

63. A method for distributing a website specification or an electronic mail message specification for processing a first request for at least one of information and information services over a computer network to a connection processor, the method comprising the steps of:
- applying a computer process to a specification of display options for at least one of information and information services resulting in the generation of a hyperlink comprising the specification of the display options and a reference to the connection processor;
- embedding said hyperlink into at least one of a website and an electronic mail message so that the website is a link encoded website and the electronic mail message is a link encoded electronic mail message, wherein the embedded hyperlink comprises first reference information comprising information specifying the at least one of information and information services and format associated therewith;
- distributing the hyperlink embedded in the at least one of the link encoded website and the link encoded electronic mail message to at least one client workstation;
- receiving the hyperlink by the connection processor resulting from the first request for at least one of information and information services generated by the at least one client workstation, wherein the connection processor is a link processing server that translates first reference information from the at least one hyperlink to second reference information that enables one or more formats to stream without having to deploy from a web server one or more reference files containing the second reference information, wherein the second reference information comprises first reference information and a location where media content is stored; and
- applying a computer process hosted on the connection processor to convert the specification of display options for the connection processor into a second request for at least one media server to satisfy the first request for at least one of information and information services, wherein said computer process does not create any reference files for storage on a web server.

64. A system for optimizing the distribution of at least one of information and information services over a computer network, the system comprising:
- at least one client workstation, responsively interfaced to the computer network wherein at least one of a link encoded web page and a link encoded electronic mail message are displayed and said at least one client workstation enabling a user to select a hyperlink resulting in the transmission of a first request over the computer network for receiving the at least one of information and information services, wherein the link encoded web page includes one or more encoded hyperlinks comprising first reference information and the link encoded electronic mail message includes one or more encoded hyperlinks comprising first reference information, wherein first reference information comprises information specifying the at least one of information and information services and format associated therewith;

at least one connection processor responsively interfaced to the computer network and hosting at least one connection conversion process, wherein the connection processor is a link processing server that translates first reference information from one or more of the encoded hyperlinks to second reference information that enables one or more formats to stream without having to deploy from a web server one or more reference files containing the second reference information, wherein the second reference information comprises first reference information and a location where the media content is stored, and the at least one connection processor receives the first request from at least one client workstation for the at least one of information and information services and applies the at least one connection conversion process to generate at least one second request for the at least one of information and information services and transmits the at least one second request over the computer network, said at least one second request is responsive to the requirements of a dynamic resource distribution optimization program responsive to changes in network demand for the at least one of information and information services, wherein said at least one connection conversion process does not create any reference files for storage on a web server when generating said at least one second request; and at least one media server responsively interfaced to the computer network and hosting the at least one of information and information services, said at least one media server receiving the at least one second request to deliver at least one of information and information services over the computer network to said at least one requesting client workstation.

65. A method for optimizing the distribution of at least one of information and information services over a computer network, the method comprising the steps of:

uploading at least one of information and information services to at least one media server;

generating at least one of a link encoded web page and a link encoded electronic mail message, wherein each one of the link encoded web page and the link encoded electronic mail message contains at least one hyperlink comprising first reference information referencing a connection processor and encoding at least one of information and information services display;

distributing the link encoded web page, or the link encoded electronic mail message, or the link encoded web page and the link encoded electronic mail message over the computer network;

receiving, over the computer network, a first request from at least one client workstation for at least one of information and information services, wherein said receiving of the first request for the at least one of information and information services is performed by the connection processor, wherein the connection processor is a link processing server that translates first reference information from the hyperlink to second reference information that enables one or more formats to stream without having to deploy from a web server one or more reference files containing the second reference information, wherein the second reference information comprises first reference information and a location where the media content is stored;

generating at least one second request for the at least one of information and information services responsive to the requirements of a dynamic resource distribution optimization program responsive to changes in network demand for the at least one of information and information services, wherein the at least one second request is generated by the at least one client workstation when the connection processor transmits second reference information to the at least one client workstation, and wherein generation of the second request does not create any reference files for storage on a web server; and transmitting said generated at least one second request over the computer network to the at least one media server.

66. In a system for distributing at least one of information and information services over a computer network wherein multi-media content is uploaded to at least one multi-media content server, a method comprising the steps of:

generating a first request, using at least one client workstation, for multi-media content including selecting at least one hyperlink specifying at least one link processing server inserted in at least one web page or electronic mail message, or at least one web page and electronic mail message, so that the web page is a link encoded web page and the electronic mail message is a link encoded electronic mail message, responsive to a user request, wherein said at least one link encoded web page or at least one link encoded electronic mail message, or at least one link encoded web page and link encoded electronic mail message, is distributed to the at least one client workstation over the Internet, wherein the at least one hyperlink comprises first reference information that comprises information specifying the multi-media content and format associated therewith, wherein the link processing server translates first reference information from the at least one hyperlink to second reference information that enables one or more formats to stream without having to deploy from a web server one or more reference files containing the second reference information, wherein the second reference information comprises first reference information and a location where the multi-media content is stored;

receiving by the at least one link processing server the first request from the at least one client workstation for the multi-media content via the at least one hyperlink, said first request from the at least one client workstation comprising specification of the multi-media content in at least one of a banner ad, a pre-clip, a post-clip, and a web page embedding; and generating a second request when the at least one link processing server transmits second reference information to the at least one client workstation, wherein transmission of the second reference information to the at least one client workstation causes said at least one client workstation to generate the second request to stream the multi-media content to said at least one client workstation or other workstation from the at least one multi-media content server via the computer network, said second request automatically formatted or preformatted to be in conformity at least with the format of the multi-media content, and wherein said second request is generated by the at least one client workstation using the second reference information without generating any reference files for storage on a web server.

67. In a system for distributing at least one of information and information services over a computer network wherein multi-media content is uploaded to at least one multi-media content server, computer program code stored on a computer is transmitted as a computer data signal embodied in a carrier wave in the system, wherein the computer program code comprises:

a first program code for generating a first request, using at least one client workstation, for the multi-media content including at least one hyperlink specifying at least one link processing server inserted in at least one web page or electronic mail message, or at least one web page and electronic mail message, so that the web page is a link encoded web page and the electronic mail message is a link encoded electronic mail message, that is responsive to a user request, said at least one link encoded web page or at least one link encoded electronic mail message, or at least one link encoded web page and link encoded electronic mail message, to be distributed to at least one client workstation over the Internet, wherein the at least one hyperlink comprises first reference information that comprises information specifying the multi-media content and format associated therewith, wherein the link processing server translates first reference information from the at least one hyperlink to second reference information that enables one or more formats to stream without having to deploy from a web server one or more reference files containing second reference information, wherein the second reference information comprises first reference information and a location where the multi-media content is stored;

a second program code for directing receipt by the at least one link processing server the first request from the at least one client workstation for the multi-media content via the at least one hyperlink, said first request from the at least one client workstation comprising specification of the multi-media content in at least one of a banner ad, a pre-clip, a post-clip, and a web page embedding; and a third program code for generating a second request when the at least one link processing server transmits second reference information to the at least one client workstation, wherein transmission of the second reference information to the at least one client workstation causes said at least one client workstation to generate the second request to stream the multi-media content to said at least one client workstation or other workstation from said at least one multi-media content server via the computer network, said second request automatically formatted or preformatted to be in conformity at least with the format of the multi-media content, and wherein said second request is generated by the at least one client workstation using the second reference information without generating any reference files for storage on a web server.

68. In a system for distributing at least one of information and information services over a computer network wherein at least one of information and information services is uploaded to at least one media server, a method comprising the steps of:

generating at least one of a link encoded web page and a link encoded electronic mail message, wherein the at least one link encoded web page or link encoded electronic mail message, or link encoded web page and link encoded electronic mail message, are responsive to a user request, and contains at least one hyperlink specifying a connection processor, wherein the at least one hyperlink comprises first reference information that comprises information specifying the multi-media content and format associated therewith, said at least one link encoded web page or at least one link encoded electronic mail message, or at least one link encoded web page and link encoded electronic mail message, are to be distributed to at least one client workstation over the computer network;

receiving by the connection processor over the computer network a first request for at least one of information and information services, wherein the connection processor receives the first request for the at least one of information and information services and the connection processor is a link processing server translates first reference information from the at least one hyperlink to second reference information that enables one or more formats to stream without having to deploy from a web server one or more reference files containing second reference information, wherein the second reference information comprises first reference information and a location where the media content is stored;

identifying by the connection processor the at least one of information and information services requested and generating one or more second requests to satisfy the first request for the at least one of information and information services when the connection processor transmits second reference information to the at least one client workstation, wherein transmission of the second reference information to the at least one client workstation causes the at least one client workstation to generate one or more second requests to stream the at least one of information and information services to the at least one client workstation or other workstation from said at least one media server via the computer network, wherein said one or more second requests are generated by the at least one client workstation using the second reference information obtained from the connection processor without generating any reference files for storage on a web server; and transmitting said generated one or more second requests over the computer network for at least one of information and information services.

69. In a system for distributing at least one of information and information services over a computer network wherein at least one of information and information services is uploaded to at least one media server, computer program code stored on a computer is transmitted as a computer data signal embodied in a carrier wave in the system, wherein the computer program code comprises:

a first program code for generating at least one of a web page and an electronic mail message, wherein the at least one web page or electronic mail message, or one web page and electronic mail message, are responsive to a user request, and contains at least one hyperlink specifying a connection processor so that the web page is a link encoded web page and the electronic mail message is a link encoded electronic mail message, wherein the at least one hyperlink comprises first reference information that comprises information specifying the media content and format associated therewith, said at least one link encoded web page or at least one link encoded electronic mail message, or at least one link encoded web page and link encoded electronic mail message, are to be distributed to at least one client workstation over the computer network, wherein the connection processor is a link processing server that translates first reference information from the at least one hyperlink to second reference information that enables one or more formats to stream without having to deploy from a web server one or more reference files containing second reference information, wherein the second reference information comprises first reference information and a location where media content is stored;

a second program code for directing receipt by the connection processor over the computer network a first request for at least one of information and information services, wherein the connection processor receives the first request for the at least one of information and information services;

a third program code for identifying, by the connection processor, the at least one of information and information services requested and generating one or more second requests to satisfy the first request for at least one of information and information services, wherein said second request is generated by the connection processor using the second reference information without generating any reference files for storage on a web server; and a fourth program code for directing transmission of said generated one or more second requests over the computer network for the at least one of information and information services.

70. A method for distributing a website specification or an electronic mail message specification, or a website specification and an electronic mail message specification, for processing a first request for at least one of information and information services over a computer network to a connection processor, the method comprising the steps of:

generating a hyperlink representing a user's specification of display options for at least one of information and information services, wherein the hyperlink points to the connection processor, wherein said hyperlink is embedded by the user into at least one of the website or electronic mail message, or the website and the electronic mail message, so that the web page is a link encoded web page and the electronic mail message is a link encoded electronic mail message, and the link is distributed to at least one client workstation, wherein the hyperlink comprises first reference information that comprises information specifying the media content and format associated therewith;

receiving the hyperlink by the connection processor resulting from the first request for at least one of information and information services generated by the at least one client workstation, wherein the connection processor is a link processing server that translates first reference information from the hyperlink to second reference information that enables one or more formats to stream without having to deploy from a web server one or more reference files containing second reference information, wherein the second reference information comprises first reference information and a location where the multi-media content is stored; and generating a second request for at least one media server to satisfy the first request for at least one of information and information services when the connection processor transmits second reference information to the at least one client workstation, wherein transmission of the second reference information to the at least one client workstation causes the at least one client workstation to generate the second request to stream the at least one of information and information services to the at least one client workstation or other workstation from said at least one media server via the computer network, and said second request is generated by the at least one client workstation using the second reference information without generating any reference files for storage on a web server.

71. In a system for distributing a website specification or an electronic mail message specification, or a website specification and an electronic mail message, for processing a first request for at least one of information and information services over a computer network to a connection processor, computer program code stored on a computer is transmitted as a computer data signal embodied in a carrier wave in the system, wherein the computer program code comprises:

a first program code for generating a hyperlink representing a user's specification of display options for at least one of information and information services, wherein the hyperlink points to the connection processor, wherein the hyperlink is embedded by the user into at least one of the website or the electronic mail message, or the website and the electronic mail message, so that the web page is a link encoded web page and the electronic mail message is a link encoded electronic mail message, and the hyperlink is distributed to at least one client workstation, wherein the hyperlink includes first reference information that comprises information specifying the media content and format associated therewith;

a second program code for directing receipt of the hyperlink by the connection processor resulting from the first request for at least one of information and information services generated by the at least one client workstation; and a third program code for generating a second request for at least one media server to satisfy the first request for at least one of information and information services, wherein the connection processor is a link processing server that translates first reference information from the hyperlink to second reference information that enables one or more formats to stream without having to deploy from a web server one or more reference files containing second reference information, wherein the second reference information comprises first reference information and a location where media content is stored, wherein when the connection processor transmits second reference information to the at least one client workstation transmission of the second reference information to the at least one client workstation causes the at least one client workstation to generate the second request to stream the at least one of information and information services to the at least one client workstation or other workstation from said at least one media server via the computer network, and said second request is generated by the at least one client workstation using the second reference information without generating any reference files for storage on a web server.

72. A system for delivering streaming multi-media content over the Internet comprising:

at least one client workstation, responsively interfaced to the Internet wherein a link encoded web page, or link encoded electronic mail message, or link encoded web page and link encoded electronic mail message, are displayed and said at least one client workstation enables a user to select a hyperlink of the link encoded web page, or the link encoded electronic mail message, or the link encoded web page and the link encoded electronic mail message, thereby resulting in the transmission of a first request over the Internet for receiving the multi-media content, wherein said hyperlink comprises first reference information that specifies the multi-media content and format associated therewith;

at least one link processing server hosting at least one link conversion process, wherein the link processing server translates first reference information from the hyperlink to second reference information that enables one or more formats to stream using one or more encoded hyperlinks comprising reference information without having to deploy from a web server one or more reference files containing second reference information, wherein the second reference information comprises first reference information and a location where the multi-media content is stored, and the at least one link processing server receives the first request for the multi-media content from said at least one client workstation, the first request comprising specification of the multi-media content in at least one of a banner ad, a pre-clip, a post-clip, and a web page embedding, said at least one link processing server transmits second reference information to the at least one client workstation, wherein transmission of the second reference information to the at least one client workstation causes said at least one client workstation to generate the second request to stream the multi-media content to said at least one client workstation via the Internet, wherein said second request is automatically formatted or preformatted to be in conformity at least with the format of the multi-media content via said at least one link conversion process, and wherein the second request is generated by the at least one client workstation using the second reference information without generating any reference files for storage on a web server; and at least one streaming multi-media server storing the multi-media content, and responsive to the second request received from said at least one client workstation so as to deliver the multi-media content over the Internet to said at least one client workstation.

\* \* \* \* \*